(12) United States Patent
Fujii

(10) Patent No.: US 8,318,243 B2
(45) Date of Patent: Nov. 27, 2012

(54) METHOD FOR MANUFACTURING OPTICAL INFORMATION RECORDING MEDIUM

(75) Inventor: Toshishige Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1094 days.

(21) Appl. No.: 12/240,000

(22) Filed: Sep. 29, 2008

(65) Prior Publication Data

US 2009/0139651 A1 Jun. 4, 2009

(30) Foreign Application Priority Data

Nov. 29, 2007 (JP) ................. 2007-309101
Nov. 29, 2007 (JP) ................. 2007-309102
May 21, 2008 (JP) ................. 2008-133509

(51) Int. Cl.
*B32B 3/02* (2006.01)

(52) U.S. Cl. ...................... 427/127; 428/64.1

(58) Field of Classification Search .......... 427/127; 428/64.1
See application file for complete search history.

(56) References Cited

U.S. PATENT DOCUMENTS

| | | | |
|---|---|---|---|
| 6,576,319 B2 * | 6/2003 | Yoshinari et al. | ........... 428/64.1 |
| 6,933,032 B2 | 8/2005 | Sasa et al. | |
| 7,197,756 B2 * | 3/2007 | Lee et al. | ..................... 720/721 |
| 7,413,788 B2 | 8/2008 | Sasa et al. | |
| 2006/0222810 A1 | 10/2006 | Hayashi et al. | |
| 2007/0114129 A1 | 5/2007 | Hayashi et al. | |
| 2007/0237064 A1 | 10/2007 | Fujii et al. | |
| 2008/0062841 A1 | 3/2008 | Sasa et al. | |

FOREIGN PATENT DOCUMENTS

| | | |
|---|---|---|
| EP | 1 162 613 A2 | 12/2001 |
| EP | 1 505 587 A2 | 2/2005 |
| JP | 11-213459 | 8/1999 |
| JP | 2004-95108 | 3/2004 |
| JP | 2006-59454 | 3/2006 |
| JP | 2006-331566 | 12/2006 |

\* cited by examiner

*Primary Examiner* — Jie Yang
(74) *Attorney, Agent, or Firm* — Dickstein Shapiro LLP

(57) ABSTRACT

Disclosed is a method for manufacturing an optical information recording medium. The method includes laminating plural layers successively on a substrate having a through-hole at its center; and fitting center caps each having a predetermined radius in the through-hole to form at least two of the plural layers by a spin coat method. A radius of a first center cap used for forming an upper layer of the at least two layers is larger than a radius of a second center cap used for forming a lower layer thereof.

16 Claims, 52 Drawing Sheets

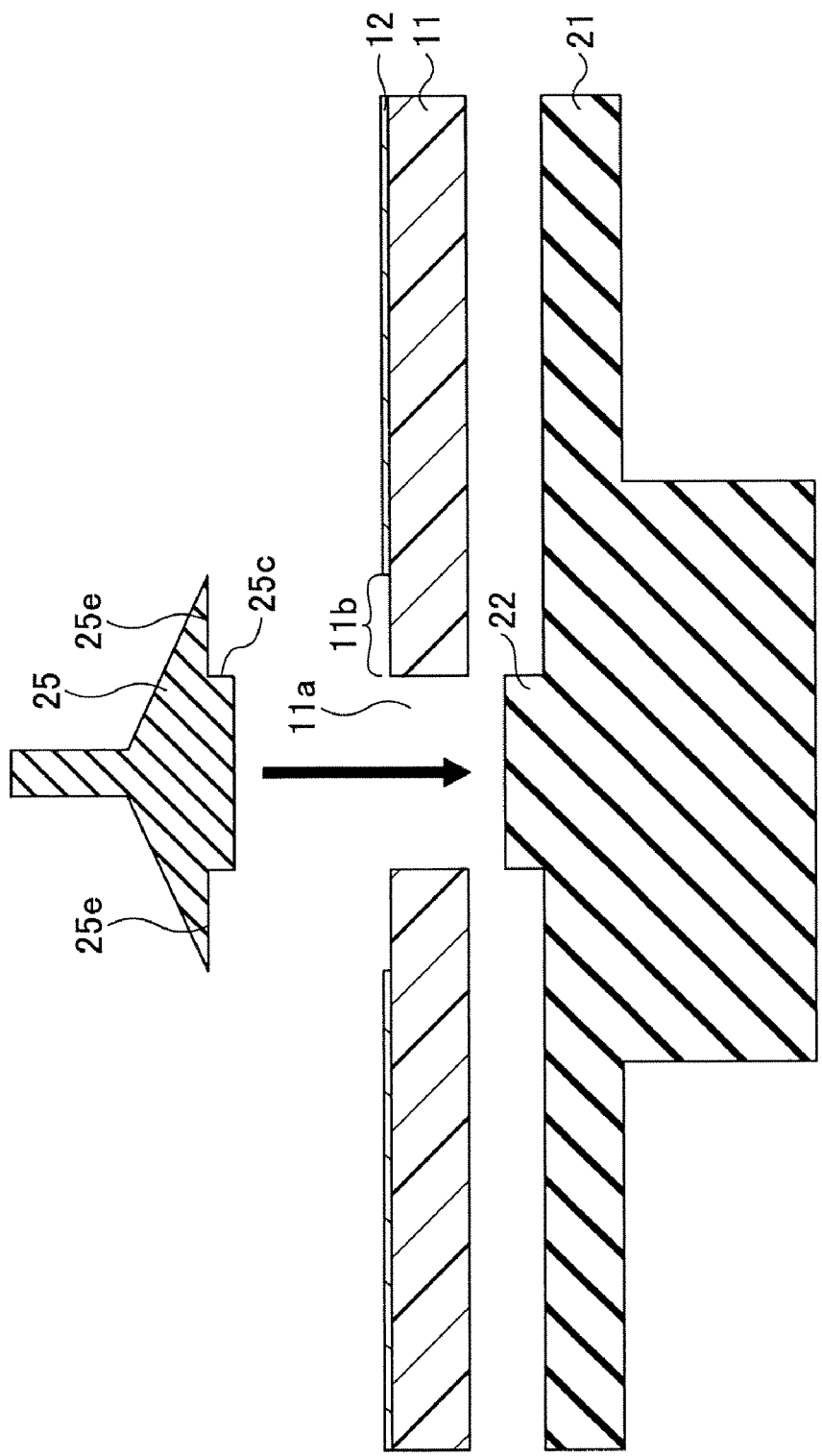

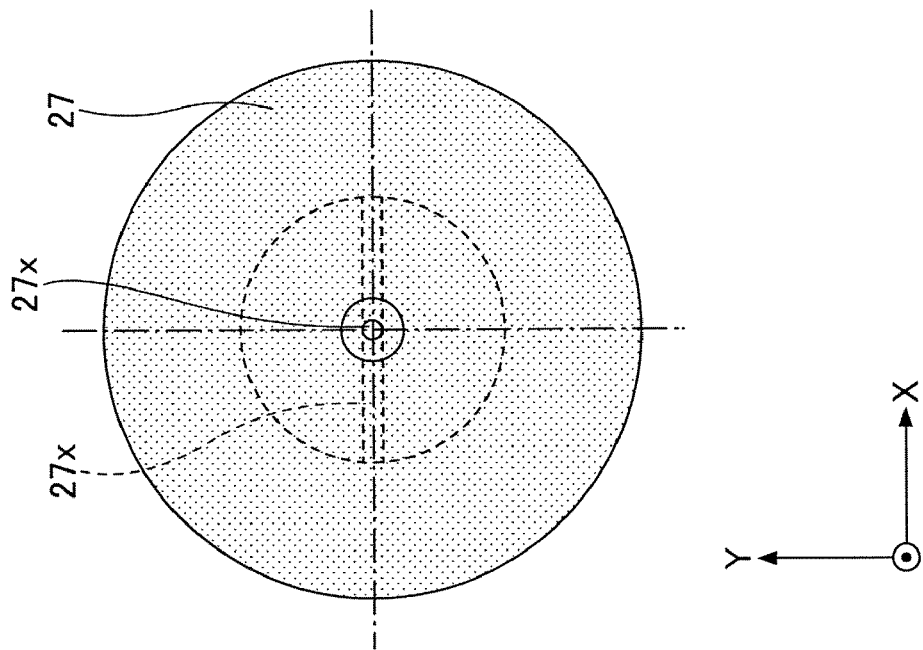
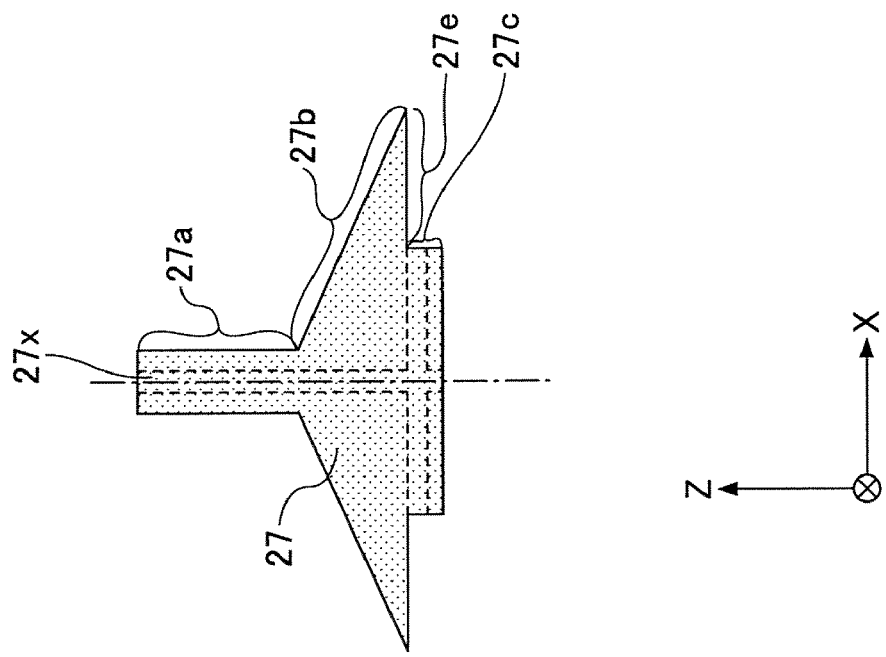
FIG.48A
FIG.48B

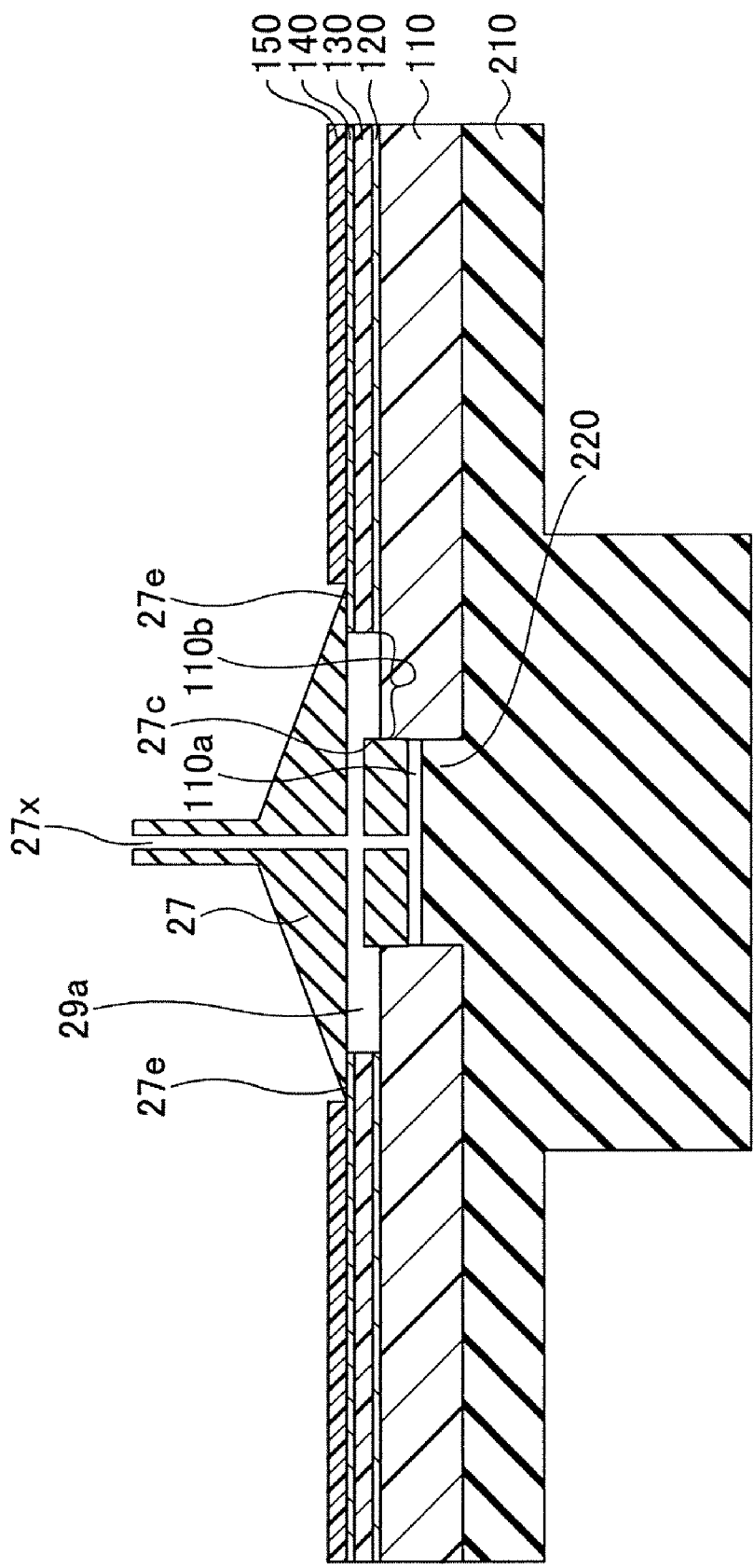

ized by the same reference numerals and their descriptions are omitted.

METHOD FOR MANUFACTURING OPTICAL INFORMATION RECORDING MEDIUM

BACKGROUND OF THE INVENTION

1. Field of the Invention

The present invention relates to a method for manufacturing an optical information recording medium having a process in which layers are formed on a substrate by a spin coat method using a center cap.

2. Description of the Related Art

In recent years and continuing to the present, there have been proposed high-density optical information recording media that reproduce and/or record information signals when irradiated with light from the side where the information layer of a substrate is formed. FIG. 1 is a cross-sectional view showing the configuration of such an optical information recording medium having a double-layered structure. In FIG. 1, reference numerals 10, 11, 12, 13, 14, 15, 16, and 17 denote an optical information recording medium, a substrate, a reflecting and/or recording layer, an intermediate layer, a second reflecting and/or recording layer, a cover layer, laser light, and an objective lens, respectively.

In the optical information recording medium 10 shown in FIG. 1, the substrate 11 has a thickness of about 1.1 mm and is manufactured, for example, by injection-molding polycarbonate, etc. In addition, the substrate 11 has a structure in which predetermined pits and/or guide grooves are formed on its one surface. The reflecting and/or recording layer 12, the intermediate layer 13, the second reflecting and/or recording layer 14, and the cover layer 15 are successively laminated on the pits and/or guide grooves of the substrate 11.

The reflecting and/or recording layer 12 and the second reflecting and/or recording layer 14 are information layers made of aluminum alloy, etc. The second reflecting and/or recording layer 14 is configured to semi-transmit light so as to enable reproduction and/or recording of information signals with respect to the reflecting and/or recording layer 12 located far from the laser light 16. The reflecting and/or recording layer 12 has a thickness of, for example, 20 nm, and the second reflecting and/or recording layer 14 has a thickness of, for example, 8 nm.

The intermediate layer 13 separates the reflecting and/or recording layer 12 from the second reflecting and/or recording layer 14. On the front surface of the intermediate layer 13, pits and/or guide grooves similar to those of the substrate 11 are formed by a 2P transfer method using a UV curing resin, etc., and its thickness is, for example, 25 μm.

The cover layer 15 is made of a light-transmitting UV curing resin, etc., and has a thickness of, for example, 75 μm. The laser light 16 emitted from a light source (not shown) is condensed by the objective lens 17. The reflecting and/or recording layer 12 or the second reflecting and/or recording layer 14 is irradiated with the laser light 16 through the cover layer 15. In the following description, the reflecting and/or recording layer is called an information layer as occasion demands.

FIG. 2 is a view showing the appearance of the substrate 11 constituting the optical information recording medium 10. In FIG. 2, the same constituents as those of FIG. 1 are denoted by the same reference numerals and their descriptions are omitted. Reference numeral 11a denotes a center hole, and reference numeral 11b denotes a clamp part. As shown in FIG. 2, the substrate 11 constituting the optical information recording medium 10 shown in FIG. 1 has generally a circular form having the center hole 11a as a through-hole at its center. The clamp part 11b is provided at a predetermined area of the peripheral part of the center hole 11a and clamped when the substrate 11 completed as the optical information recording medium 10 is loaded into an information recording reproduction apparatus (not shown).

In the high-density optical information recording medium 10 shown in FIG. 1, it is necessary to form the cover layer 15 having a uniform film thickness on the substrate 11. Therefore, according to a proposed method, a UV curing resin is uniformly coated on the substrate 11 by a spin coat method and then cured, whereby the cover layer 11 having a uniform film thickness is formed on the substrate 11.

Referring to FIGS. 3A-3C through 15, a description is now made of a method for forming the intermediate layer 13 and the cover layer 15 by the spin coat method in the optical information recording medium 10 having a double-layered structure. FIGS. 3A through 3C show a conventional center cap 25 used for forming layers on the substrate 11 by the spin coat method. FIG. 3A is a cross-sectional view of the center cap 25, FIG. 3B is a front view thereof, and FIG. 3C is a bottom view thereof. The center cap 25 shown in FIGS. 3A through 3C has a fitting part 25c fitted in the center hole 11a of the substrate 11; a cone-shaped part 25b that is provided concentrically with the fitting part 25c, made parallel to the substrate 11 when the fitting part 25c is fitted in the center hole 11a of the substrate 11, and has an end surface 25e that is an annular-shaped plane having a diameter larger than that of the fitting part 25c; and a cylindrical-shaped projection part 25a provided concentrically with the cone-shaped part 25b at the upper part of the cone-shaped part 25b.

The whole surface of the end surface 25e, which is brought into contact with the substrate 11, is a flat annular-shaped plane part. Although a slight gap is caused when the end surface 25e of the center cap 25 is brought into contact with the substrate 11, such a case is taken into consideration for descriptive purposes. Note that in FIGS. 3A through 3C, $R_1$ denotes the radius of the center cap 25.

FIGS. 4 through 15 are cross-sectional views for explaining a conventional method for forming the intermediate layer 13 and the cover layer 15 by the spin coat method in the optical information recording medium 10 having the double-layered structure. In FIGS. 4 through 15, the same constituents as those of FIGS. 1 through 3A-3C are denoted by the same reference numerals and their descriptions are omitted. First, as shown in FIG. 4, the center hole 11a of the substrate 11, on which aluminum alloy, etc., are sputtered as the reflecting and/or recording layer 12, is mounted on a rotating table 21 serving as a rotatable mounting board so as to be fitted in a substrate positioning part 22. As a result, the fitting part 25c of the center cap 25 shown in FIGS. 3A through 3C is fitted in the center hole 11a of the substrate 11.

Next, as shown in FIG. 5, a UV curing resin 33 is coated at the central part of the substrate 11, and then the rotating table 21 is rotated. As a result, as shown in FIG. 6, the intermediate layer 13, which is made of the UV curing resin 33 having a uniform film thickness, is formed on the substrate 33. Then, as shown in FIG. 7, the center cap 25 is removed upward. After that, as shown in FIG. 8, a transparent stamper 34 having predetermined pits and/or guide grooves formed at its lower surface 34b, is mounted on the intermediate layer 13. Moreover, as shown in FIG. 9, UV light 35 is radiated from above an upper surface 34a of the stamper 34, while the predetermined pits and/or guide grooves are transferred from the transparent stamper 34 to the intermediate layer 13. Then, as shown in FIG. 10, the stamper 34 is removed upward. The intermediate layer 13, on which the predetermined pits and/or guide grooves are formed, is thus formed.

Moreover, aluminum alloy, etc., are sputtered on the intermediate layer 13 to form the second reflecting and/or recording layer 14. After that, as shown in FIG. 11, the center hole 11a of the substrate 11 is mounted on the rotating table 21 so as to be fitted in the substrate positioning part 22, so that the fitting part 25c of the center cap 25 is fitted in the center hole 11a of the substrate 11. Subsequently, as shown in FIG. 12, the UV curing resin 33 is coated at the central part of the substrate 11, and then the rotating table 21 is rotated. As a result, as shown in FIG. 13, the cover layer 15, which is made of the UV curing resin 33 having a uniform film thickness, is formed on the substrate 11. Then, as shown in FIG. 14, the center cap 25 is removed upward and detached. After that, as shown in FIG. 15, the UV curing resin 33 is irradiated with the UV light 35 from above and cured. As a result, the cover layer 15 made of the UV curing resin 33 having the uniform film thickness is formed. The optical information recording medium 10 having the double-layered structure is thus completed (see, for example, Patent Documents 1 through 4).

Patent Document 1: JP-A-11-213459
Patent Document 2: JP-A-2004-95108
Patent Document 3: JP-A-2006-59454
Patent Document 4: JP-A-2006-331566

However, according to the conventional method for manufacturing the optical information recording medium 10 having the double-layered structure shown in FIGS. 4 through 15, as shown in FIG. 16 that is an enlarged view of FIG. 13, when the liquid UV curing resin 33 is dropped onto the center cap 25 to form the intermediate layer 13 and the cover layer 15, it penetrates into a slight gap T1 between the end surface 25e of the center cap 25 and the substrate 11 due to capillary action. Therefore, after the rotating table 21 is rotated, the liquid UV curing resin 33 is irradiated with the UV light 35 and cured. As a result, as shown in FIG. 17 that is an enlarged view of FIG. 15, slight concave and convex portions 13a and 15a may be formed on the clamp part 11b of the substrate 11, or convex portions 13b and 15b may be formed at the peripheral part (end part of the center cap 25) of the clamp part 11b in the intermediate layer 13 and the cover layer 15.

The convex portion 13b of the intermediate layer 13 formed at the peripheral part (end part of the center cap 25) of the clamp part 11b adversely affects the formation of the cover layer 15. Aluminum alloy, etc., are sputtered on the intermediate layer 13, on which the convex portion 13b is formed, to form the second reflecting and/or recording layer 14. After that, the UV curing resin 33 is dropped onto the center cap 25 as shown in FIG. 12 using the center cap 25 having the same radius $R_1$ as that used for forming the intermediate layer 13. Then, as shown in FIG. 13, when the rotating table 21 is rotated, the UV curing resin 33 is directly influenced by the convex portion 13b formed at the peripheral part (end part of the center cap 25) of the clamp part 11b and is not uniformly spread. Consequently, as shown in FIG. 18, multiple radial linear defects 36 are caused in the cover layer 15, which in turn degrades optical characteristics such as jitter and error rates caused at the time of reproduction and/or recording.

Such a problem cannot be solved, for example, by the center cap disclosed in Patent Document 3, of which a surface in contact with the substrate has a concave shape and which is structured to form a space between the center cap and the substrate. In other words, although the center cap disclosed in Patent Document 3 can improve the poor appearance of the clamp part in the optical information recording medium having a single-layered structure, Patent Document 3 does not specifically disclose a method for applying the center cap to the optical information recording medium having the double-layered structure.

In addition, the technique of changing the internal diameter of the intermediate layer and the cover layer, which is disclosed in Patent Document 4, is targeted for the optical information recording medium in which the intermediate layer is formed by bonding sheets together. Therefore, the technique cannot solve the above problem occurring when the intermediate layer and the cover layer are formed by the spin coat method using the center cap.

SUMMARY OF THE INVENTION

The present invention has been made in view of the above problem and may provide a method for manufacturing an optical information recording medium having a two-or-more-layered structure that makes it hard to form concave and convex portions on the clamp part of a substrate when layers are formed on the substrate by a spin coat method, reduces the occurrence rate of radial linear defects caused when the convex portion is formed at the peripheral part of the clamp part of the substrate, and is excellent in optical characteristics at the time of reproduction and/or recording.

In order to achieve the above object, the present invention may provide a method for manufacturing an optical information recording medium. The method comprises laminating plural layers successively on a substrate having a through-hole at its center; and fitting center caps each having a predetermined radius in the through-hole to form at least two of the plural layers by a spin coat method. A radius of a first center cap used for forming an upper layer of the at least two layers is larger than a radius of a second center cap used for forming a lower layer thereof.

According to the embodiments of the present invention, it is possible to provide a method for manufacturing an optical information recording medium having a two-or-more-layered structure that makes it hard to form concave and convex portions on the clamp part of a substrate when layers are formed on the substrate by a spin coat method, reduces the occurrence rate of radial linear defects caused when the convex portion is formed at the peripheral part of the clamp part of the substrate, and is excellent in optical characteristics at the time of reproduction and/or recording.

Other objects, features and advantages of the present invention will become more apparent from the following detailed description when read in conjunction with the accompanying drawings.

BRIEF DESCRIPTION OF THE DRAWINGS

FIG. 4 is a cross-sectional view (part 1) for explaining a conventional method in which an intermediate layer 13 and a cover layer 15 are formed by the spin coat method in an optical information recording medium 10 having the double-layered structure;

FIGS. 48A and 48B are views showing a center cap 27 according to the embodiment of the present invention used for forming layers on the substrate by the spin coat method;

FIG. 50 is a view showing a state in which a fitting part 27c of the center cap 27 is fitted in the center hole 110a of the substrate 110;

DETAILED DESCRIPTION OF THE PREFERRED EMBODIMENTS

Referring to the accompanying drawings, a description is made of the best mode for carrying out the embodiments of the present invention. Note that an optical information recording medium and a method for manufacturing the optical information recording medium according to the embodiments of the present invention can be applied to a recordable optical information recording medium such as a BD-R, a rewritable optical information recording medium such as a BD-RE, and a play-only optical information recording medium such as a BD-ROM. In the following description, however, a play-only optical information recording medium is used in the embodiments as an example.

First Embodiment

Figure 1:
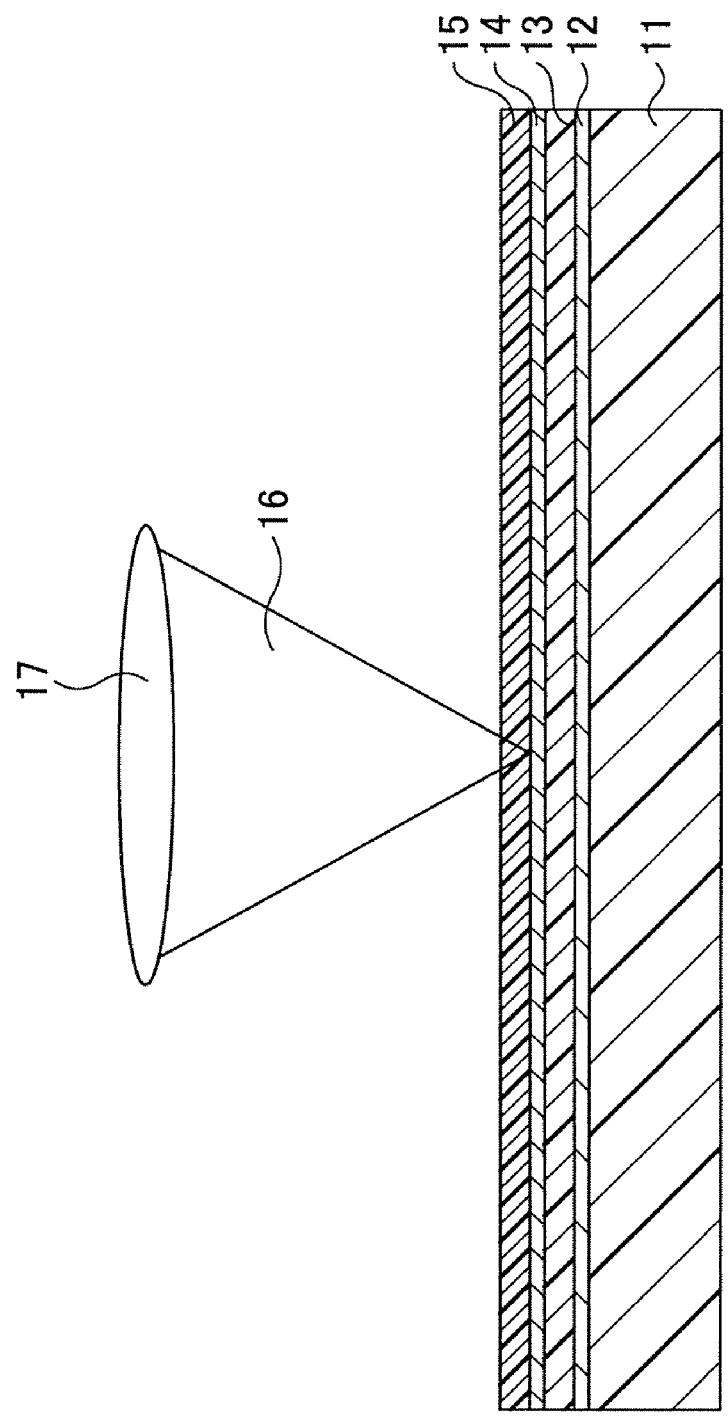
FIG. 1 is a cross-sectional view showing the configuration of an optical information recording medium having a double-layered structure, which reproduces and/or records information signals when irradiated with light from the side where the information layer of a substrate is formed.
Figure 2:
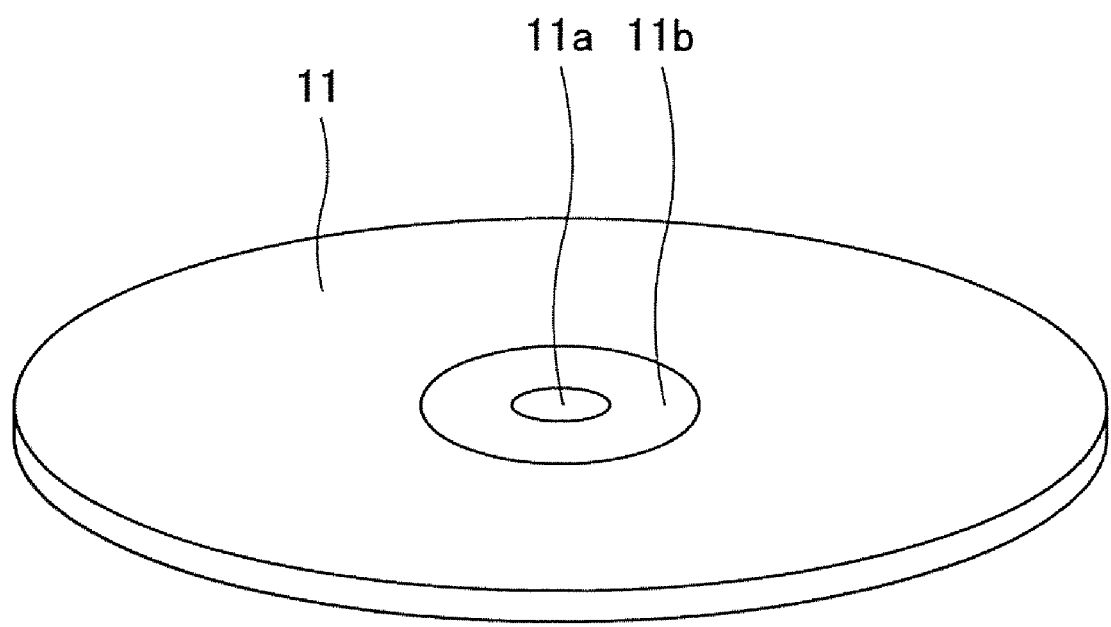
FIG. 2 is a view showing the appearance of the substrate constituting the optical information recording medium.
Figure 19:
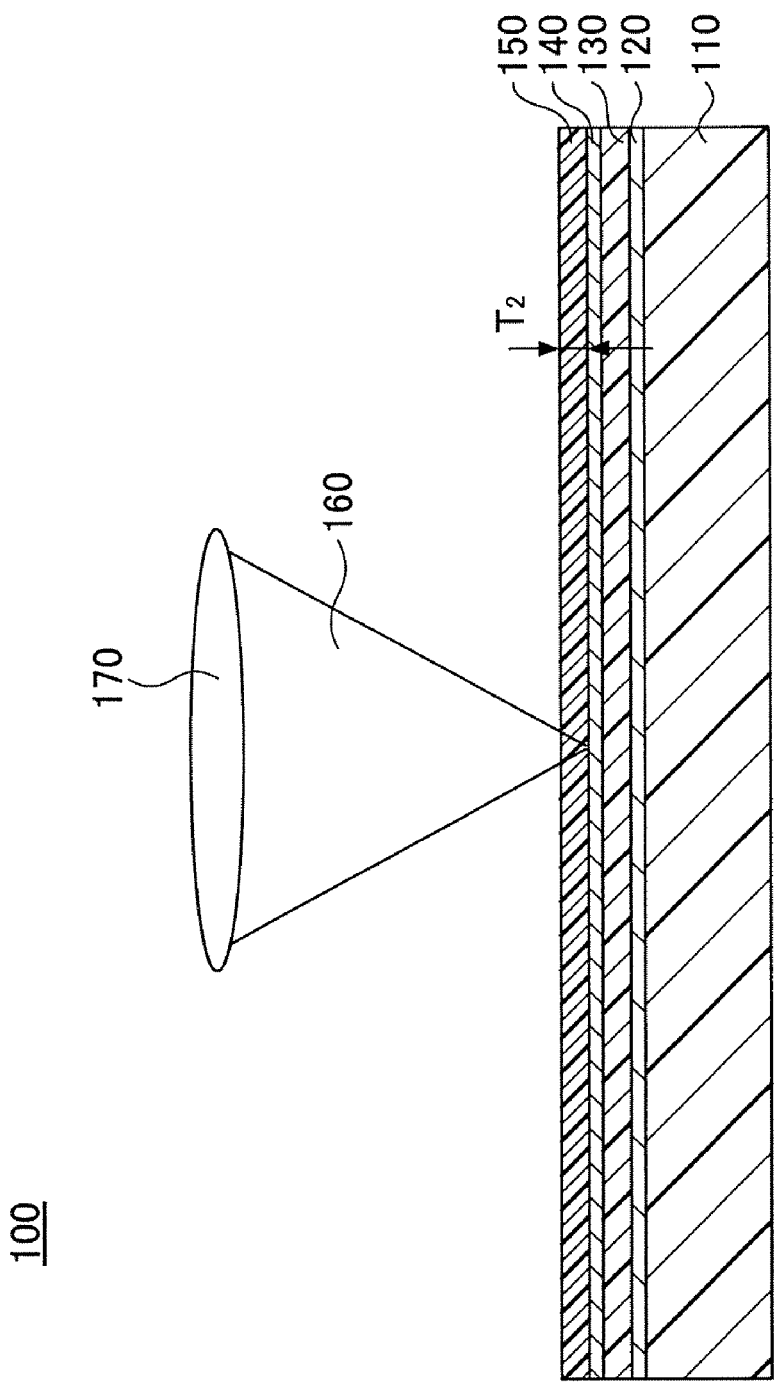
FIG. 19 is a cross-sectional view showing an optical information recording medium 100 according to a first embodiment of the present invention.

FIG. 19 is a cross-sectional view showing an optical information recording medium 100 according to a first embodiment of the present invention. In the optical information recording medium 100 shown in FIG. 19, a substrate 110 has a thickness of about 1.1 mm and manufactured by injection-molding polycarbonate. In addition, the substrate 110 has a structure in which predetermined pits are formed on its one surface. Although the appearance of the substrate 110 is omitted in FIG. 19 because it is similar to that of the substrate 11 shown in FIG. 2, the substrate 110 has a circular form having a center hole 110a as a through-hole at its center. A clamp part 110b is provided at a predetermined area of the peripheral part of the center hole 110a and clamped when the substrate 110 completed as the optical information recording medium 100 is loaded into an information recording reproduction apparatus.

A reflecting layer 120, an intermediate layer 130, a second reflecting layer 140, and a cover layer 150 are successively laminated on the pits of the substrate 110. The reflecting layer 120 and the second reflecting layer 140 are information layers made of aluminum alloy, etc. The second reflecting layer 140 is configured to semi-transmit light so as to enable reproduction and/or recording of information signals with respect to the reflecting layer 120 located far from laser light 160. The reflecting layer 120 has a thickness of, for example, 20 nm, and the second reflecting layer 140 has a thickness of, for example, 8 nm.

The intermediate layer 130 separates the reflecting layer 120 from the second reflecting layer 140. On the front surface of the intermediate layer 130, pits similar to those of the substrate 110 are formed by a 2P transfer method using a UV curing resin, etc., and its thickness is, for example, 25 μm.

The cover layer 150 is made of a light-transmitting UV curing resin and has a thickness of, for example, 75 μm. The laser light 160 emitted from a light source (not shown) is condensed by an objective lens 170. The reflecting layer 120 or the second reflecting layer 140 is irradiated with the laser light 160 through the cover layer 150.

In order to read information recorded on the information recording part of this optical information recording medium of a high-density recording type, an optical system having a large numerical aperture (NA) is used. As a result, a reproduction signal may be greatly degraded even by slight concave and convex portions on the front surface of the cover layer 150 and a small amount of air bubbles inside the cover layer 150. Therefore, the cover layer 150 is so configured that its front surface covering the reflecting layer 120, etc., is formed into a smooth surface having no inclination and air bubbles never remain inside it.

Moreover, in order to correctly read information from the reflecting layer 120, etc., a distance (thickness of the cover layer 150) $T_2$ from the front surface of the cover layer 150 to the second reflecting layer 140 is set to be much thinner than 0.6 mm, the thickness of a substrate on the side of an information reading surface in a conventional optical information recording medium (such as a DVD), and a difference in film thickness between the inner circumference and the outer circumference of the cover layer 150 is set to be 3 μm or smaller with great precision under a predetermined value (75 μm) corresponding to the wavelength (405 nm) of the laser light 160, the numerical aperture (0.85) of the objective lens 170, and the refractive index (about 1.5) of the cover layer 150.

Figure 20:
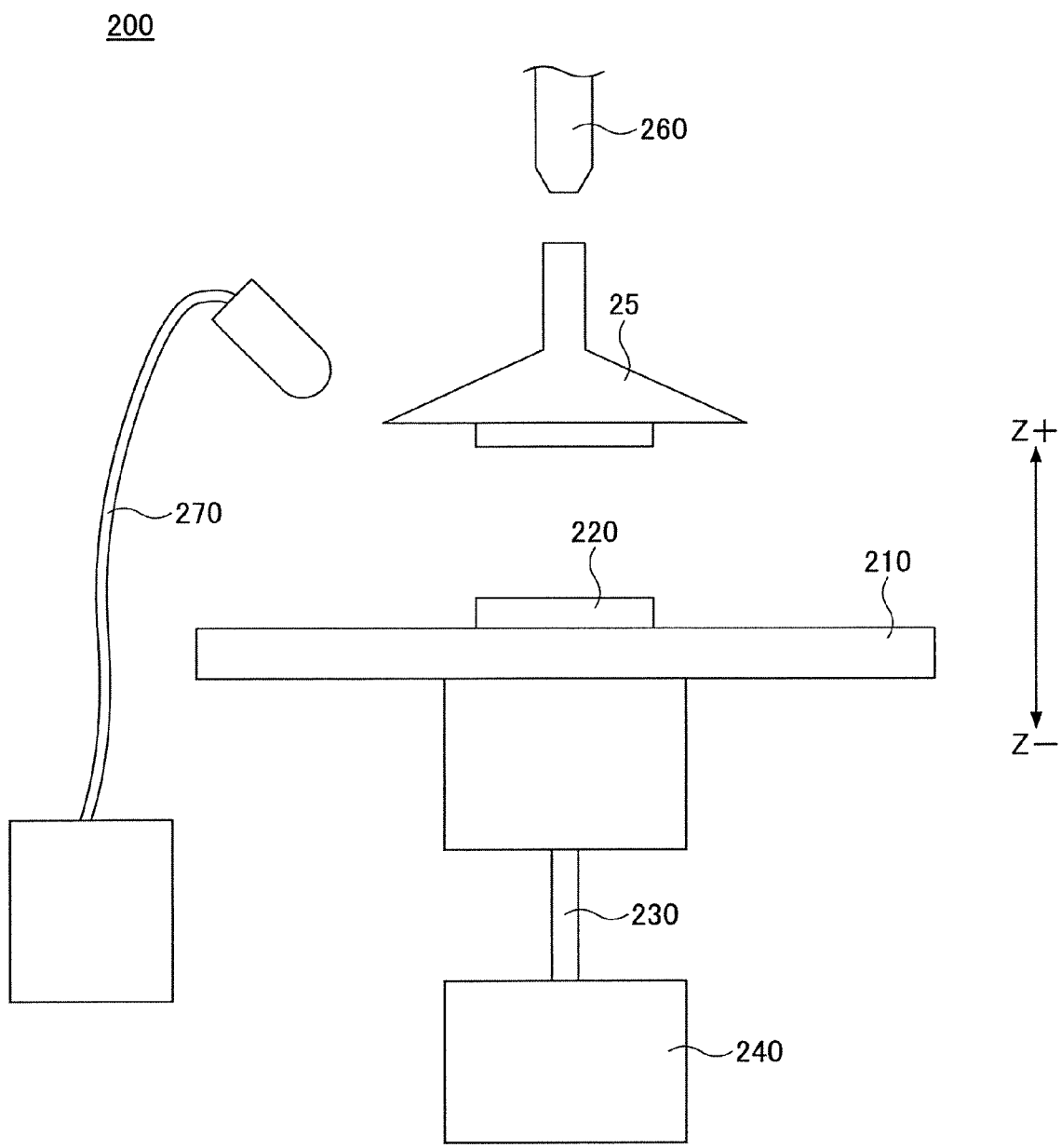
FIG. 20 is a view showing the schematic configuration of a manufacturing apparatus 200 for the optical information recording medium 100 according to the embodiments of the present invention.

FIG. 20 is a view showing the schematic configuration of a manufacturing apparatus 200 for the optical information recording medium 100 according to the embodiments of the present invention. As shown in FIG. 20, the manufacturing apparatus 200 is a spin-coating apparatus having a rotating table 210, a substrate positioning part 220, a rotating shaft 230, a driving motor 240, a center cap 25, a UV curing resin supplying nozzle 260, and a UV irradiator 270.

The rotating table 210 has the substrate 110 mounted thereon so as to make the center hole 110a (not shown) of the substrate 110, on which the reflecting layer 120 made of metal such as aluminum is laminated, fitted in the substrate positioning part 220. The rotating table 210 supports the substrate 110 from its lower side. Furthermore, the rotating table 210 is connected to the driving motor 240 through the rotating shaft 230 and is rotated as high as, for example, about 30,000 rpm in accordance with the rotation of the driving motor 240. The center cap 25 is capable of moving in the Z direction and disposed so as to be fitted in the center hole 110a (not shown) of the substrate 110 mounted on the rotating table 210 when moved in the Z-direction.

The UV curing resin supplying nozzle 260 is a material supplying part that supplies a UV curing resin and disposed above the rotating table 210 in a manner capable of moving close to the rotating table 210. The UV irradiator 270 cures a UV curing resin and disposed above the rotating table 210 so as to move close to the rotating table 210. Furthermore, the manufacturing apparatus 200 has a sucking mechanism (not shown) including a sucking passage and a sucking hole, by which the substrate 110 mounted on the rotating table 210 are sucked, fixed, and held.

Referring to FIGS. 21 through 32, a description is now made of the method for manufacturing the optical information recording medium 100 according to the first embodiment of the present invention. Note that the same constituents as those of FIGS. 19 and 20 are denoted by the same reference numerals and their descriptions are omitted. First, a plastic resin such as polycarbonate is injection-molded, pressure-molded, etc., using a stamper on which pits are formed. In this way, the pits are transferred onto the substrate 110. Next, aluminum, etc., are laminated on the substrate 110, on which the concave and convex portions of the pits are formed, by a sputtering method, a vacuum deposition method, etc. Accordingly, the reflecting layer 120 as a recording reflecting film is formed on the substrate 110. In addition, a center cap 25A for forming the intermediate layer 130 and a center cap 25B for forming the cover layer 150 that has a radius $R_1$ larger than that of the center cap 25A for forming the intermediate layer 130 are prepared.

Figure 21:
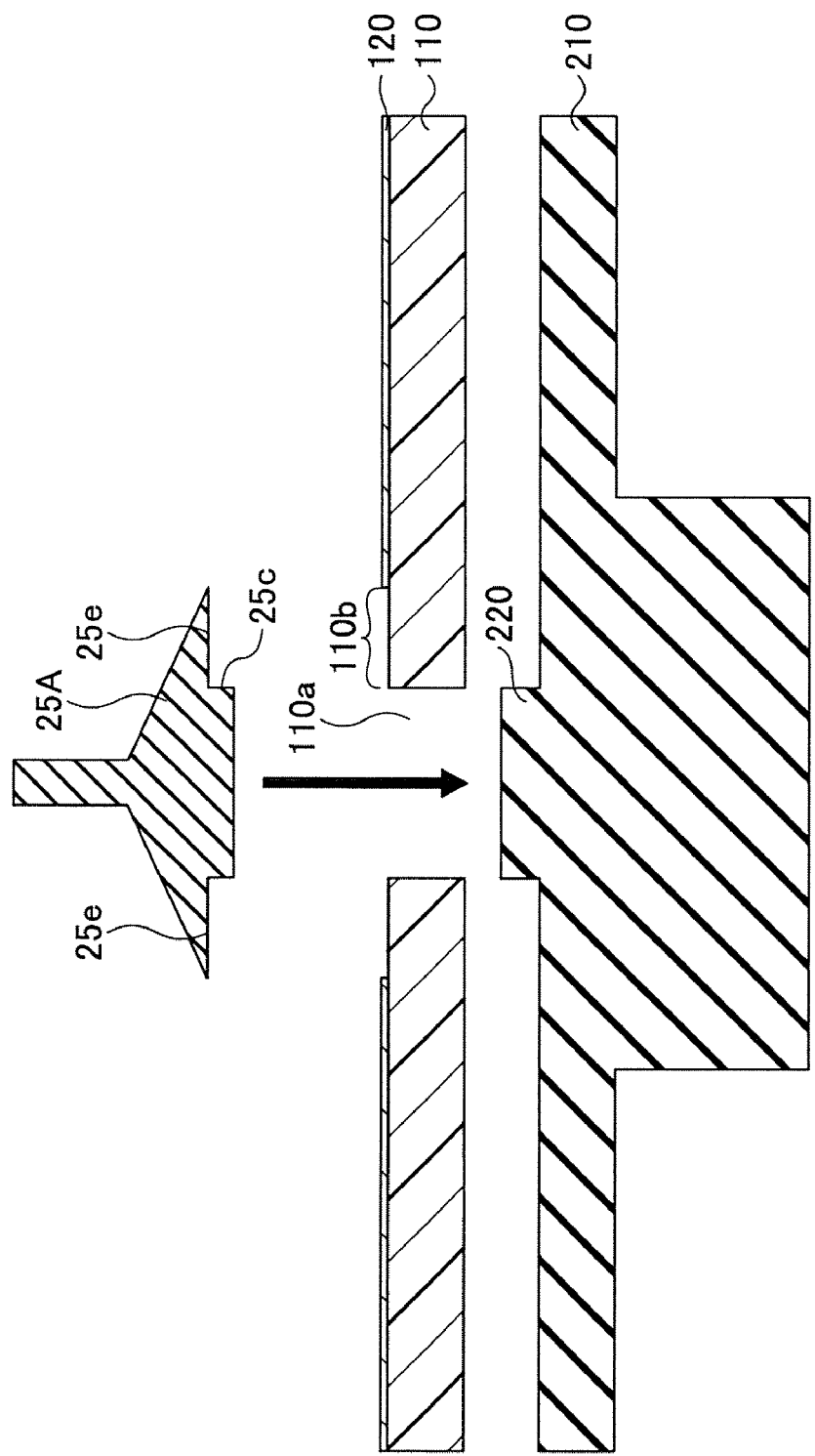
FIG. 21 is a cross-sectional view (part 1) for explaining a method for manufacturing the optical information recording medium 100 according to the first embodiment of the present invention.

Then, as shown in FIG. 21, the substrate 110 is mounted on the rotating table 210 so as to make the center hole 110a fitted in the substrate positioning part 220. Subsequently, negative pressure is caused to act on the sucking hole through the sucking passage (not shown), to suck, fix, and hold the substrate 110 mounted on the rotating table 210. After that, a fitting part 25c of the center cap 25A for forming the intermediate layer 130 is fitted in the center hole 110a of the substrate 110.

Figure 22:
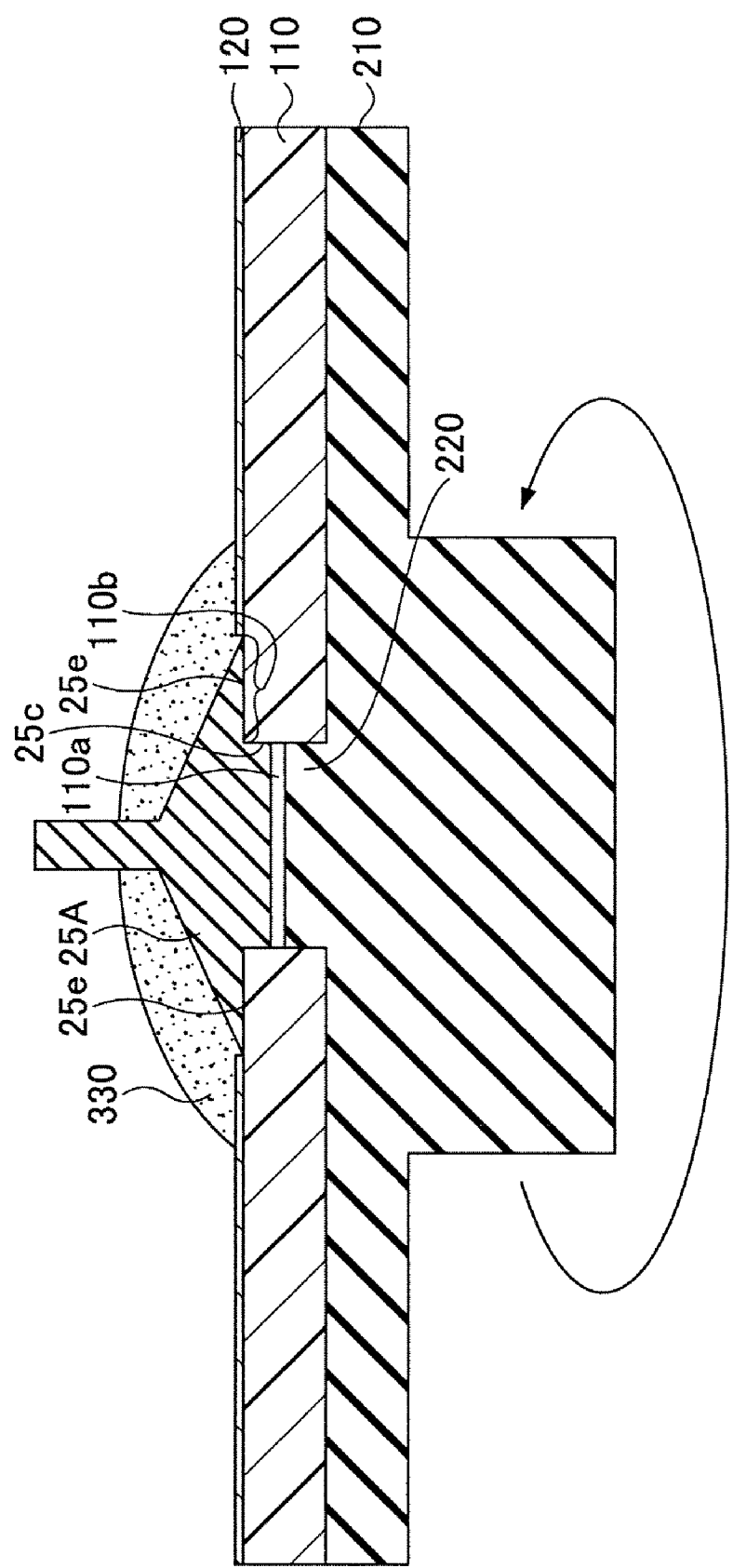
FIG. 22 is a cross-sectional view (part 2) for explaining the method for manufacturing the optical information recording medium 100 according to the first embodiment of the present invention.
Figure 23:
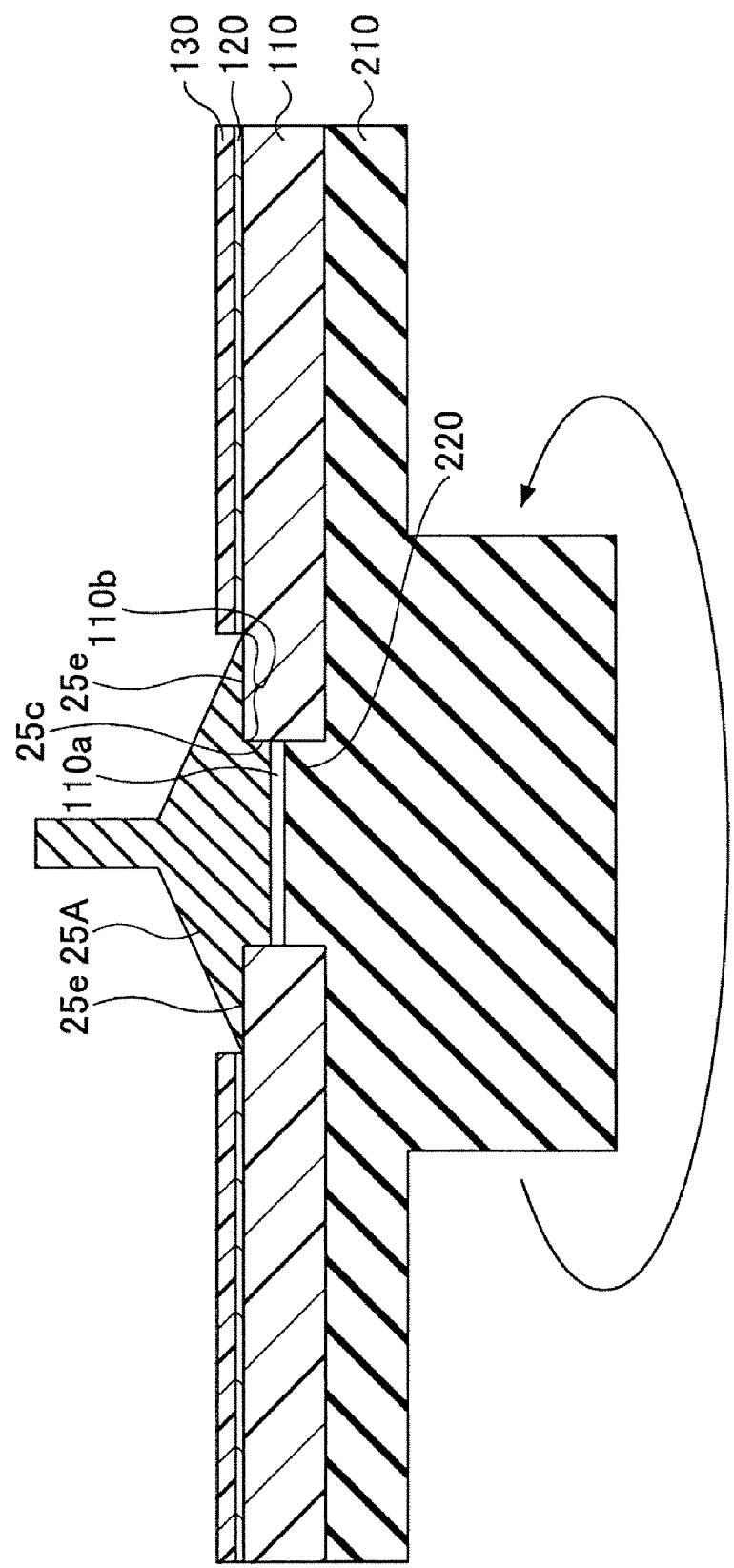
FIG. 23 is a cross-sectional view (part 3) for explaining the method for manufacturing the optical information recording medium 100 according to the first embodiment of the present invention.

Next, as shown in FIG. 22, a liquid UV curing resin 330 as a material for forming the intermediate layer 130 is ejected on the center cap 25A through the UV curing resin supplying nozzle 260. After that, the driving motor 240 is actuated to rotate the rotating table 210 at a predetermined rotating speed. As a result, as shown in FIG. 23, the uniform intermediate layer 130 made of the UV curing resin 330 is formed on the reflecting layer 120.

Figure 24:
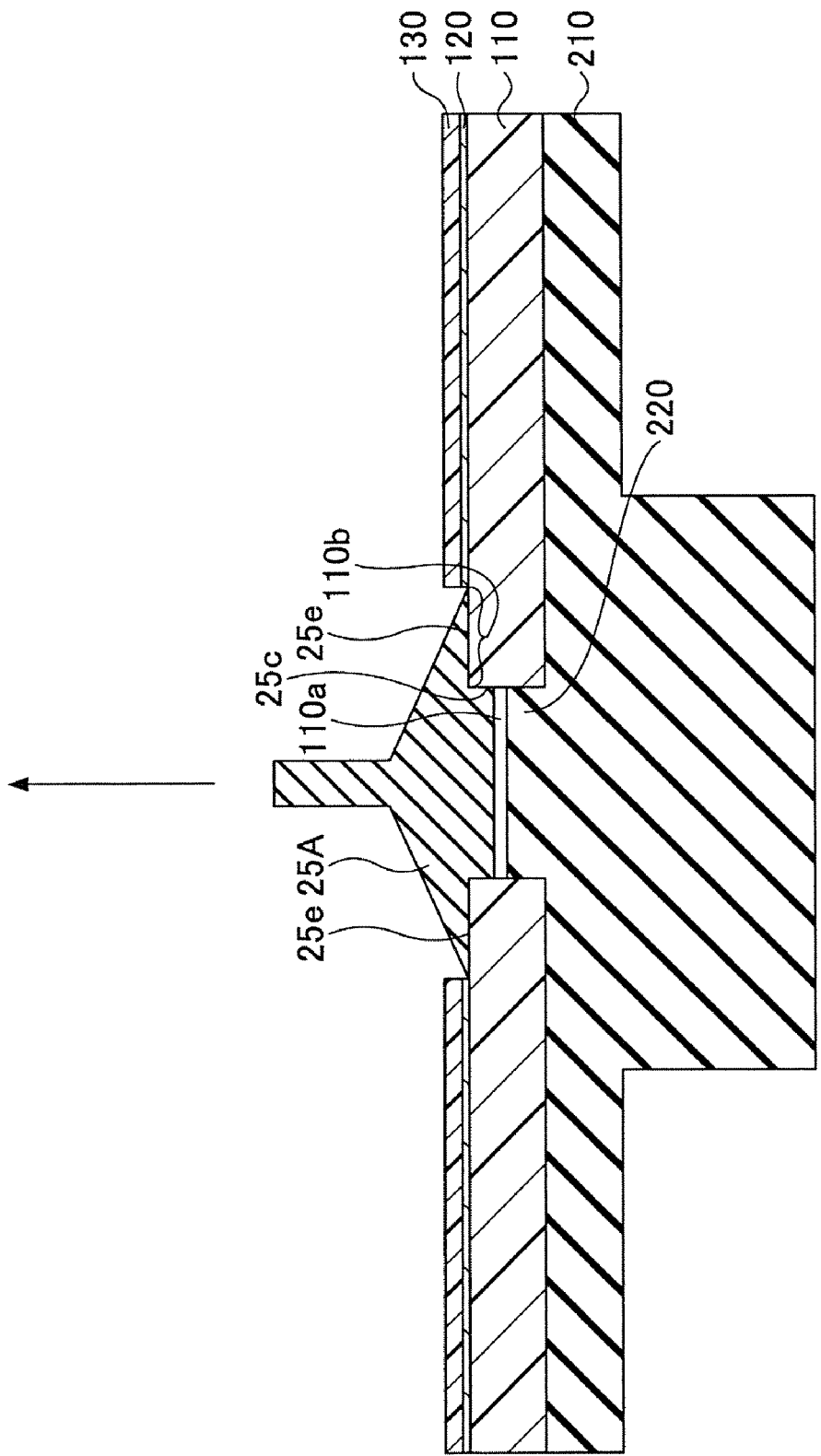
FIG. 24 is a cross-sectional view (part 4) for explaining the method for manufacturing the optical information recording medium 100 according to the first embodiment of the present invention.
Figure 25:
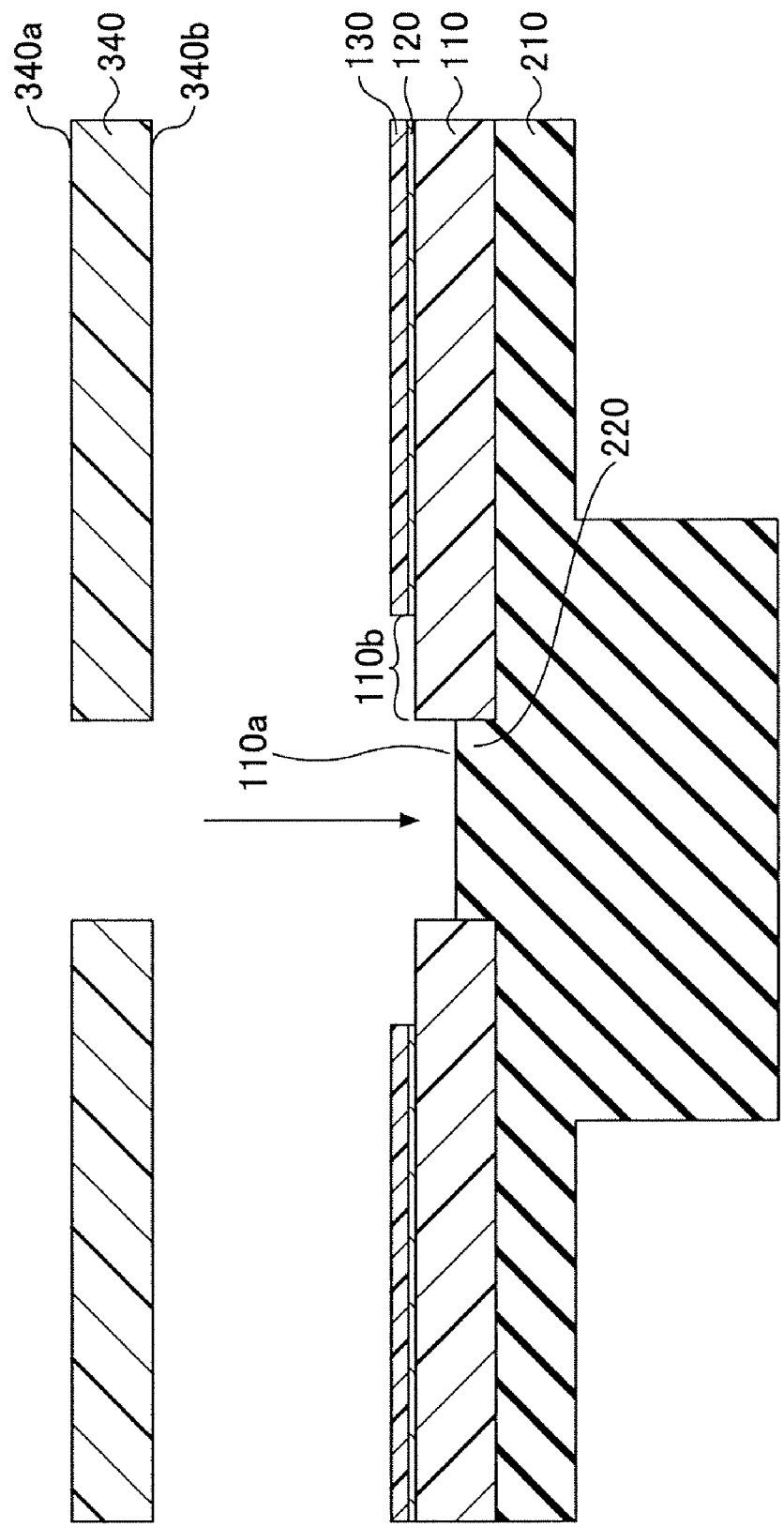
FIG. 25 is a cross-sectional view (part 6) for explaining the method for manufacturing the optical information recording medium 100 according to the first embodiment of the present invention.
Figure 26:
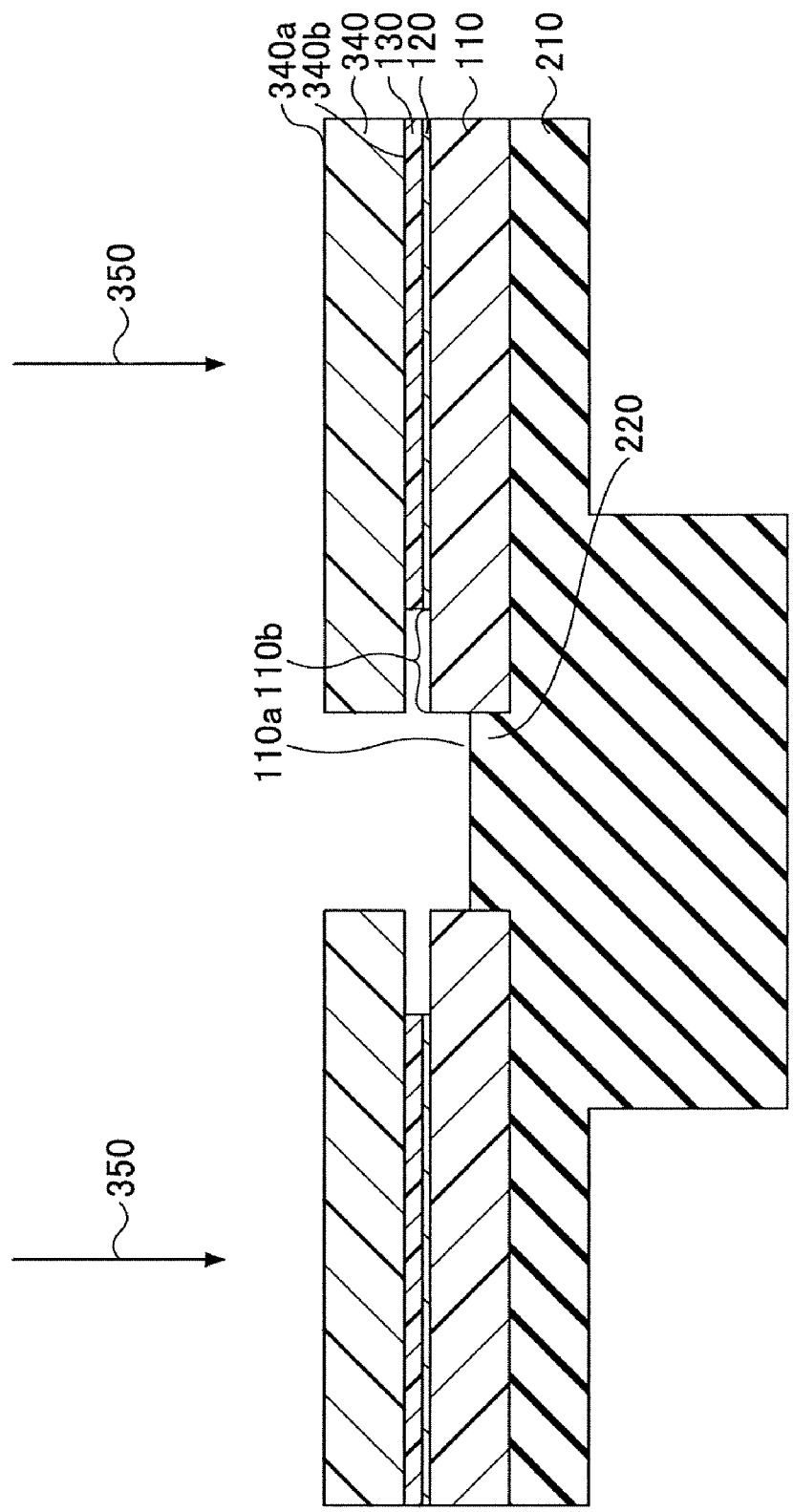
FIG. 26 is a cross-sectional view (part 5) for explaining the method for manufacturing the optical information recording medium 100 according to the first embodiment of the present invention.
Figure 27:
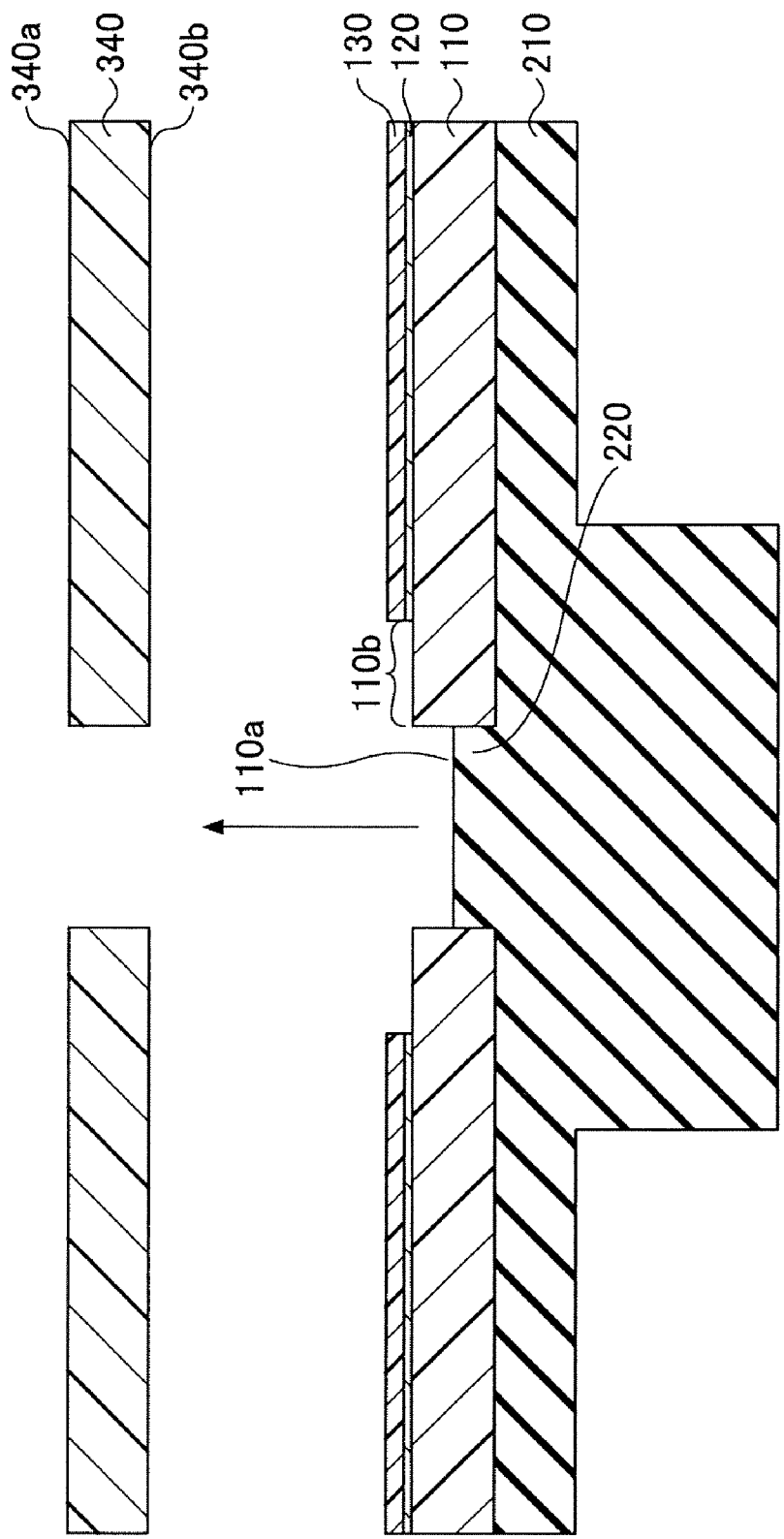
FIG. 27 is a cross-sectional view (part 7) for explaining the method for manufacturing the optical information recording medium 100 according to the first embodiment of the present invention.

Then, as shown in FIG. 24, the center cap 25A is removed upward from the substrate 110. After that, as shown in FIG. 25, a light-transmitting stamper 340 having predetermined pits formed at its lower surface 340b is mounted on the intermediate layer 130. Subsequently, as shown in FIG. 26, UV light 350 is radiated from above an upper surface 340a of the stamper 340 by the UV irradiator 270 to cure the UV curing resin 330, while the pits are transferred from the light-transmitting stamper 340 to the intermediate layer 130. Then, as shown in FIG. 27, the stamper 340 is removed upward. In this way, the concave and convex portions of the pits are formed on the intermediate layer 130.

Figure 28:
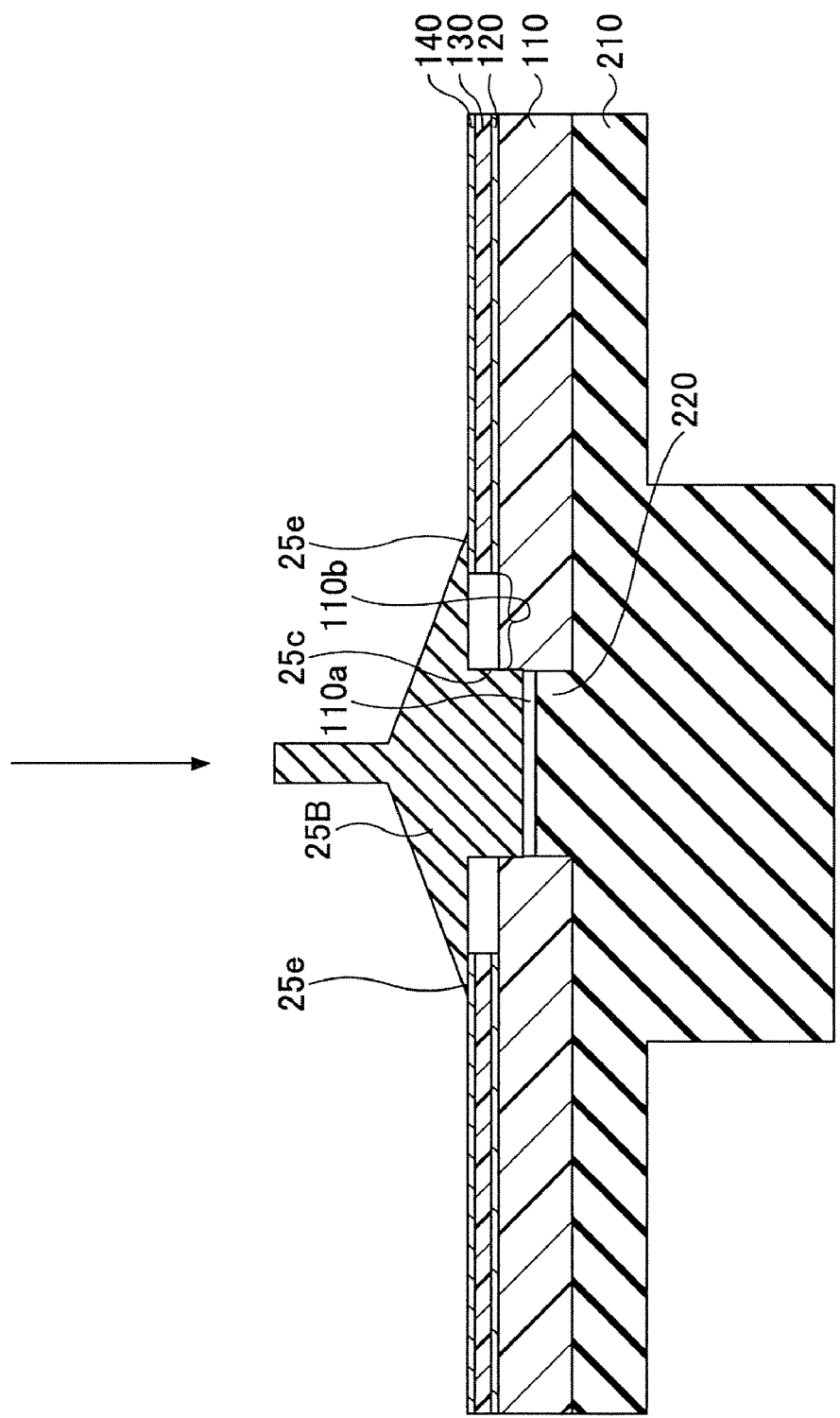
FIG. 28 is a cross-sectional view (part 8) for explaining the method for manufacturing the optical information recording medium 100 according to the first embodiment of the present invention.

Moreover, aluminum, etc., having a thickness to the extent that partially transmits light is laminated on the intermediate layer 130 by the sputtering method, etc., to form the second reflecting layer 140 on it. After that, as shown in FIG. 28, the substrate 110 is mounted on the rotating table 210 again so as to make the center hole 110a fitted in the substrate positioning part 220. Then, the fitting part 25c of the center cap 25B for forming the cover layer 150, which has the radius $R_1$ larger than that of the center cap 25A, is fitted in the center hole 110a of the substrate 110.

Figure 29:
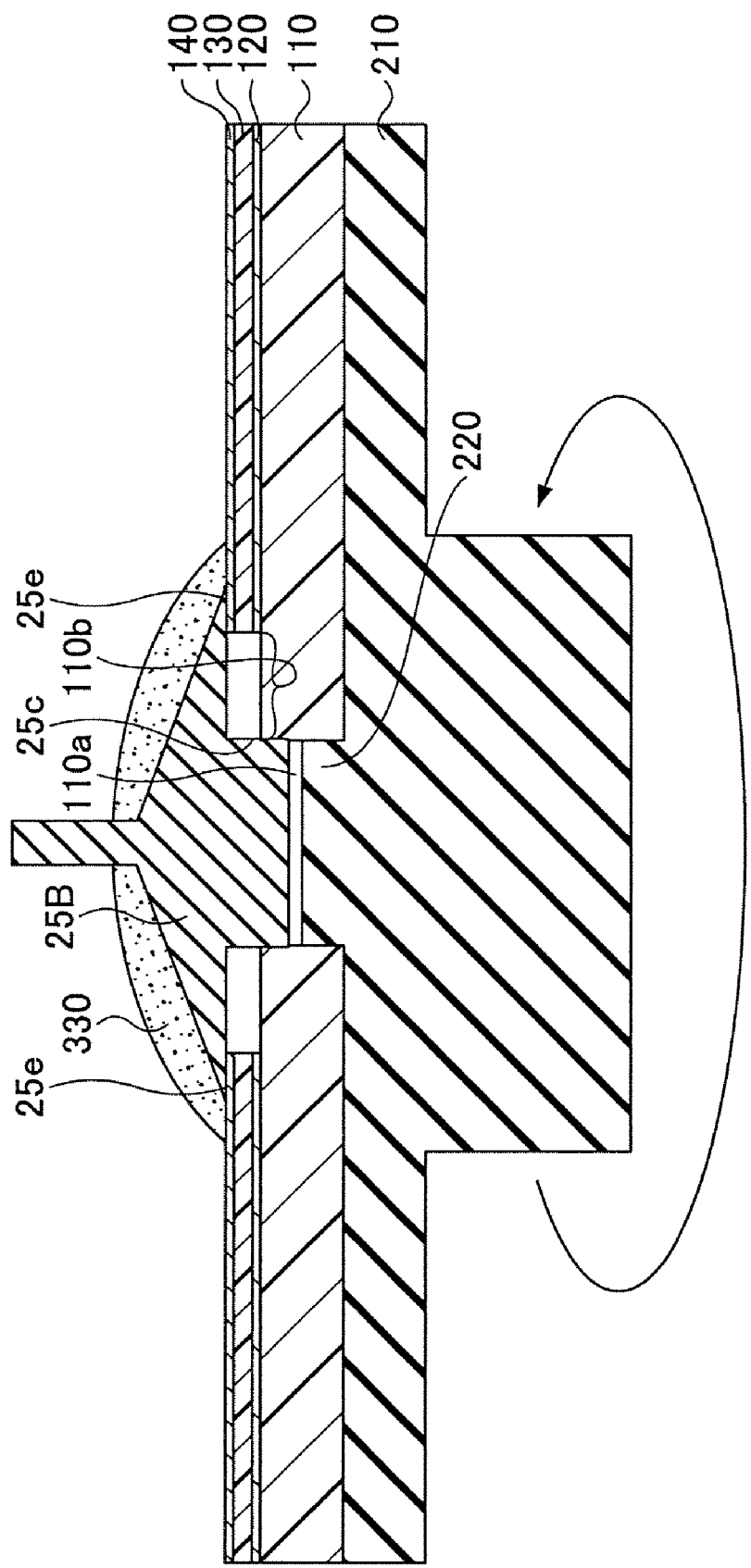
FIG. 29 is a cross-sectional view (part 9) for explaining the method for manufacturing the optical information recording medium 100 according to the first embodiment of the present invention.
Figure 30:
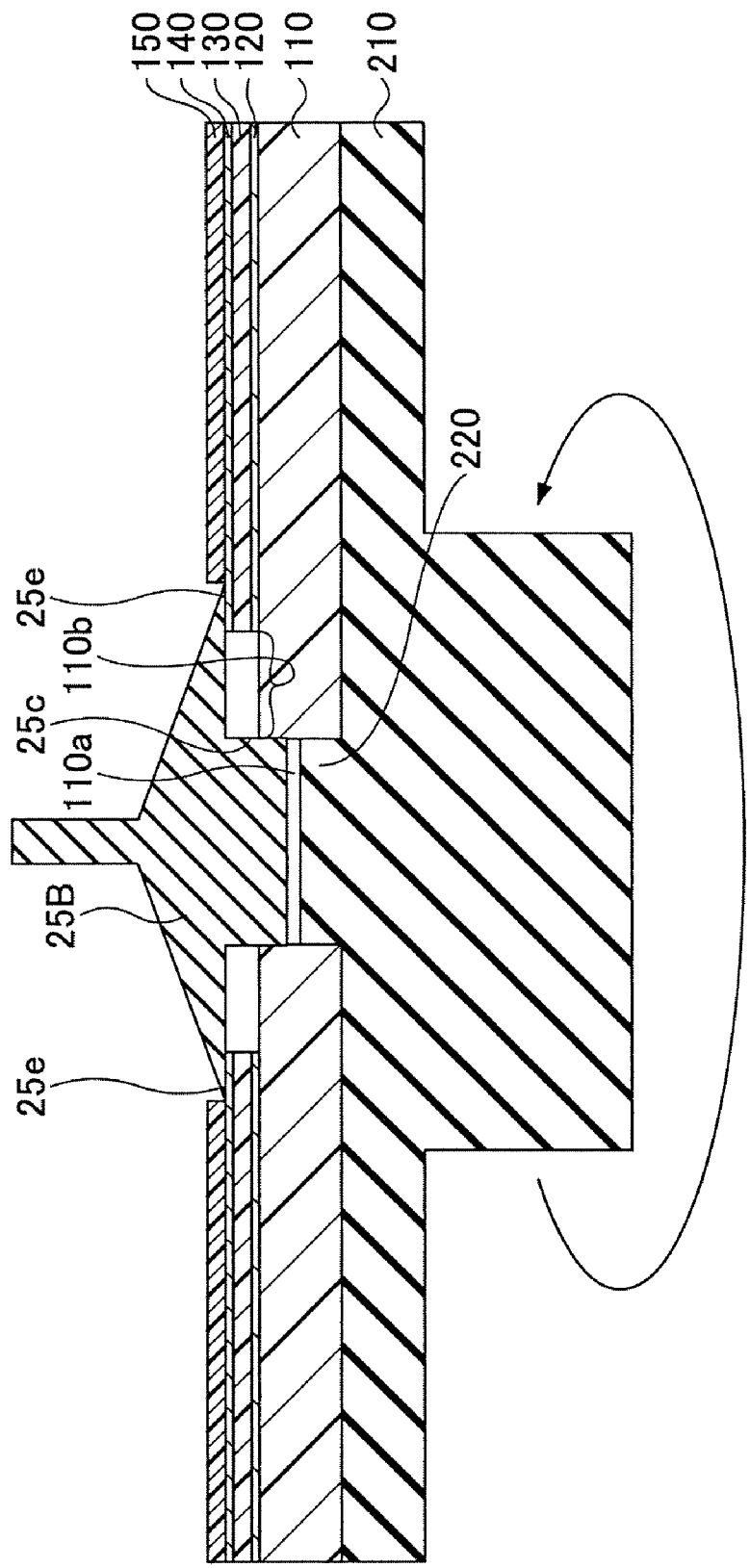
FIG. 30 is a cross-sectional view (part 10) for explaining the method for manufacturing the optical information recording medium 100 according to the first embodiment of the present invention.
Figure 31:
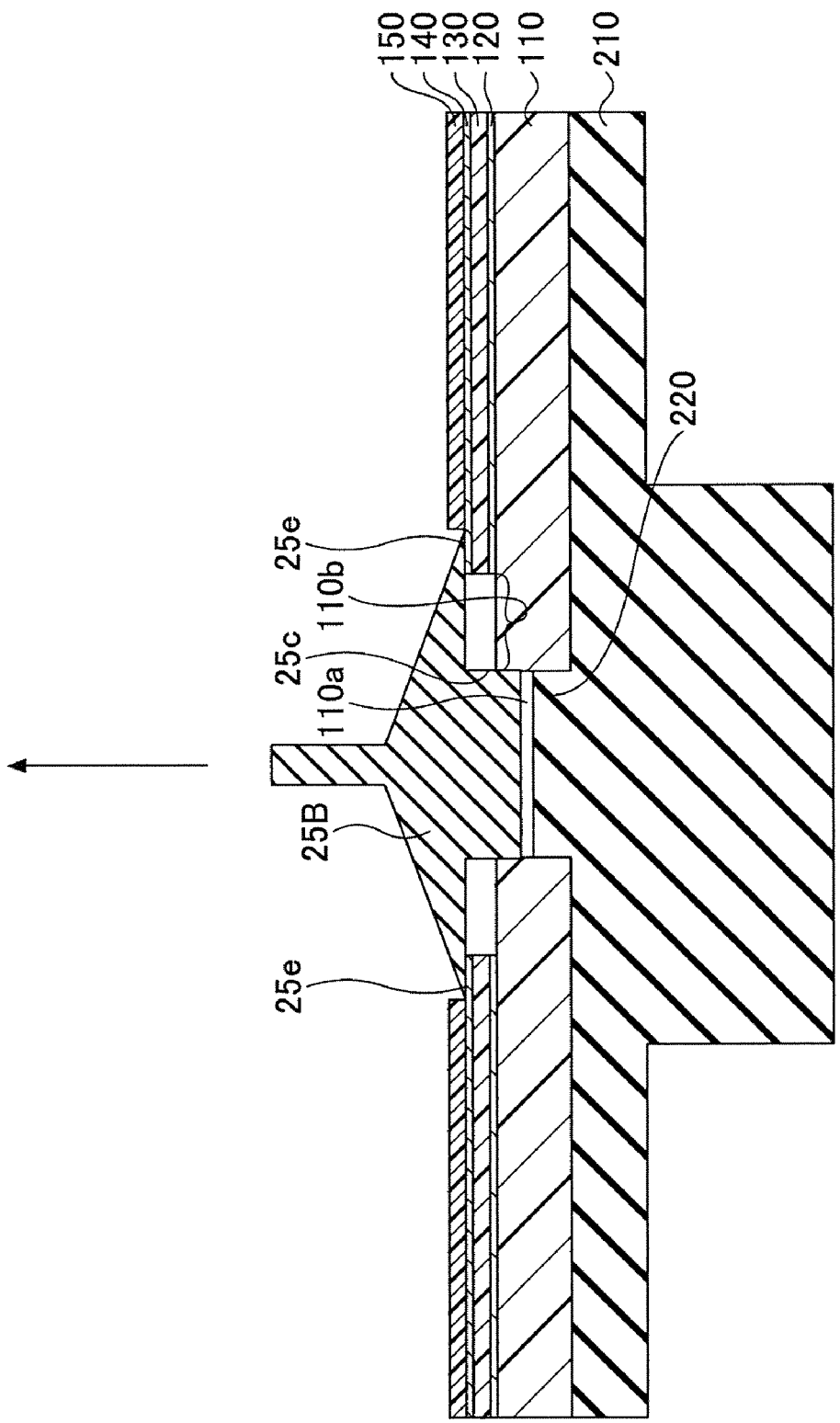
FIG. 31 is a cross-sectional view (part 11) for explaining the method for manufacturing the optical information recording medium 100 according to the first embodiment of the present invention.
Figure 32:
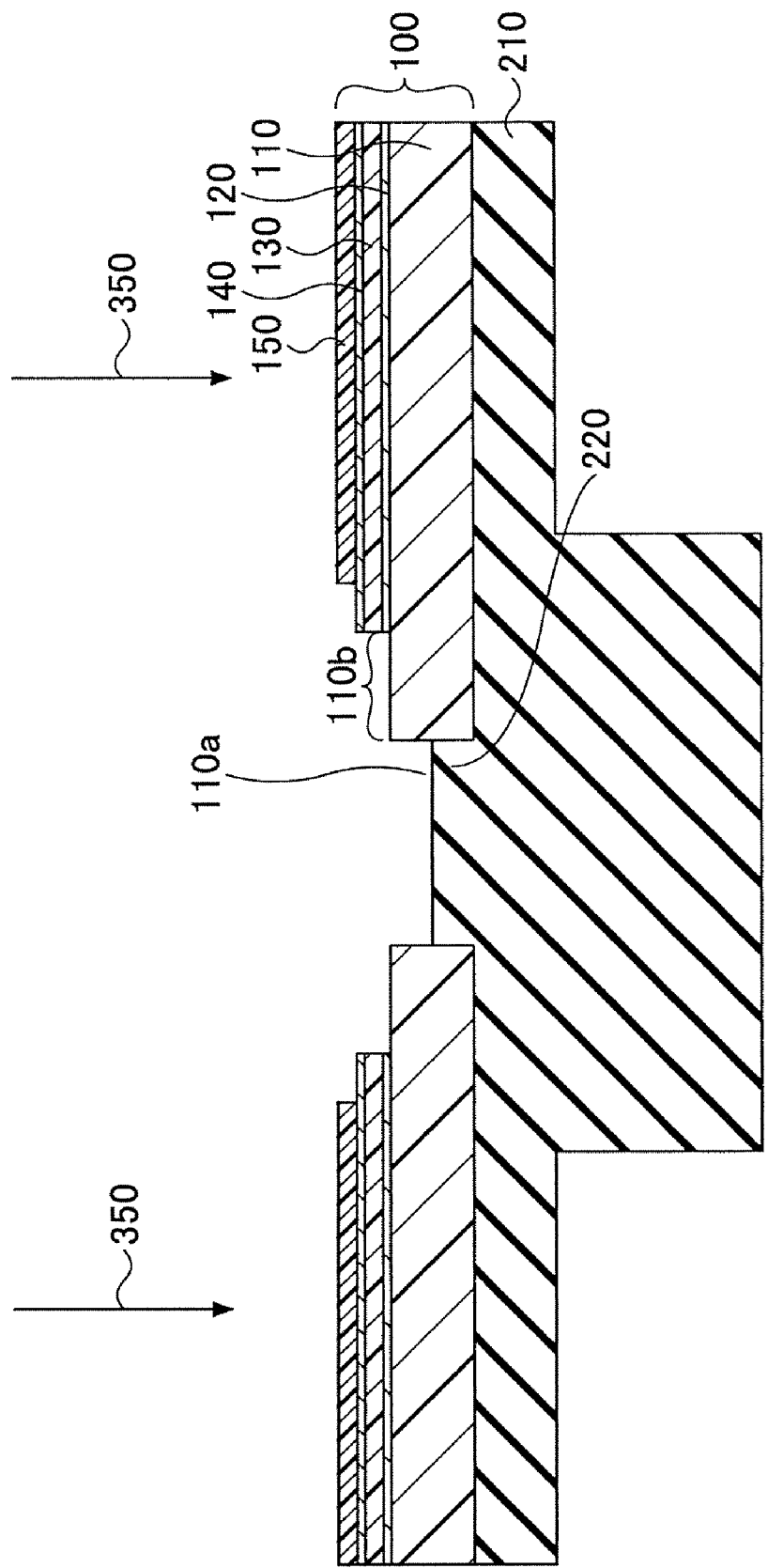
FIG. 32 is a cross-sectional view (part 12) for explaining the method for manufacturing the optical information recording medium 100 according to the first embodiment of the present invention.

Next, as shown in FIG. 29, after the UV curing resin 330 is coated at the central part of the substrate 110, the rotating table 210 is rotated. In this way, as shown in FIG. 30, the uniform cover layer 150 made of the UV curing resin 330 is formed on the substrate 110. After that, as shown in FIG. 31, the center cap 25B is removed upward. Then, as shown in FIG. 32, the UV light 350 is radiated from above the uniform cover layer 150 made of the UV curing resin 330 by the UV irradiator 270 to cure the UV curing resin 330. As a result, the cover layer 150 is formed. The optical information recording medium 100 according to the first embodiment of the present invention is thus completed.

Figure 33:
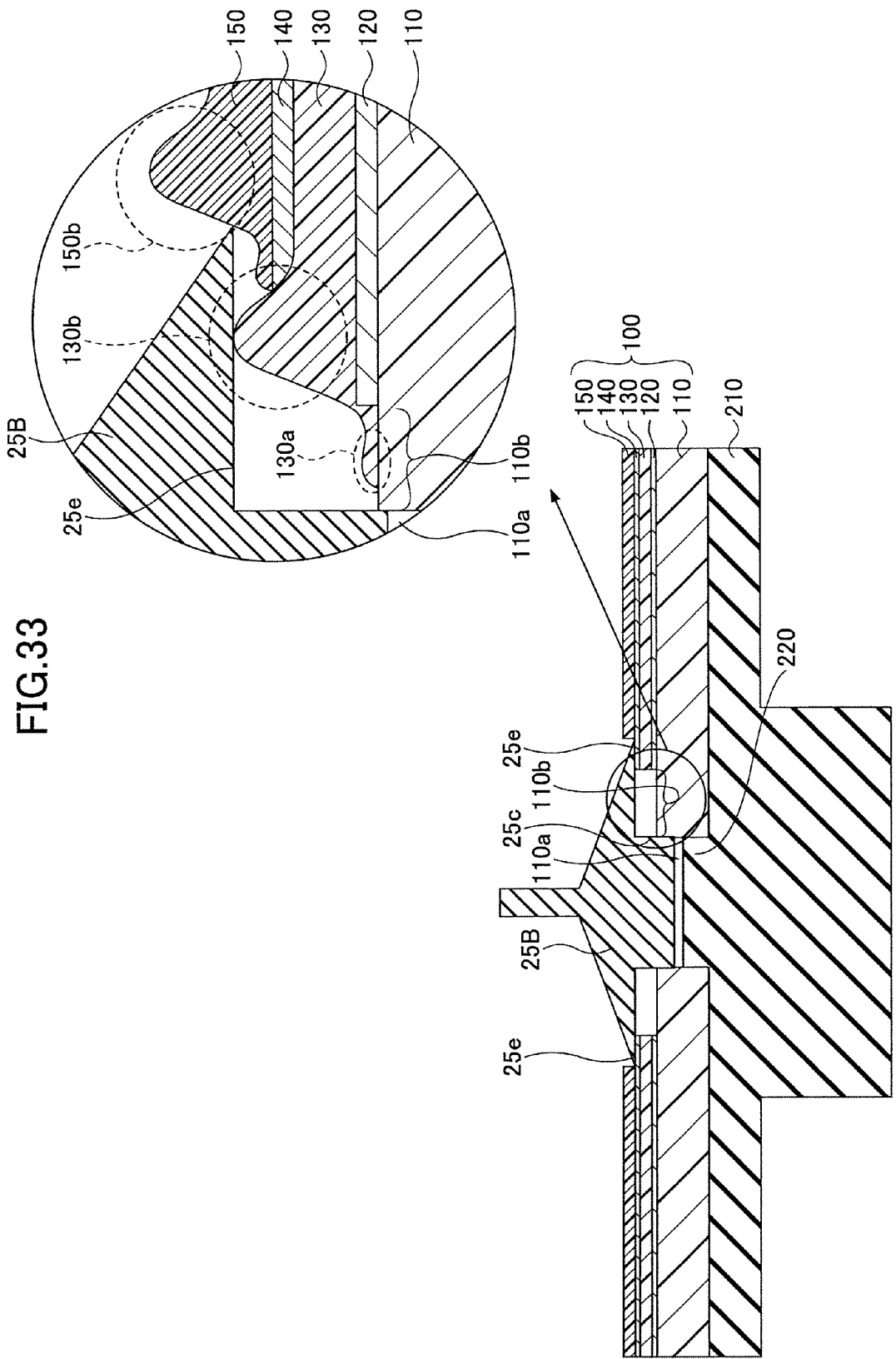
FIG. 33 is an enlarged view of the peripheral part of a clamp part 110b of a substrate 110 shown in FIG. 30.

FIG. 33 is an enlarged view of the peripheral part of the clamp part 110b of the substrate 110 shown in FIG. 30. Note here that the same constituents as those of FIG. 30 are denoted by the same reference numerals and their descriptions are omitted. In FIG. 33, reference numeral 130a denotes a concave and convex portion formed on the clamp part 110b, and reference numerals 130b and 150b denote convex portions formed at the peripheral part (end part of the center cap 25A and the center cap 25B) of the clamp part 110b.

Figure 18:
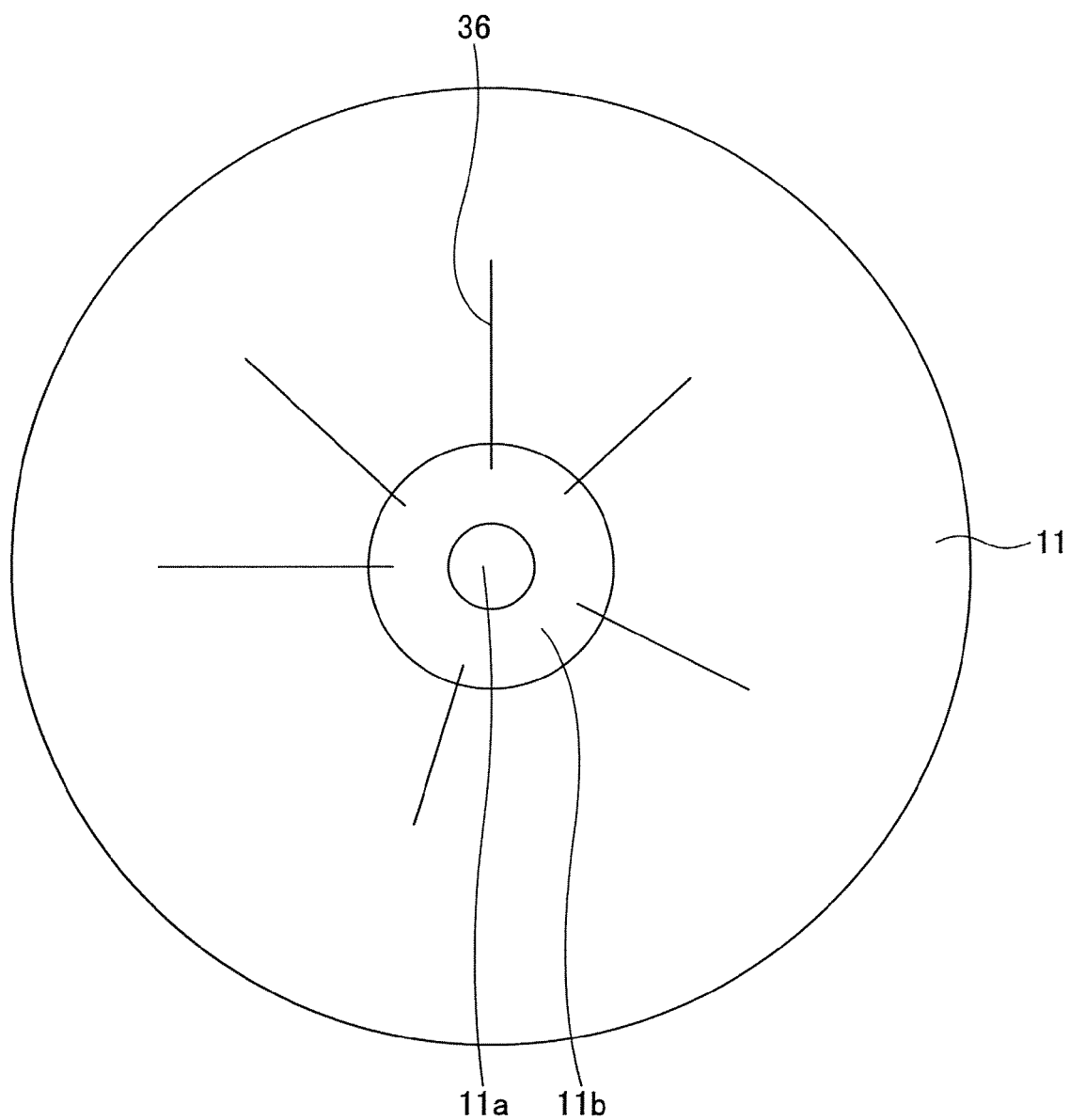
FIG. 18 is a view for explaining radial linear defects 36.

As shown in FIG. 33, the convex portion 130b formed at the peripheral part (end part of the center cap 25A) of the clamp part 110b caused when the intermediate layer 130 is formed is covered with the center cap 25B for forming the cover layer 150 having the radius $R_1$ larger than that of the center cap 25A for forming the intermediate layer 130. Accordingly, the UV curing resin 330 is uniformly spread without being influenced by the convex portion 130b formed at the peripheral part (end part of the center cap 25A) of the clamp part 110b. As a result, the occurrence rate of the radial linear defects 36 shown in FIG. 18 is substantially reduced in the cover layer 150.

Figure 34:
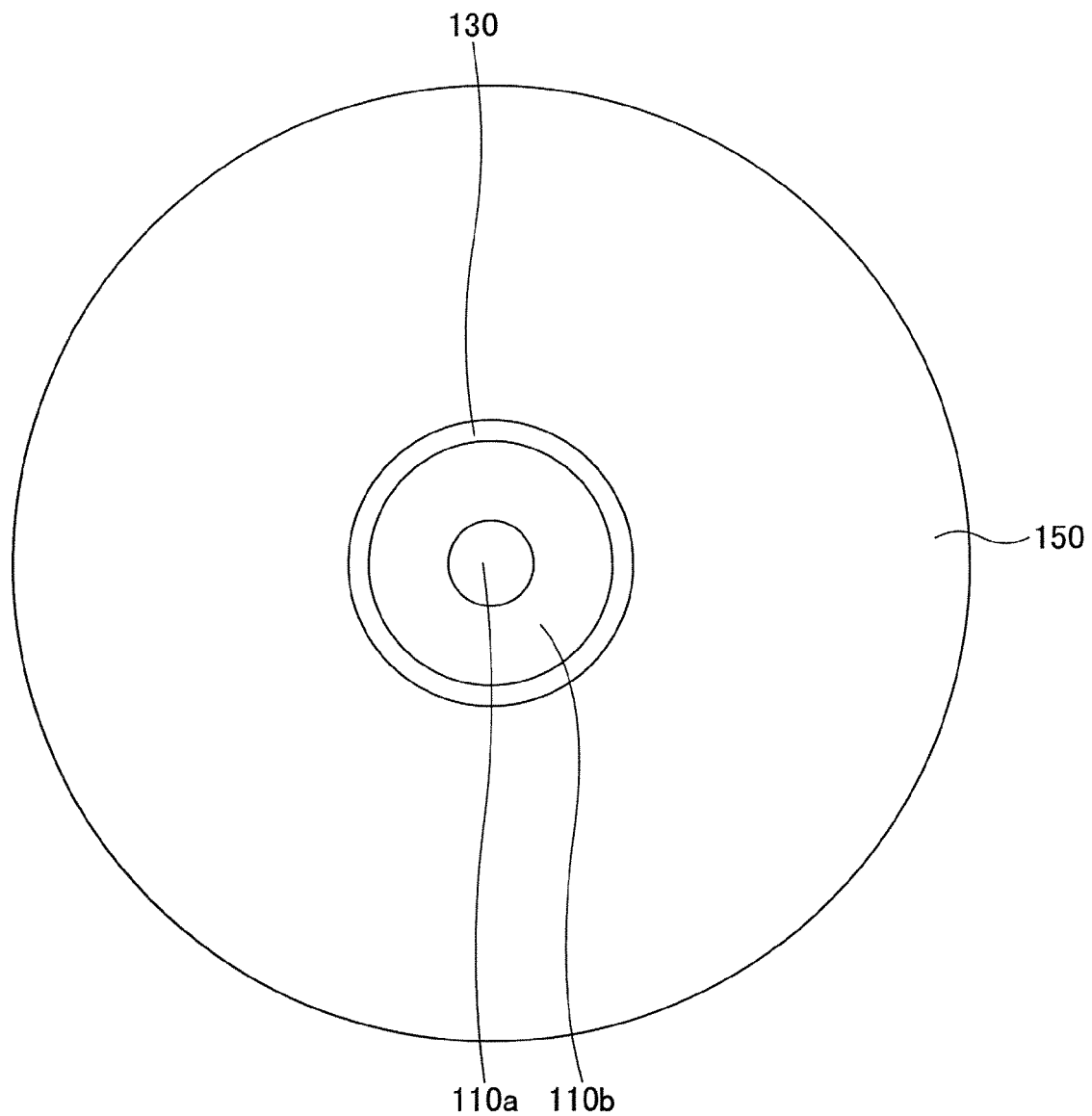
FIG. 34 is a plan view as seen from the side of the cover layer 150 of the optical information recording medium 100 shown in FIG. 33.

FIG. 34 is a plan view as seen from the side of the cover layer 150 of the optical information recording medium 100 shown in FIG. 33. As shown in FIG. 33, in the optical information recording medium 100 manufactured by the method according to the first embodiment, positions at which the formations of the intermediate layer 130 and the cover layer 150 are started are different in the radial direction at the peripheral part of the clamp part 110b. That is, the position at which the formation of the cover layer 150 is started is closer to the side of the outer circumference in the radial direction than the position at which the formation of the intermediate layer 130 is started. As a result, a bump shown in FIG. 33 is formed at the peripheral part in the radial direction between the positions at which the formations of the intermediate layer 130 and the cover layer 150 are started. Accordingly, when the optical information recording medium 100 shown in FIG. 33 on which the bump is formed is seen in planar view from the side of the cover layer 150, a circular-shaped area composed only of the intermediate layer 130 is confirmed at an area adjacent to the outer side of the clamp part 110b as shown in FIG. 34.

Note that in the case of an optical information recording medium having a three-or-more-layered structure in which plural information layers and plural of the intermediate layers 130 are alternately laminated, followed by the lamination of the cover layer 150 on the substrate 110, the position at which the formation of the intermediate layer 130 initially laminated on the substrate 110 is started is closer to the side of the inner circumference in the radial direction than the position at which the formation of the intermediate layer 130 subsequently laminated is started. In addition, the position at which the formation of the cover layer 150 is started is closer to the side of the outer circumference in the radial direction than the position at which the formation of the intermediate layer 130 lastly laminated is started.

According to the first embodiment of the present invention, the radius $R_1$ of the center cap 25B for forming the cover layer 150 is set to be larger than that of the center cap 25A for forming the intermediate layer 130. Accordingly, when the cover layer 150 is formed, the center cap 25B for forming the cover layer 150 covers the convex portion 130b formed at the peripheral part (end part of the center cap 25A) of the clamp part 110b caused when the intermediate layer 130 is formed. Therefore, the UV curing resin 330 is uniformly spread without being influenced by the convex portion 130b formed at the peripheral part (end part of the center cap 25A for forming the intermediate layer 130) of the clamp part 110b. As a result, the occurrence rate of the radial linear defects 36 shown in FIG. 18 is substantially reduced in the cover layer 150, which in turn can prevent the degradation of optical characteristics such as jitter and error rates caused at the time of reproduction and/or recording.

Second Embodiment

In a second embodiment, two types of the center caps 25 each having a different radius $R_1$, i.e., a center cap 25C for forming the intermediate layer 130 and a center cap 25D for forming the cover layer 150 are prepared. Here, the radius $R_1$ of the center cap 25C for forming the intermediate layer 130 is set to be 9.5 mm and the radius $R_1$ of the center cap 25D for forming the cover layer 150 is changed between 9 mm and 14 mm to form the cover layer 150. Under this condition, the occurrence rate of the radial linear defects 36 is obtained. Specifically, if one of "n" pieces of manufactured optical information recording media has even a small amount of the radial linear defects 36, it is determined to be defective (NG). Based on this rule, the occurrence rate of the radial linear defects 36 (=the number of defective pieces/n×100(%)) is obtained.

Figure 35:
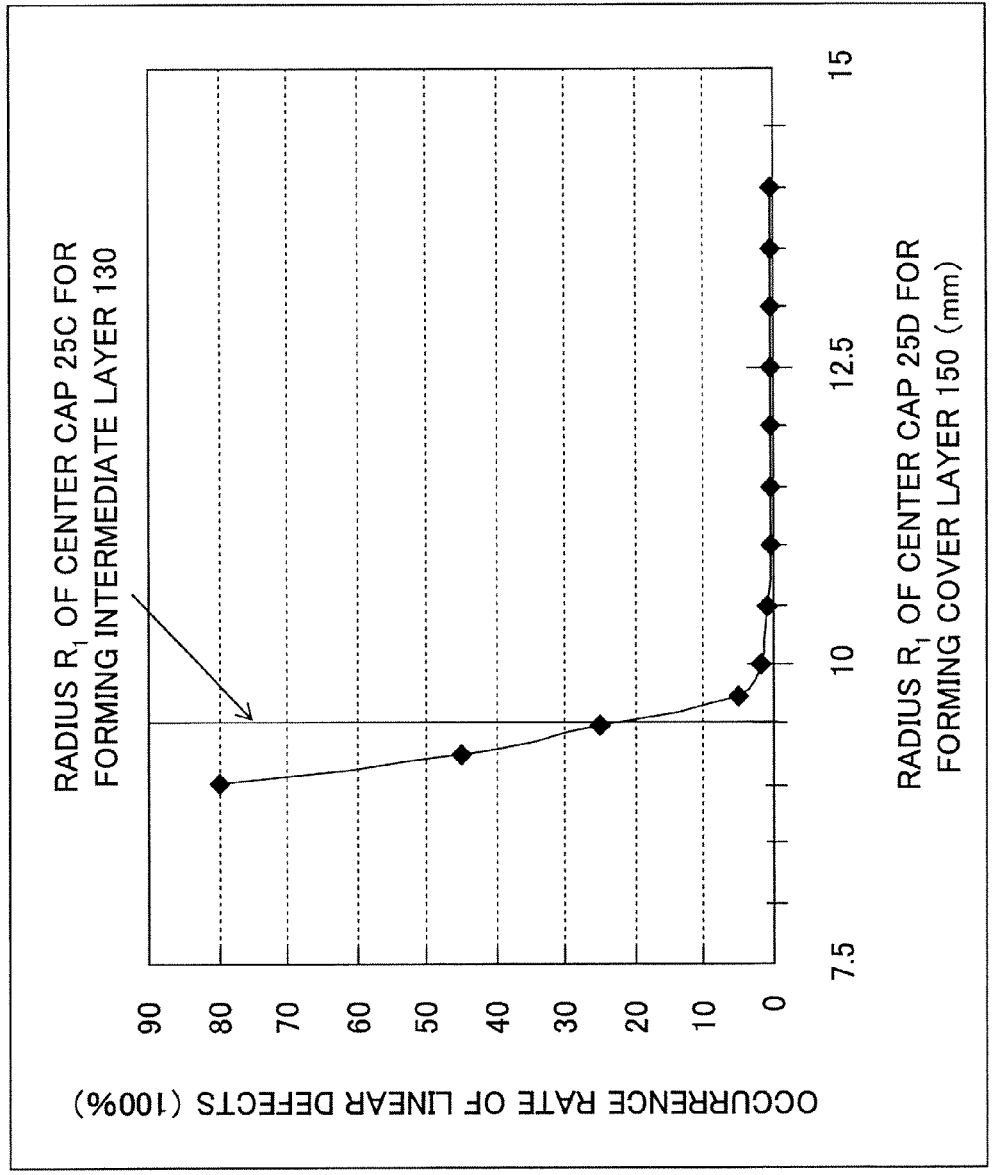
FIG. 35 is a graph showing a relationship between the radius $R_1$ of a center cap 25D for forming the cover layer 150 and the occurrence rate of the radial linear defects 36.

FIG. 35 is a graph showing a relationship between the radius $R_1$ of the center cap 25D for forming the cover layer 150 and the occurrence rate of the radial linear defects 36. As shown in FIG. 35, when the radius $R_1$ of the center cap 25D for forming the cover layer 150 is larger by more than 0.25 mm than that of the center cap 25C for forming the intermediate layer 130, the occurrence rate of the radial linear defects 36 starts decreasing rapidly. Moreover, when the radius $R_1$ of the center cap 25D for forming the cover layer 150 is larger by more than 0.5 mm than that of the center cap 25C for forming the intermediate layer 130, almost no radial linear defects 36 is observed.

According to the second embodiment of the present invention, the radius $R_1$ of the center cap 25D for forming the cover layer 150 is set to be larger by more than 0.25 mm, preferably 0.5 mm than that of the center cap 25C for forming the intermediate layer 130. Accordingly, when the cover layer 150 is formed, the center cap 25D for forming the cover layer 150 covers the convex portion 130b formed at the peripheral part (end part of the center cap 25C for forming the intermediate layer 130) of the clamp part 110b caused when the intermediate layer 130 is formed. Therefore, the UV curing resin 330 is uniformly spread without being influenced by the convex portion 130b formed at the peripheral part (end part of the center cap 25C for forming the intermediate layer 130) of the clamp part 110b. As a result, the occurrence rate of the radial linear defects 36 shown in FIG. 18 is substantially reduced in the cover layer 150, which in turn can prevent the degradation of optical characteristics such as jitter and error rates caused at the time of reproduction and/or recording.

Note that when three or more of the intermediate layers and the cover layer are formed using the center caps 25 according to the embodiment of the present invention, it is important that the radius $R_1$ of the center cap 25 for forming the intermediate layer initially laminated is set to be the smallest, those of the center caps 25 for forming the intermediate layers subsequently laminated are set to be gradually larger, and that of the center cap 25 for forming the cover layer lastly laminated is set to be the largest. Accordingly, the center caps 25 having the radius $R_1$ optimized for the respective layers can be free from the convex portions at the peripheral part (end part of the center cap 25) of the clamp part 110b caused when the intermediate layers are formed, and so they are not influenced by the convex portions at the time of forming the intermediate layers. As a result, it is possible to substantially reduce the occurrence rate of the radial linear defects 36 even in an optical information recording medium having three or more layers, which in turn can prevent the degradation of optical characteristics such as jitter and error rates caused at the time of reproduction and/or recording.

Third Embodiment

In a third embodiment, in order to confirm a relationship between the radius $R_1$ of the center cap 25C for forming the intermediate layer 130 and the occurrence rate of the penetration of the liquid UV curing resin 330 into a slight gap $T_1$ between the end surface 25e of the center cap 25C and the substrate 110, the radius $R_1$ of the center cap 25C for forming the intermediate layer 130 is changed between 7.5 mm and 11 mm to form the intermediate layer 130. Under this condition, the occurrence rate of the penetration of the UV curing resin 330 is obtained. Specifically, if one of "n" pieces of manufactured optical information recording media has even slight penetration of the UV curing resin 330, it is determined to be defective (NG). Based on this rule, the occurrence rate of the penetration of the UV curing resin 330 (=the number of defective pieces/n×100(%)) is obtained. Note that the radius $R_1$ of the center cap 25D for forming the cover layer 150 is set to be larger by 1 mm than that of the center cap 25C for forming the intermediate layer 130 at all times.

Figure 36:
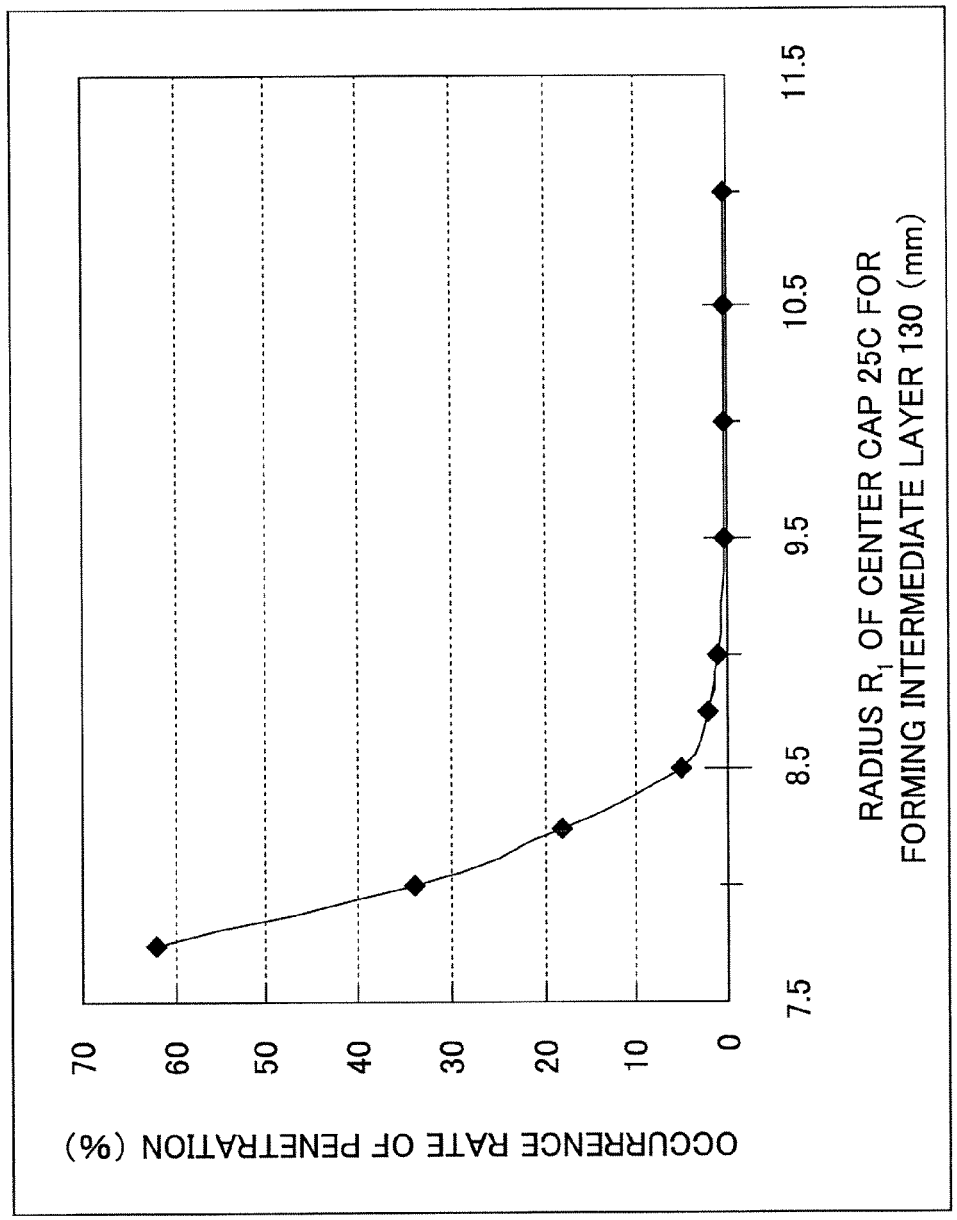
FIG. 36 is a graph showing a relationship between the radius $R_1$ of a center cap 25C for forming an intermediate layer 130 and the occurrence rate of the penetration of a UV curing resin 330.

FIG. 36 is a graph showing the relationship between the radius $R_1$ of the center cap 25C for forming the intermediate layer 130 and the occurrence rate of the penetration of the UV curing resin 330. As shown in FIG. 36, when the radius $R_1$ of the center cap 25C for forming the intermediate layer 130 is below 8.5 mm, the occurrence rate of the penetration of the liquid UV curing resin 330 into the slight gap $T_1$ between the end surface 25e of the center cap 25C and the substrate 110 increases rapidly.

According to the third embodiment of the present invention, the radius $R_1$ of the center cap 25C for forming the intermediate layer 130 is set to be greater than or equal to 8.5 mm, thereby making it possible to substantially reduce the occurrence rate of the penetration of the liquid UV curing resin 330 into the slight gap $T_1$ between the end surface 25e of the center cap 25C and the substrate 110. As a result, when an optical information recording medium is loaded into an information recording reproduction apparatus, a tilting degree is reduced because it is free from the concave and convex portion 130a formed on the clamp part 110b of the substrate 110, which in turn can prevent the degradation of tilt characteristics such as jitter and error rates caused at the time of reproduction and/or recording.

Note that when three or more of the intermediate layers and the cover layer are formed using the center caps 25 according to the embodiment of the present invention, the radius $R_1$ of the center cap 25 for forming the intermediate layer initially laminated is set to be greater than or equal to 8.5 mm, those of the center caps 25 for forming the intermediate layers subsequently laminated are set to be gradually larger, and that of the center cap for forming the cover layer lastly laminated is set to be the largest. Accordingly, it is possible to substantially reduce the occurrence rate of the penetration of the liquid UV curing resin 330 into the slight gap $T_1$ between the end surface 25e of the center cap 25C and the substrate 110. As a result, when an optical information recording medium is loaded into an information recording reproduction apparatus, a tilting degree is reduced because it is free from the concave and convex portion 130a formed on the clamp part 110b of the substrate 110, which in turn can prevent the degradation of tilt characteristics such as jitter and error rates caused at the time of reproduction and/or recording.

Fourth Embodiment

Figure 37B:
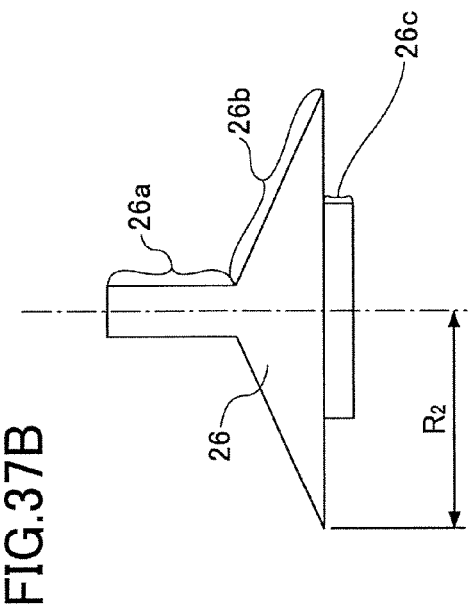
FIGS. 37A through 37D are views showing a center cap 26 according to the embodiment of the present invention used for forming layers on the substrate by the spin coat method.
Figure 37C:
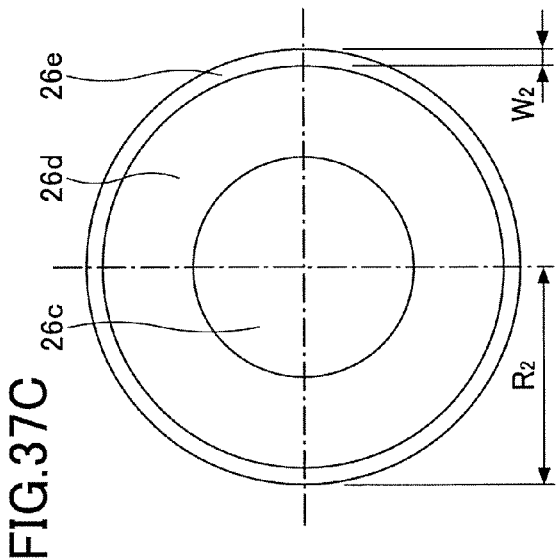
Figure 37A:
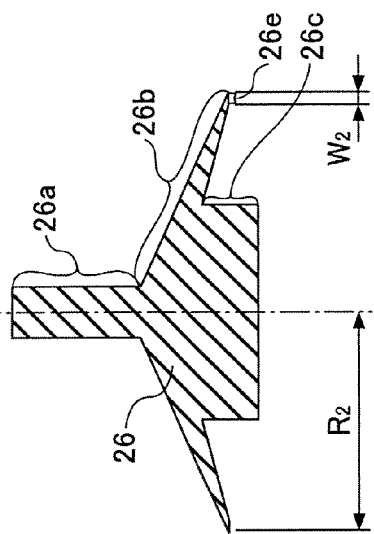
Figure 37D:
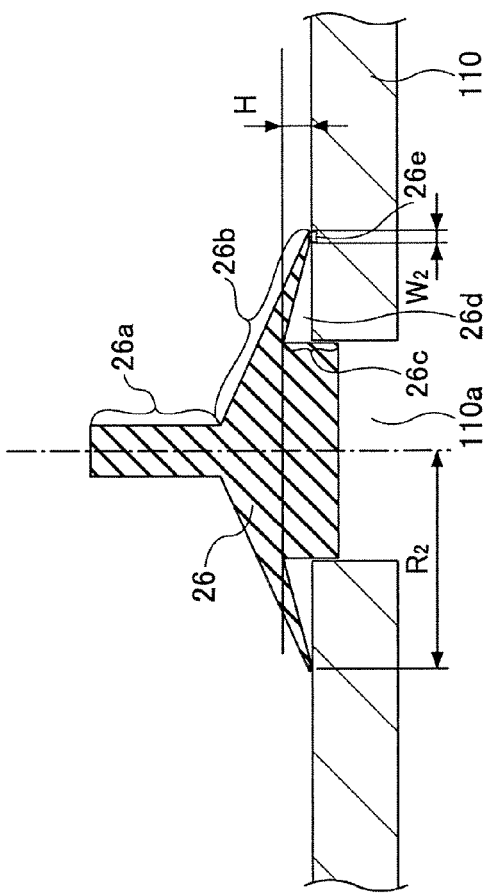

In a fourth embodiment, a center cap different in shape from the center caps according to the first through third embodiments is used. FIGS. 37A through 37D are views showing a center cap 26 according to the embodiment of the present invention used for forming layers on the substrate by the spin coat method. FIGS. 37A and 37D are cross-sectional views of the center cap 26, FIG. 37B is a front view thereof, and FIG. 37C is a bottom view thereof.

The center cap 26 shown in FIGS. 37A through 37D has a fitting part 26c fitted in the center hole 110a of the substrate 110; a cone-shaped part 26b that is provided concentrically with the fitting part 26c, made parallel to the substrate 110 when the fitting part 26c is fitted in the center hole 110a of the substrate 110, and has an end surface 26e that is an annular-shaped plane having a diameter larger than that of the fitting part 26e; and a cylindrical-shaped projection part 26a provided concentrically with the cone-shaped part 26b at the upper part of the cone-shaped part 26b.

The whole surface of the end surface 26e, which is brought into contact with the substrate 110, is a flat annular-shaped plane part. As shown in FIG. 37C, the end surface 26e is provided so as not to contact the fitting part 26c when viewed from the bottom. Furthermore, as shown in FIG. 37B, the fitting part 26c is projected from the end surface 26e when viewed from the front. Furthermore, as shown in FIG. 37D, when the fitting part 26c is fitted in the center hole 110a of the substrate 110, the end surface 26e is brought into contact with the upper surface of the substrate 110, thereby forming a space 26d between the inner surface of the cone-shaped part 26b and the substrate 110.

Although a slight gap is caused when the end surface 26e of the center cap 26 is brought into contact with the substrate 110, such a case is taken into consideration for descriptive purposes. Note that in FIGS. 37A through 37D, $R_2$ denotes the radius of the center cap 26, $W_2$ denotes the width of the end surface 26e, and H denotes the maximum height of the space 26d.

Thus, the center cap 26 according to the fourth embodiment of the present invention provides a structure in which the space 26d is formed to make only the end surface 26e formed at the outer edge of the center cap 26 brought into contact with the upper surface of the substrate 110. Compared with the center cap 25 shown in FIG. 3, the characteristic of the center cap 26 is that the area of the part brought into contact with the upper surface of the substrate 110 becomes smaller.

Note that in the center cap 26 according to the fourth embodiment of the present invention, it is important to provide the structure in which the space 26d is formed to make only the end surface 26e formed at the outer edge of the center cap 26 brought into contact with the upper surface of the substrate 110. Therefore, the cone-shaped part 26b is not necessarily of a conical shape. That is, the cone-shaped part 26b may have any shape so long as it is inclined from its central part to its peripheral part, gradually lowering toward the peripheral part.

In addition, as shown in FIGS. 37A through 37D, it is preferable that the height of the space 26d be gradually lowered toward the peripheral part from its central part. However, the cone-shaped part 26b may have any shape so long as the space 26d is formed so that only the end surface 26e is brought into contact with the upper surface of the substrate 110.

In the fourth embodiment, a center cap 26A for forming the intermediate layer 130 and a center cap 26B for forming the cover layer 150 that has the radius $R_2$ larger than that of the center cap 26A for forming the intermediate layer 130 are prepared. Then, the optical information recording medium 100 is manufactured using the center cap 26A and the center cap 26B.

Specifically, in the center cap 26A for forming the intermediate layer 130, the radius $R_2$ of the cone-shaped part 26b is 7.5 mm, the width $W_2$ of the end surface 26e is 0.1 mm, and the maximum height of the space 26d is 0.1 mm. In the center cap 26B for forming the cover layer 150, the radius $R_2$ of the cone-shaped part 26b is 11 mm, the width $W_2$ of the end surface 26e is 0.1 mm, and the maximum height H of the space 26d is 0.1 mm.

Referring to FIGS. 38 through 41, a description is now made of the method for manufacturing the optical information recording medium 100 according to the fourth embodiment of the present invention. Note that the same constituents as those of FIGS. 19 and 34 are denoted by the same reference numerals and their descriptions may be omitted. First, a plastic resin such as polycarbonate is injection-molded, pressure-molded, etc., using a stamper on which pits are formed. In this way, the pits are transferred onto the substrate 110. Next, aluminum, etc., are laminated on the surface, on which the concave and convex portions of the pits are formed, by the sputtering method, the vacuum deposition method, etc. Accordingly, the reflecting layer 120 as a recording reflecting film is formed on the substrate 110.

Figure 38:
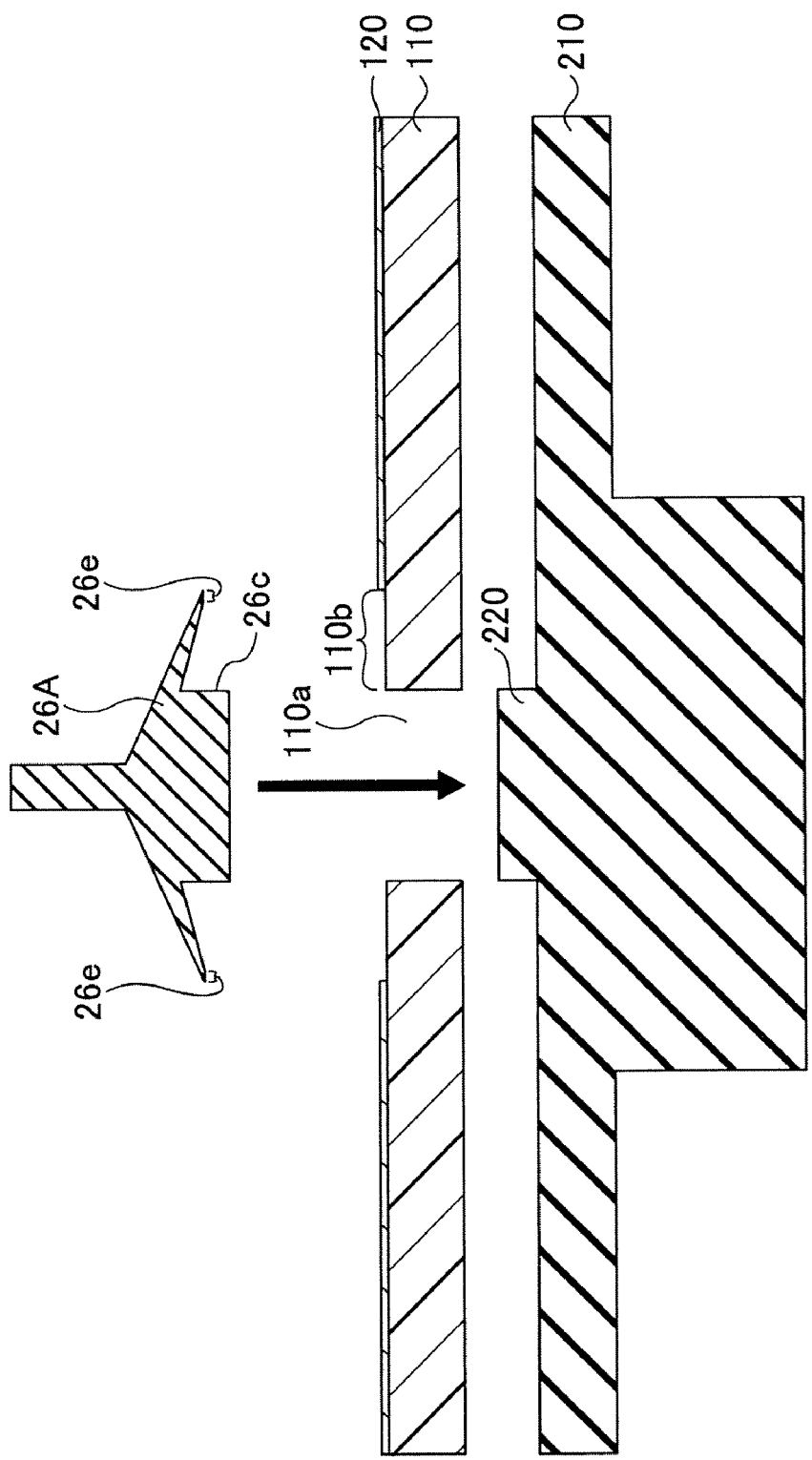
FIG. 38 is a cross-sectional view (part 1) for explaining a method for manufacturing the optical information recording medium 100 according to a fourth embodiment of the present invention.

Then, as shown in FIG. 38, the substrate 110 is mounted on the rotating table 210 so as to make the center hole 110a fitted in the substrate positioning part 220. Subsequently, negative pressure is caused to act on the sucking hole through the sucking passage (not shown), to suck, fix, and hold the substrate 110 mounted on the rotating table 210. After that, the fitting part 26c of the center cap 26A is fitted in the center hole 110a of the substrate 110.

Next, the same steps as those of FIGS. 22 through 27 are performed. In other words, the liquid UV curing resin 330 as a material for forming the intermediate layer 130 is ejected on the center cap 25A through the UV curing resin supplying nozzle 260. After that, the driving motor 240 is actuated to rotate the rotating table 210 at a predetermined rotating speed. As a result, the uniform intermediate layer 130 made of the UV curing resin 330 is formed on the reflecting layer 120. Then, the center cap 26A is removed upward from the substrate 110. After that, the light-transmitting stamper 340 having predetermined pits formed at its lower surface 340b is mounted on the intermediate layer 130. Subsequently, the UV light 350 is radiated from above the upper surface 340a of the stamper 340 by the UV irradiator 270 to cure the UV curing resin 330, while the pits are transferred from the light-transmitting stamper 340 to the intermediate layer 130. Then, the stamper 340 is removed upward. In this way, the concave and convex portions of the pits are formed on the intermediate layer 130.

Figure 39:
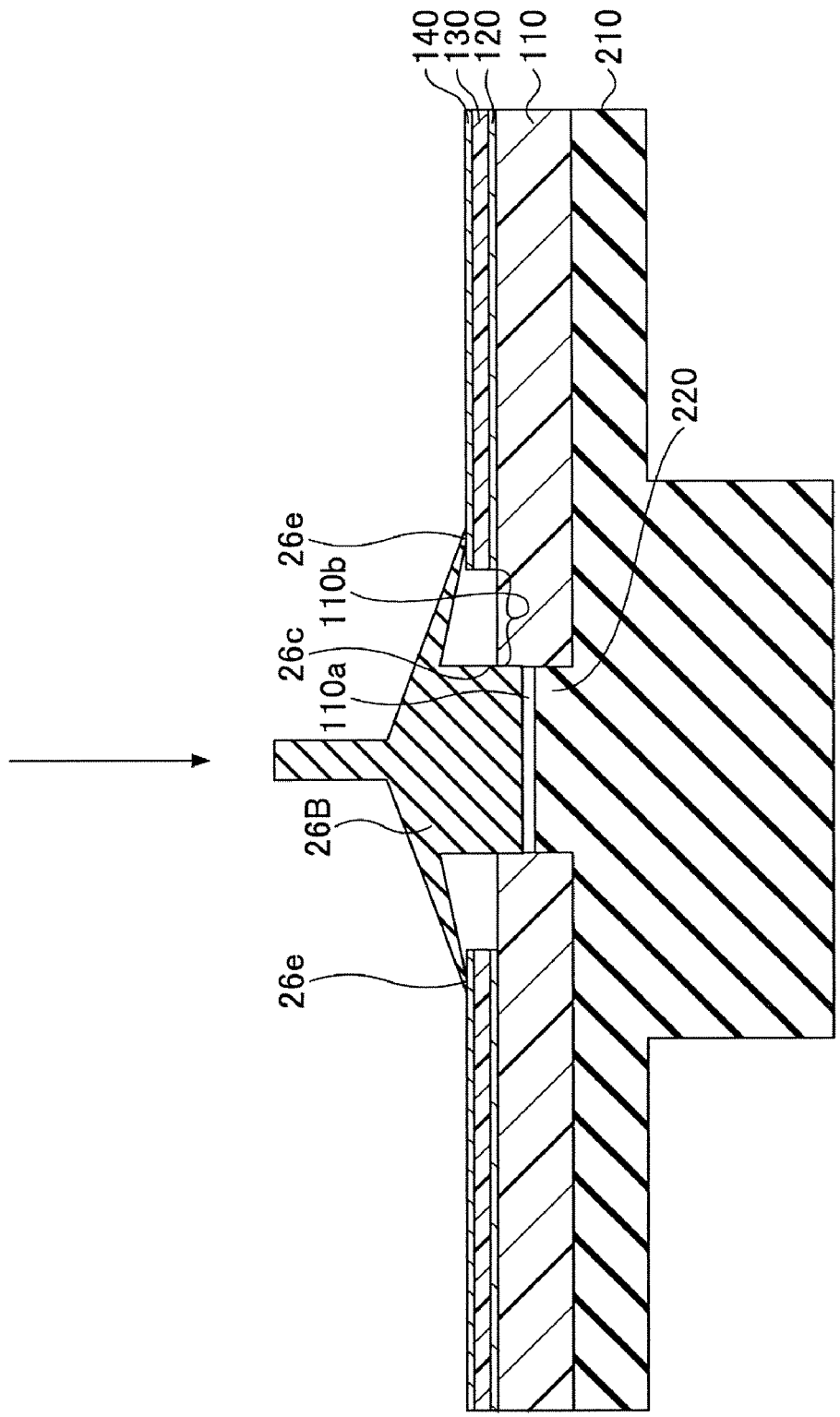
FIG. 39 is a cross-sectional view (part 2) for explaining the method for manufacturing the optical information recording medium 100 according to the fourth embodiment of the present invention.

Moreover, aluminum, etc., having a thickness to the extent that partially transmits light is laminated on the intermediate layer 130 by the sputtering method, etc., so as to form the second reflecting layer 140 on it. After that, as shown in FIG. 39, the substrate 110 is mounted on the rotating table 210 again to make the center hole 110a fitted in the substrate positioning part 220. Then, the fitting part 26c of the center cap 26B, which has the cone-shaped part 26b larger in the radius $R_2$ than that of the center cap 26A, is fitted in the center hole 110a of the substrate 110.

Figure 40:
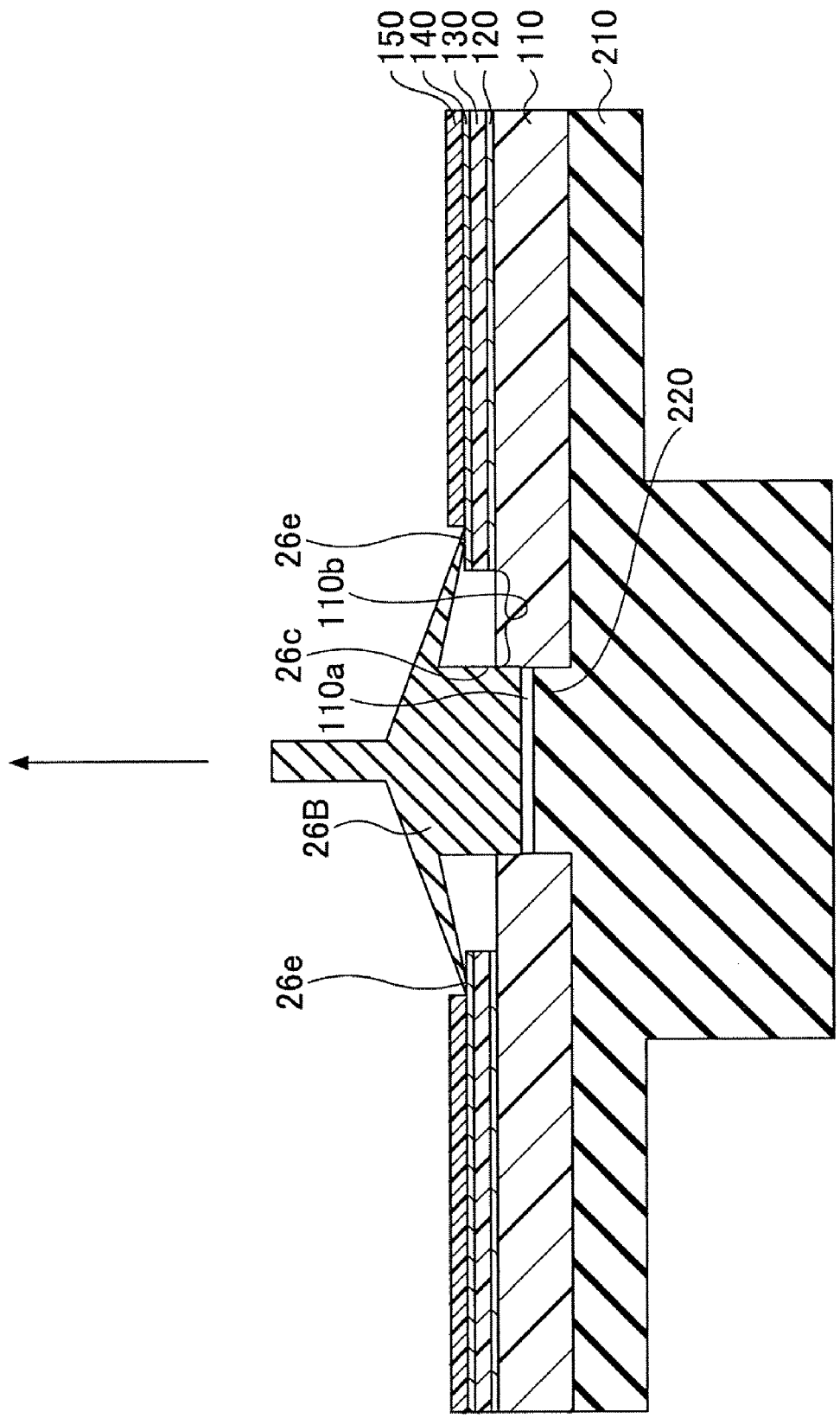
FIG. 40 is a cross-sectional view (part 3) for explaining the method for manufacturing the optical information recording medium 100 according to the fourth embodiment of the present invention.
Figure 41:
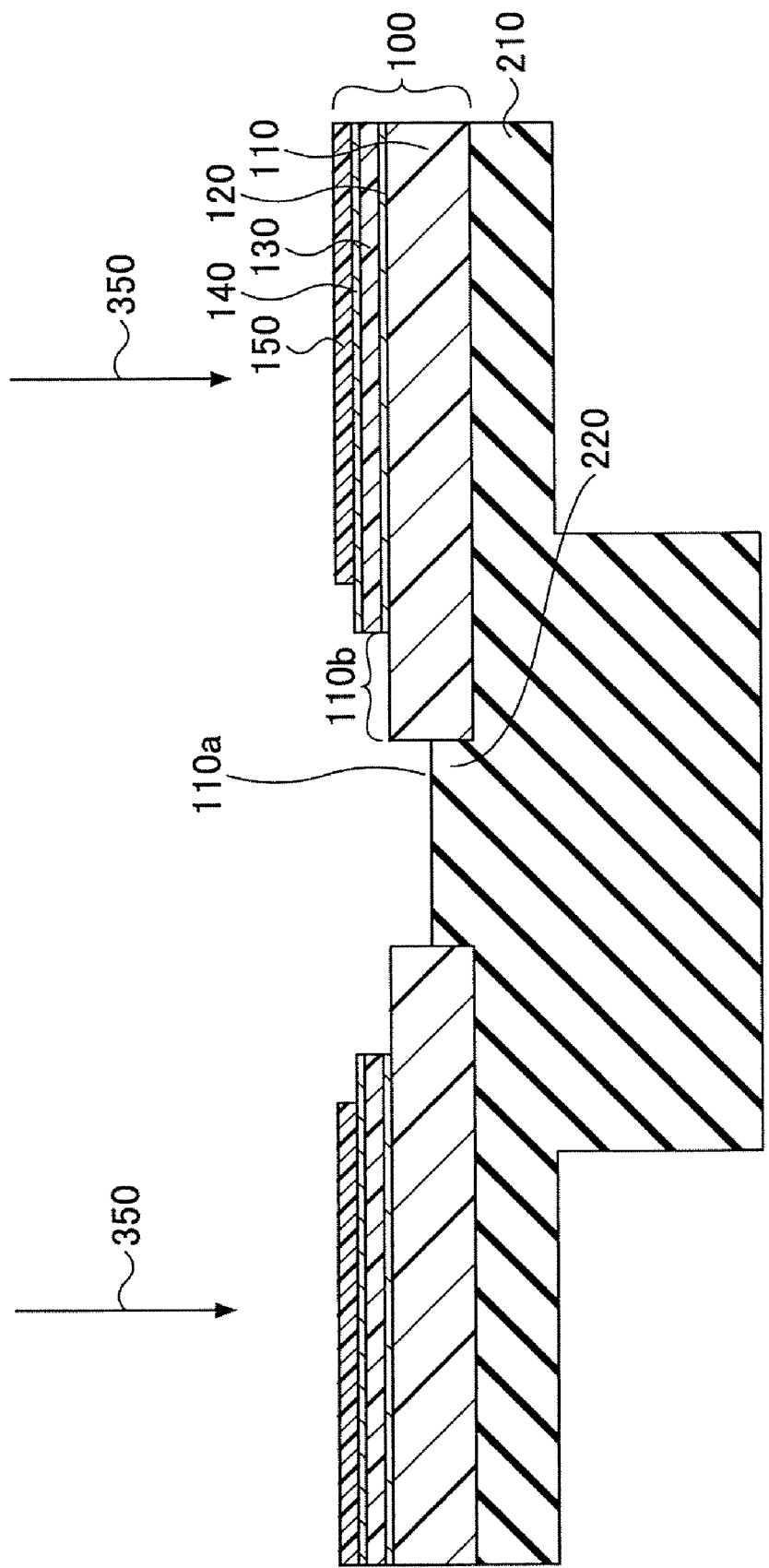
FIG. 41 is a cross-sectional view (part 4) for explaining the method for manufacturing the optical information recording medium 100 according to the fourth embodiment of the present invention.

Next, the same steps as those of FIGS. 29 and 30 are performed. In other words, after the UV curing resin 330 is coated at the central part of the substrate 110, the rotating table 210 is rotated. As a result, the uniform cover layer 150 made of the UV curing resin 330 is formed on the substrate 110. After that, as shown in FIG. 40, the center cap 26B is removed upward. Then, as shown in FIG. 41, the UV light 350 is radiated from above the uniform cover layer 150 made of the UV curing resin 330 by the UV irradiator 270 to cure the UV curing resin 330. As a result, the cover layer 150 is formed. The optical information recording medium 100 according to the fourth embodiment of the present invention is thus completed.

Figure 16:
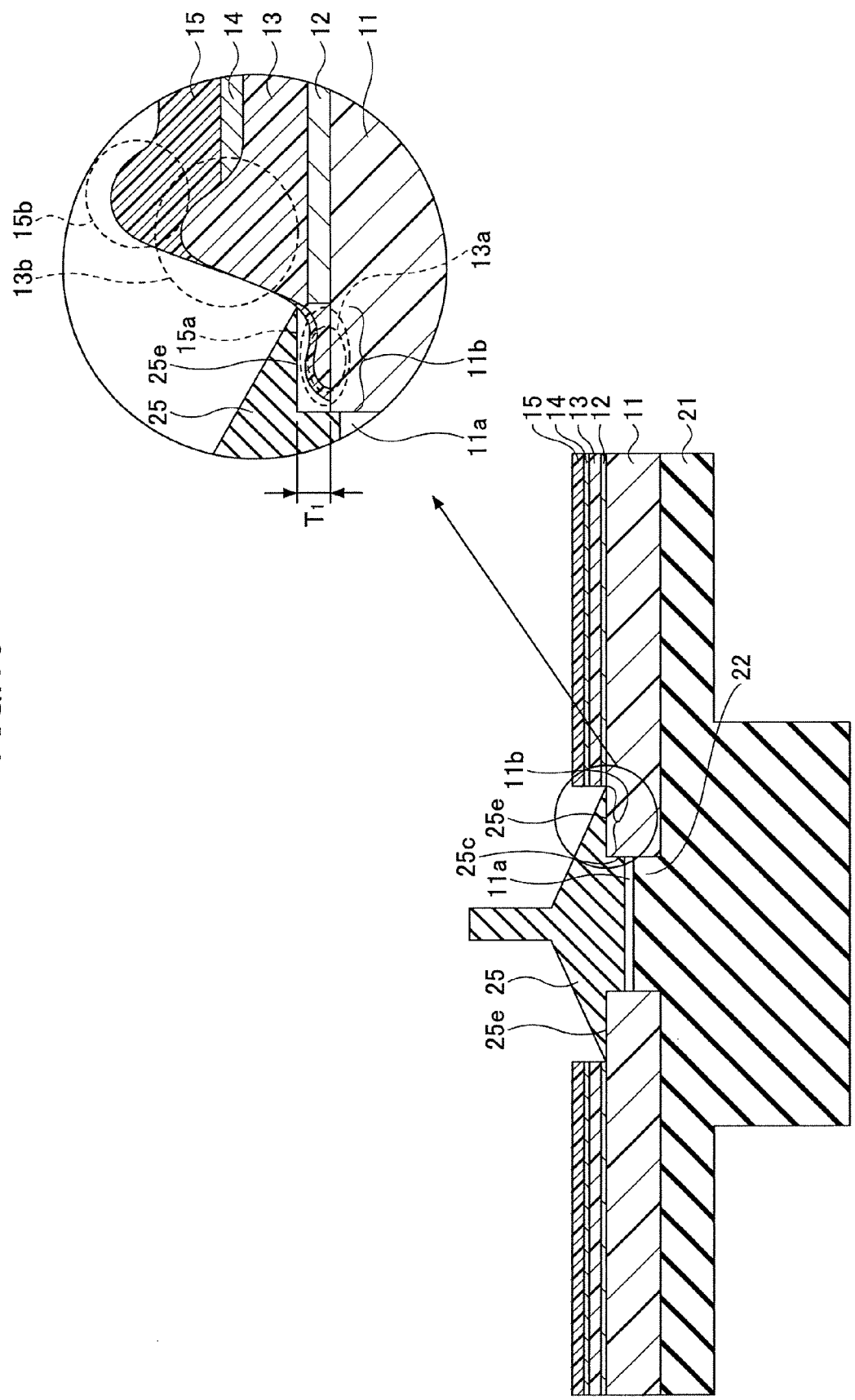
FIG. 16 is an enlarged view of a peripheral part of a clamp part 11b of a substrate 11 shown in FIG. 13.
Figure 17:
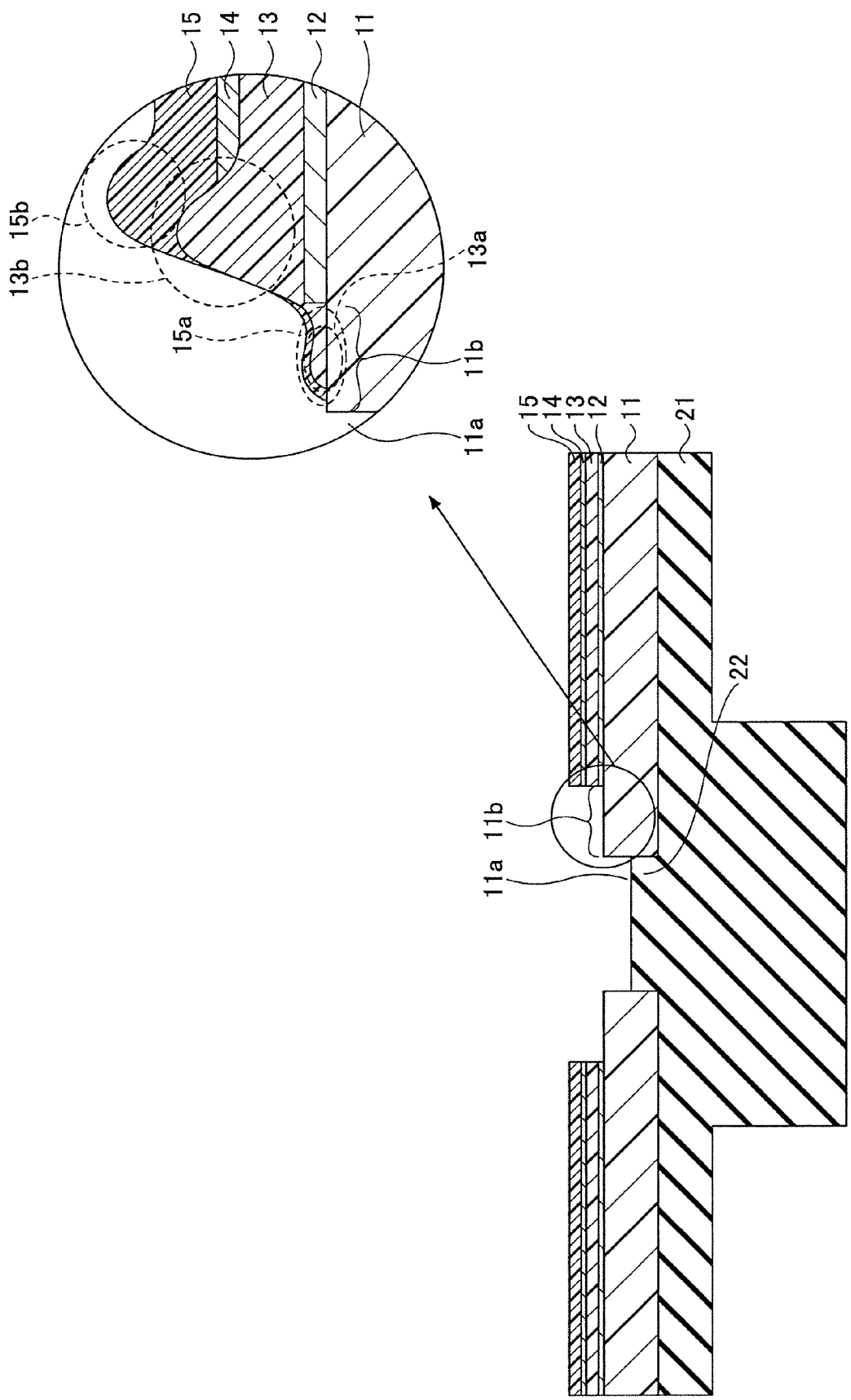
FIG. 17 is an enlarged view of the peripheral part of the clamp part 11b of the substrate 11 shown in FIG. 15.

Thus, in the fourth embodiment, the optical information recording medium 100 is manufactured using the two center caps shown in FIGS. 37A through 37D, i.e., the center cap 26A for forming the intermediate layer 130 in which the radius $R_2$ of the cone-shaped part 26b is 7.5 mm, the width $W_2$ of the end surface 26e is 0.1 mm, and the maximum height H of the space 26d is 0.1 mm and the center cap 26B for forming the cover layer 150 in which the radius $R_2$ of the cone-shaped part 26b is 11 mm, the width $W_2$ of the end surface 26e is 0.1 mm, and the maximum height H of the space 26d is 0.1 mm. As a result, as shown in FIGS. 42 and 43, the maximum heights of the concave and convex portion formed on the clamp part 110b of the substrate 110 and the convex portion formed at the peripheral part (end part of the center cap 26A and the center cap 26B) of the clamp part 110b are much lower than those of FIGS. 16 and 17.

Figure 42:
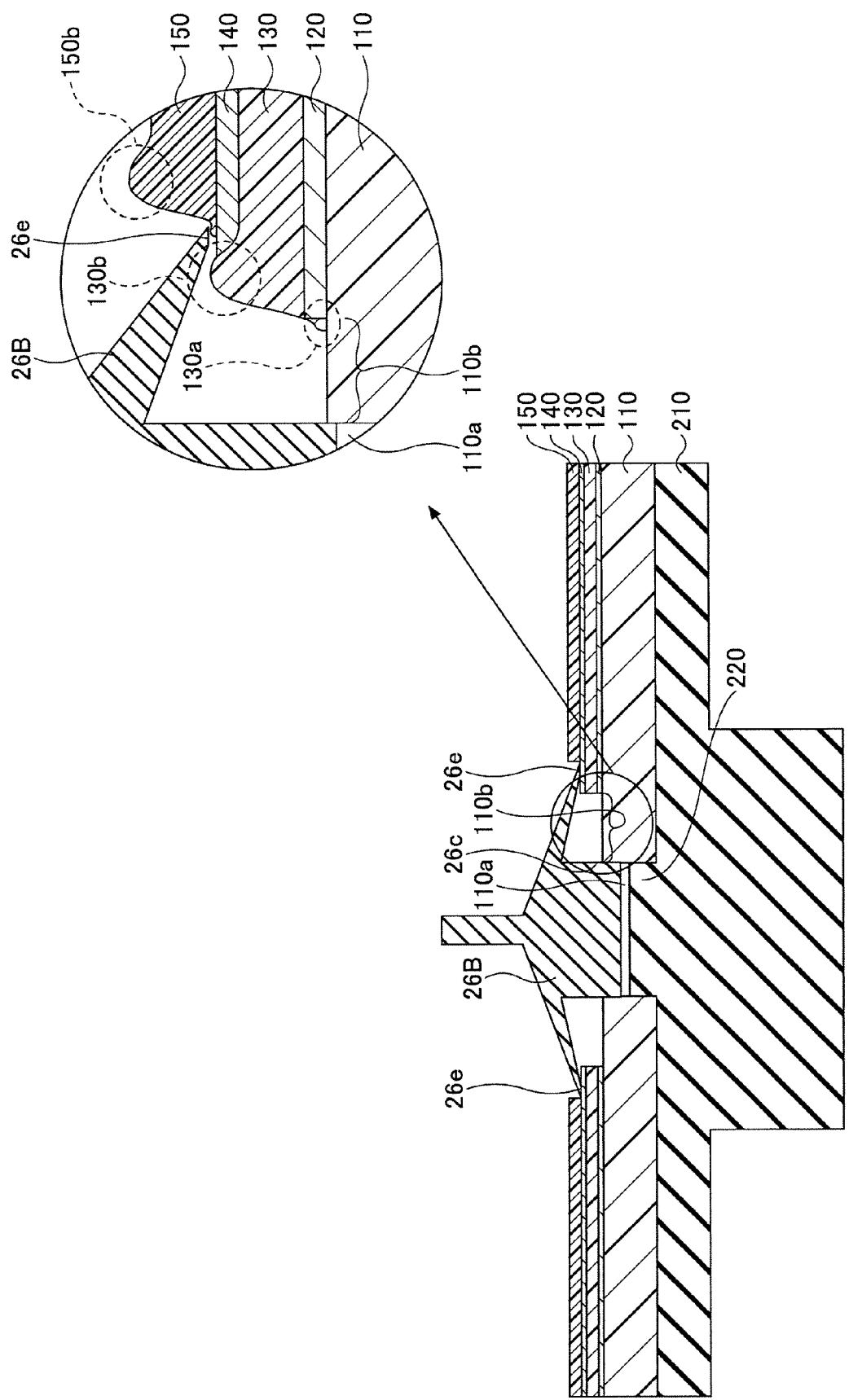
FIG. 42 is an enlarged view of the peripheral part of the clamp part 110b of the substrate 110 shown in FIG. 40.
Figure 43:
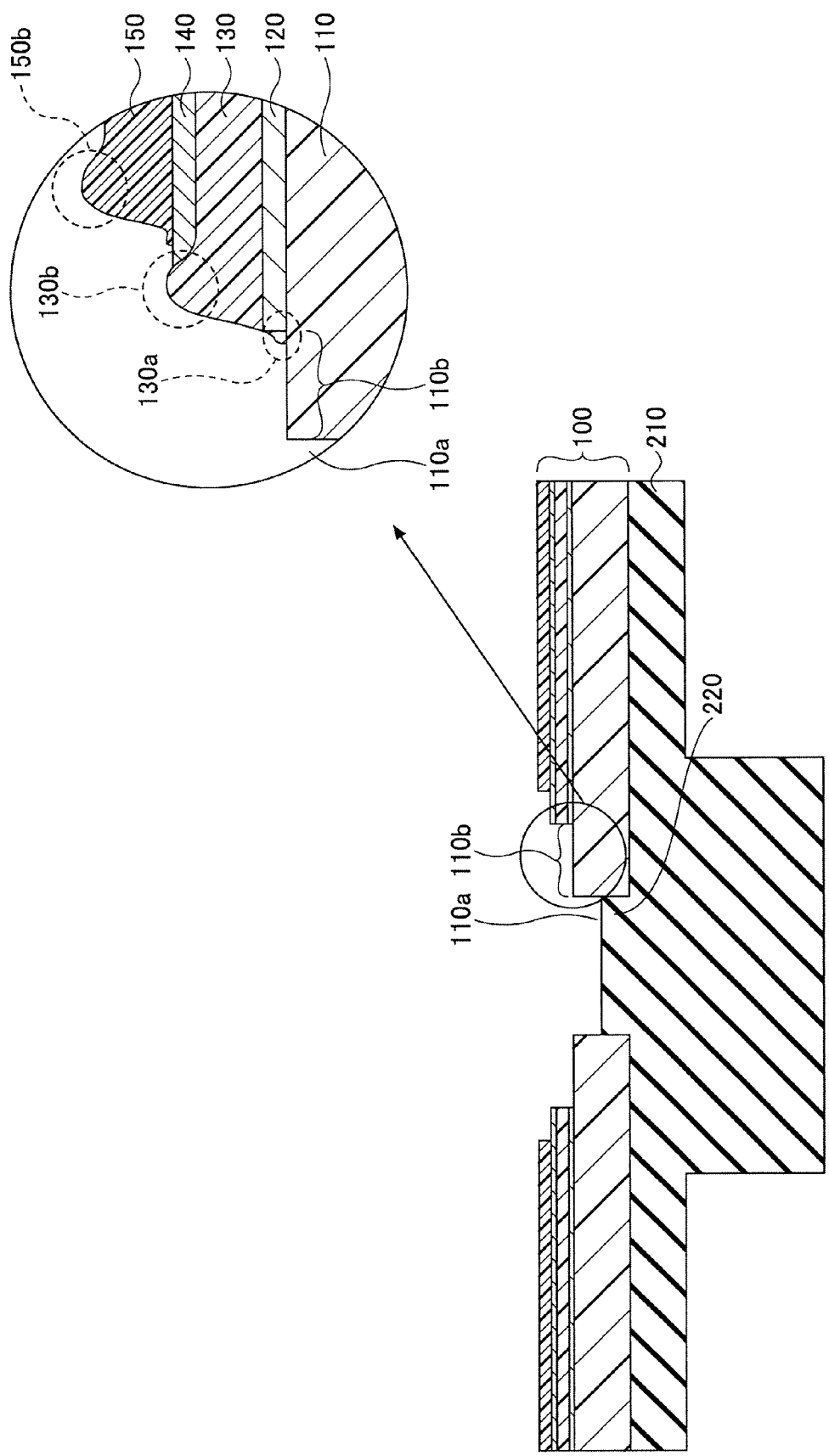
FIG. 43 is an enlarged view of the peripheral part of the clamp part 110b of the substrate 110 shown in FIG. 41.

FIG. 42 is a view showing an enlarged area of the peripheral part of the clamp part 110b of the substrate 110 shown in FIG. 40, and FIG. 43 is a view showing an enlarged area of the peripheral part of the clamp part 110b of the substrate 110 shown in FIG. 41. Note here that the same constituents as those of FIGS. 40 and 41 are denoted by the same reference numerals and their descriptions are omitted. In FIGS. 42 and 43, reference numerals 130a denotes the concave and convex portion formed on the clamp part 110b, and reference numerals 130b and 150b denote the convex portions formed at the peripheral part (end part of the center caps 26A and the center cap 26B) of the clamp part 110b.

When the liquid UV curing resin 330 is dropped onto the center cap 26A to form the intermediate layer 130, it penetrates into only the lower part of the end surface 26e of the center cap 26A due to capillary action, which in turn may form the concave and convex portion 130a on the clamp part 110b and form the convex portion 130b at the peripheral part (end part of the center cap 26A) of the clamp part 110b. In this case, however, the maximum heights of the concave and convex portion 130a and the convex portion 130b are much lower than those of FIGS. 16 and 17.

As shown in FIG. 37, this is because the center cap 26A according to the embodiment of the present invention provides the space 26d between the inner surface of the cone-shaped part 26b of the center cap 26A and the substrate 110. In other words, the center cap 26A has the structure in which the large gap is formed between the center cap 26A and the substrate 110, thereby making only the end surface 26e formed at the outer edge of the center cap 26A brought into contact with the upper surface of the substrate 110. Compared with the center cap 25, the area of the part of the center cap 26A, which is brought into contact with the upper surface of the substrate 110, becomes smaller. Therefore, as shown in FIGS. 42 and 43, when the liquid UV curing resin 330 is dropped onto the center cap 26A, the amount of the UV curing resin 330 penetrating into the center cap 26A due to capillary action is much reduced.

Furthermore, when the cover layer 150 is formed, the radius (=11 mm) of the cone-shaped part 26b of the center cap 26B for forming the cover layer 150 is set to be larger than that (=7.5 mm) of the cone-shaped part 26b of the center cap 26A for forming the intermediate layer 130. Accordingly, the occurrence rate of the radial linear defects 36 shown in FIG. 18 is substantially reduced.

This is because, as shown in FIG. 42, the slight convex portion 130b at the peripheral part (end part of the center cap 26A) of the clamp part 110 caused when the intermediate layer 130 is formed is covered with the center cap 26B for forming the cover layer 150 having the cone-shaped part 26b larger in the radius $R_2$ than that of the center cap 26A for forming the intermediate layer 130. As a result, the UV curing resin 330 is uniformly spread without being influence by the convex portion 130b formed at the peripheral part (end part of the center cap 26A) of the clamp part 110b.

As shown in FIGS. 42 and 43, in the optical information recording medium 100 manufactured by the method according to the fourth embodiment, positions at which the formations of the intermediate layer 130 and the cover layer 150 are started are different in the radial direction at the peripheral part of the clamp part 110b. That is, the position at which the formation of the cover layer 150 is started is closer to the side of the outer circumference in the radial direction than the position at which the formation of the intermediate layer 130 is started. As a result, a bump shown in FIGS. 42 and 43 is formed at the peripheral part in the radial direction between the positions at which the formations of the intermediate layer 130 and the cover layer 150 are started. Accordingly, when the optical information recording medium 100 on which the bump shown in FIGS. 42 and 43 is formed is seen in planar view from the side of the cover layer 150, a circular-shaped area composed only of the intermediate layer 130 is confirmed at an area adjacent to the outer side of the clamp part 110b similar to the case of the first embodiment shown in FIG. 34.

Note that in the case of an optical information recording medium having a three-or-more-layered structure in which plural information layers and a plurality of the intermediate layers 130 are alternately laminated, followed by the lamination of the cover layer 150 on the substrate 110, the position at which the formation of the intermediate layer 130 initially laminated on the substrate 110 is started is closer to the side of the inner circumference in the radial direction than the position at which the formation of the intermediate layer 130 subsequently laminated is started. In addition, the position at which the formation of the cover layer 150 is started is closer to the side of the outer circumference in the radial direction than the position at which the formation of the intermediate layer 130 lastly laminated is started.

According to the fourth embodiment of the present invention, the center cap 26A has the structure in which the space 26d is provided between the inner surface of the cone-shaped part 26b of the center cap 26A and the substrate 110 to form the large gap between them, thereby making only the end surface 26e formed at the outer edge of the center cap 26A brought into contact with the upper surface of the substrate 110. Accordingly, the amount of the liquid UV curing resin 330 penetrating into the center cap 26A due to capillary action is much reduced. Therefore, it is possible to substantially lower the maximum height of the concave and convex portion 130a formed on the clamp part 110b of the substrate 110. As a result, when an optical information recording medium is loaded into an information recording reproduction apparatus, a tilting degree is reduced, which in turn can prevent the degradation of tilt characteristics such as jitter and error rates caused at the time of reproduction and/or recording.

Furthermore, the radius $R_2$ (=11 mm) of the cone-shaped part 26b of the center cap 26B for forming the cover layer 150 is set to be larger than that (=7.5 mm) of the cone-shaped part 26b of the center cap 26A for forming the intermediate layer 130. Accordingly, when the cover layer 150 is formed, the center cap 26B for forming the cover layer 150 covers the slight convex portion 130b formed at the peripheral part (end part of the center cap 26A) of the clamp part 110b caused when the intermediate layer 130 is formed. Therefore, the UV curing resin 330 is uniformly spread without being influenced by the convex portion 130b formed at the peripheral part (end part of the center cap 26A) of the clamp part 110b. As a result, the occurrence rate of the radial linear defects 36 shown in FIG. 18 is substantially reduced in the cover layer 150, which in turn can prevent the degradation of optical characteristics such as jitter and error rates caused at the time of reproduction and/or recording.

Note that in the fourth embodiment, the radius $R_2$ of the cone-shaped part 26b of the center cap 26B for forming the cover layer 150 is set to be larger than that of the cone-shaped part 26b of the center cap 26A for forming the intermediate layer 130. However, even if the radius $R_2$ of the cone-shaped part 26b of the center cap 26B for forming the cover layer 150 is set to be the same as that of the cone-shaped part 26b of the center cap 26A for forming the intermediate layer 130, it is possible to reduce the occurrence rate of the radial linear defects 36 shown in FIG. 18 compared with the case in which the conventional center cap 25 is used, which in turn can prevent the degradation of optical characteristics such as jitter and error rates caused at the time of reproduction and/or recording.

This is because the center cap 26A has the structure in which the space 26d is provided between the inner surface of the cone-shaped part 26b of the center caps 26A and 26B and the substrate 110 to form the large gap between them, thereby making only the end surface 26e formed at the outer edge of the center cap 26 brought into contact with the upper surface of the substrate 110. Accordingly, the amount of the liquid UV curing resin 330 penetrating into the center cap 26A due to capillary action is much reduced. As a result, not only the maximum height of the concave and convex portion 130a formed on the clamp part 110b of the substrate 110, but also that of the convex portion 130b formed at the peripheral part (end part of the center cap 26A) of the clamp part 110b are substantially lowered.

Fifth Embodiment

Figure 44:
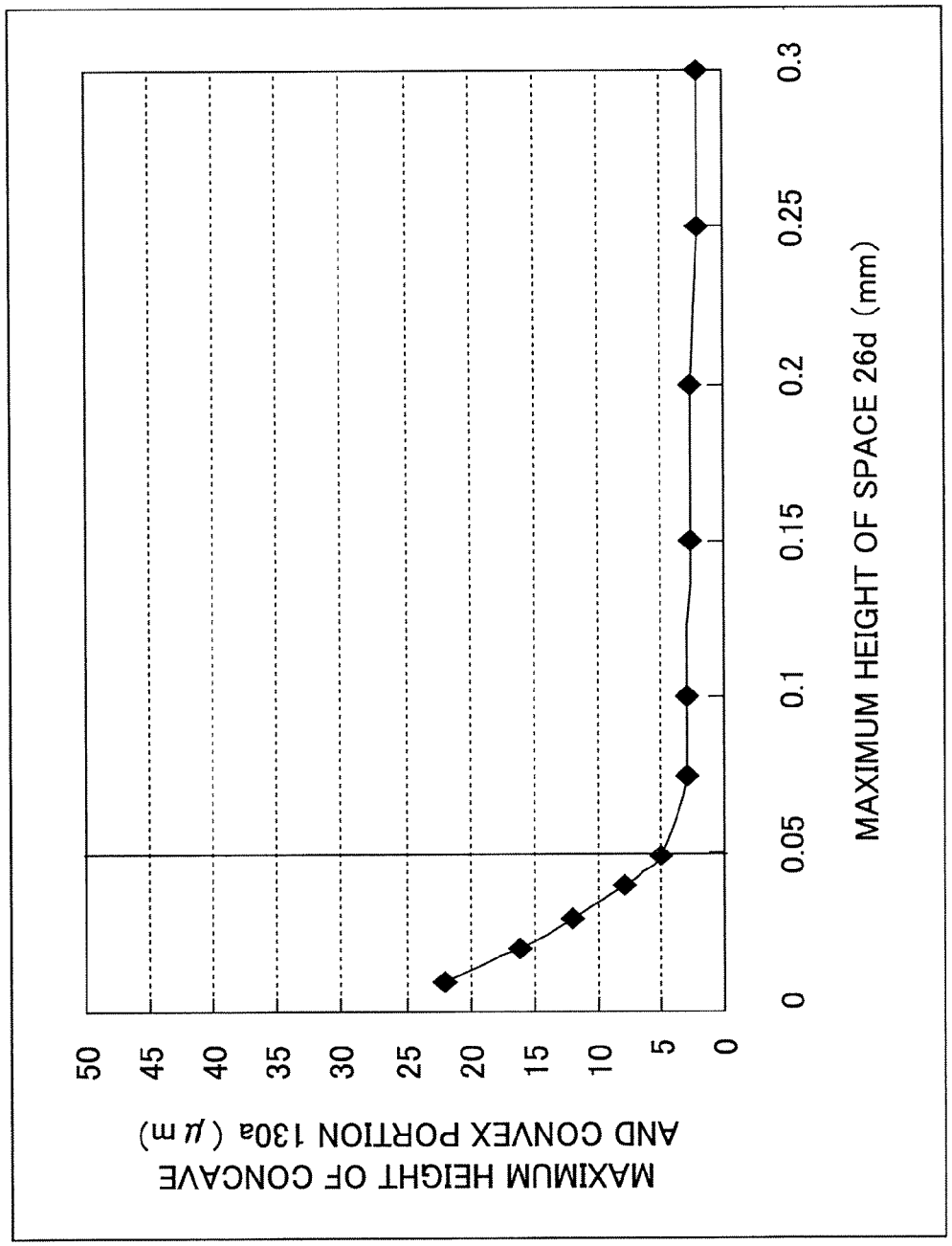
FIG. 44 is a graph showing a relationship between the maximum height of a space 26d of the center cap 26 and the maximum height H of a concave and convex portion 130a formed on the clamp part 110b.

In a fifth embodiment, the radius $R_2$ of the cone-shaped part 26b of the center cap 26 shown in FIG. 37 is set to be 11 mm, the width $W_2$ of the end surface 26e is set to be 2 mm, and the maximum height H of the space 26d is changed between 0.01 mm and 0.3 mm to form the cover layer 150. Under this condition, the maximum height of the concave and convex portion 130a formed on the clamp part 110b is obtained. FIG. 44 is a graph showing a relationship between the maximum height H of the space 26d of the center cap 26 and the maximum height of the concave and convex portion 130a formed on the clamp part 110b. Note that DEKTAK, an apparatus for measuring the shape of a front surface (manufactured by Sloan, Inc.) is used for measuring the height of the concave and convex portion.

As shown in FIG. 44, it is confirmed that the lower the maximum height H of the space 26d of the center cap 26 according to the embodiment of the present invention, which is used for forming the cover layer 150, is than 0.05 mm, the higher the maximum height of the concave and convex portion 130a formed on the clamp portion 110b becomes.

According to the fifth embodiment of the present invention, when the maximum height H of the space 26d of the center cap 26 is greater than or equal to 0.05 mm, the penetration of the liquid UV curing resin 330 into the center cap 26 due to capillary action is much reduced. Therefore, it is possible to substantially lower the maximum height of the concave and convex portion 130a formed on the clamp portion 110b of the substrate 110. As a result, when an optical information recording medium is loaded into an information recording reproduction apparatus, a tilting degree is reduced, which in turn can prevent the degradation of tilt characteristics such as jitter and error rates caused at the time of reproduction and/or recording.

Sixth Embodiment

In a sixth embodiment, two types of the center caps 26 each having a different radius $R_2$ in the cone-shaped part 26b, i.e., a center cap 26C for forming the intermediate layer 130 and a center cap 26D for forming the cover layer 150 are prepared. Here, the radius $R_2$ of the cone-shaped part 26b of the center cap 26C for forming the intermediate layer 130 is set to be 9 mm, the width $W_2$ of the end surface 26e is set to be 2 mm, and the maximum height H of the space 26d is changed between 0.01 mm and 0.3 mm to form the cover layer 150. Under this condition, the occurrence rate of the radial linear defects 36 is obtained.

Specifically, if one of "n" pieces of manufactured optical information recording media has even a small amount of the radial linear defects 36, it is determined to be defective (NG). Based on this rule, the occurrence rate of the radial linear defects 36 (=the number of defective pieces/n×100(%)) is obtained. Note that in the center cap 26D for forming the cover layer 150, the radius $R_2$ of the cone-shaped part 26b of the center cap 26D for forming the cover layer 150 is set to be 11 mm, the width $W_2$ of the end surface 26e is set to be 2 mm, and the maximum height H of the space 26d is set to be 0.05 mm.

Figure 45:
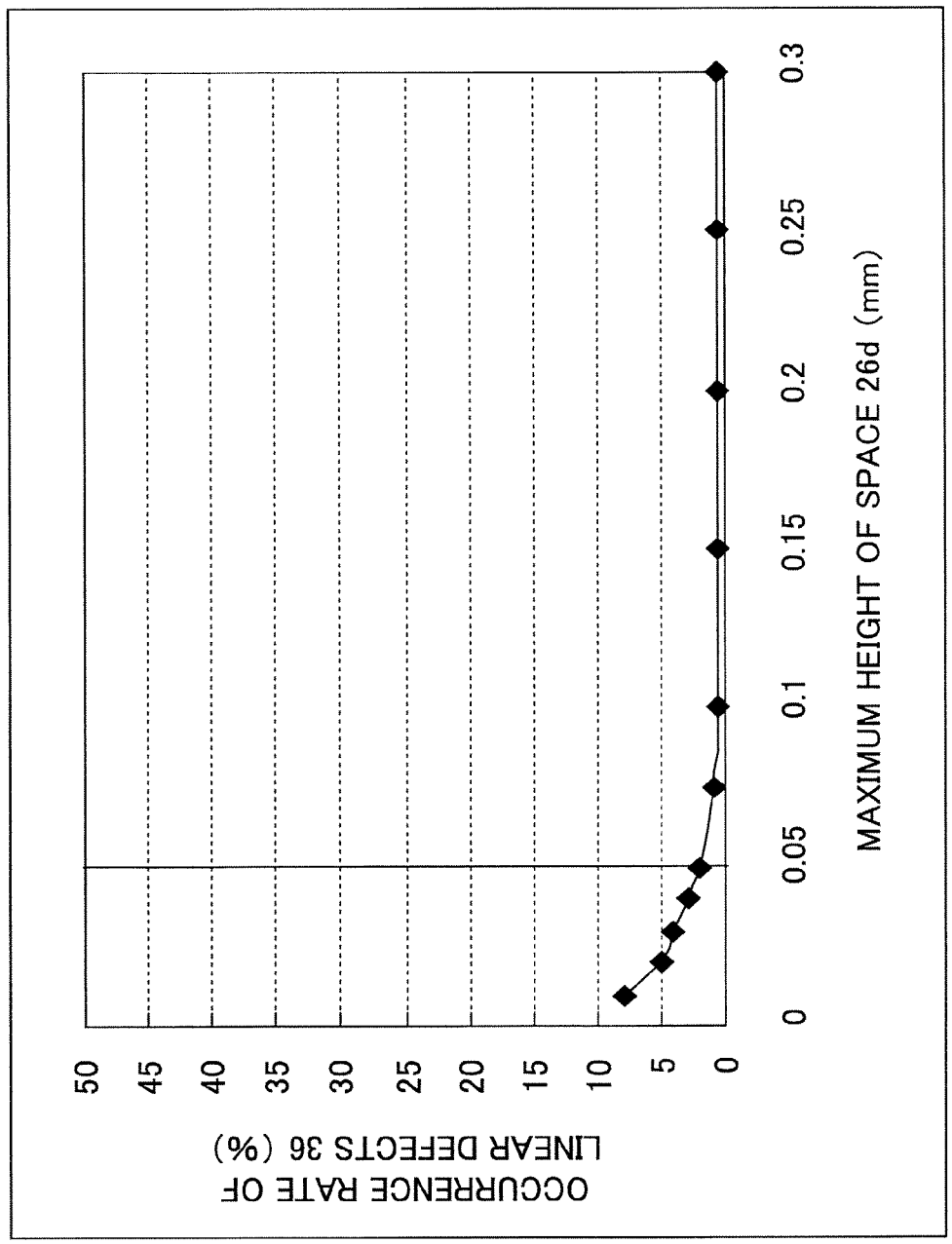
FIG. 45 is a graph showing a relationship between the maximum height H of the space 26d and the occurrence rate of the radial linear defects 36.

FIG. 45 is a graph showing a relationship between the maximum height H of the space 26d and the occurrence rate of the radial linear defects 36. As shown in FIG. 45, it is confirmed that the lower the maximum height H of the space 26d of the center cap 26C according to the embodiment of the present invention, which is used for forming the intermediate layer 130, is than 0.05 mm, the higher the occurrence rate of the radial linear defects 36 caused when the cover layer 150 is formed becomes.

According to the sixth embodiment of the present invention, when the maximum height H of the space 26d of the center cap 26C, which is used for forming the intermediate layer 130, is greater than or equal to 0.05 mm, the amount of the liquid UV curing resin 330 penetrating into the center cap 26 due to capillary action is much reduced. As a result, not only the maximum height of the concave and convex portion 130a formed on the clamp part 110b of the substrate 110, but also that of the convex portion 130b formed at the peripheral part (end part of the center cap 26C) of the clamp part 110b are substantially lowered. Therefore, the occurrence rate of the radial linear defects 36 caused when the cover layer 150 is formed is substantially reduced. Accordingly, it is possible to form the high-quality cover layer 150 without being influenced by the intermediate layer 130, which in turn can prevent the degradation of optical characteristics such as jitter and error rates caused at the time of reproduction and/or recording.

Note that when three or more of the intermediate layers and the cover layer are formed using the center caps 26 according to the embodiment of the present invention, it is important that the radius $R_2$ of the cone-shaped part 26b of the center cap 26 for forming the intermediate layer initially laminated is set to be the smallest, those of the cone-shaped part 26b of the center caps 26 for forming the intermediate layers successively laminated are set to be gradually larger, and that of the cone-shaped part 26b of the center cap 26 for forming the cover layer lastly laminated is set to be the largest. Accordingly, the center caps 26 having the radius $R_2$ of the cone-shaped part 26b optimized for the respective layers can be free from the slight convex portions at the peripheral part (end part of the center cap 26) of the clamp part 110b caused when the intermediate layers are formed, and so they are not influenced by the slight convex portions at the time of forming the their intermediate layers. As a result, it is possible to substantially reduce the occurrence rate of the radial linear defects 36 even in an optical information recording medium having the three-or-more-layered structure, which in turn can prevent the degradation of optical characteristics such as jitter and error rates caused at the time of reproduction and/or recording.

Seventh Embodiment

In a seventh embodiment, the radius $R_2$ of the cone-shaped part 26b of the center cap 26 shown in FIG. 37 is set to be 11 mm, the maximum height H of the space 26d is set to be 0.05 mm, and the width $W_2$ of the end surface 26e is changed between 0.1 mm and 3 mm to form the cover layer 150. Under this condition, the maximum height of the concave and convex portion 130a formed on the clamp part 110b is obtained. Note that DEKTAK, an apparatus for measuring the shape of a front surface (manufactured by Sloan, Inc.) is used for measuring the height of the concave and convex portion.

Figure 46:
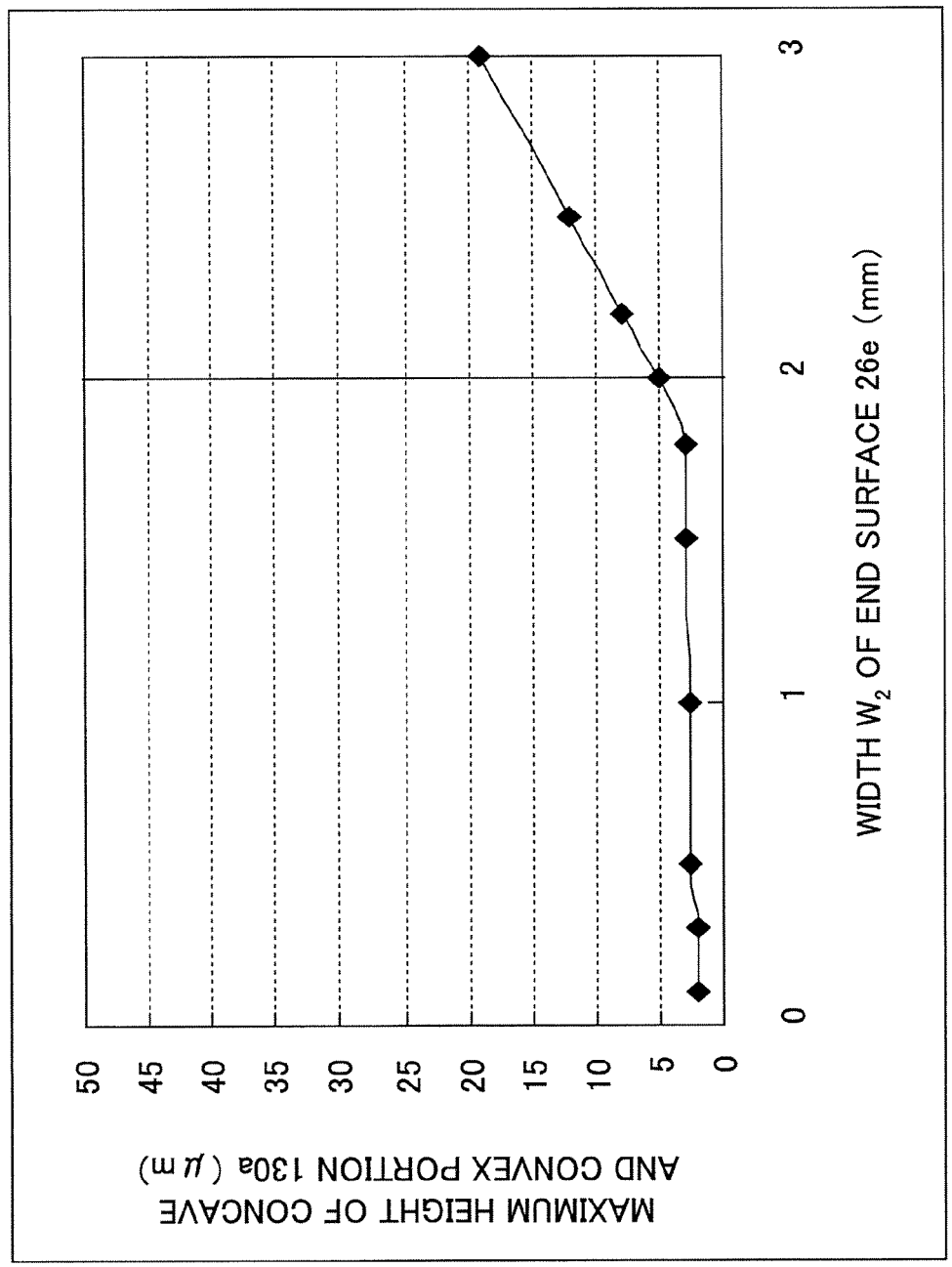
FIG. 46 is a graph showing a relationship between the width $W_2$ of an end surface 26e of the center cap 26 and the maximum height of the concave and convex portion 130a formed on the clamp part 110b.

FIG. 46 is a graph showing a relationship between the width $W_2$ of the end surface 26e of the center cap 26 and the maximum height of the concave and convex portion 130a formed on the clamp part 110b. As shown in FIG. 46, it is confirmed that the larger the width $W_2$ of the end surface 26e of the center cap 26 according to the embodiment of the present invention, which is used for forming the cover layer 150, is than 2 mm, the higher the maximum height of the concave and convex portion 130a formed on the clamp portion 110b becomes.

According to the seventh embodiment of the present invention, when the width $W_2$ of the end surface 26e of the center cap 26 is smaller than or equal to 2 mm, the amount of the liquid UV curing resin 330 penetrating into the center cap 26 due to capillary action is much reduced. Therefore, it is possible to substantially lower the maximum height of the concave and convex portion 130a formed on the clamp portion 110b of the substrate 110. As a result, when an optical information recording medium is loaded into an information recording reproduction apparatus, a tilting degree is reduced, which in turn can prevent the degradation of tilt characteristics such as jitter and error rates caused at the time of reproduction and/or recording.

Eighth Embodiment

In an eighth embodiment, two types of the center caps 26 each having a different radius $R_2$ in the cone-shaped part 26b, i.e., the center cap 26C for forming the intermediate layer 130 and the center cap 26D for forming the cover layer 150 are prepared. Here, the radius $R_2$ of the cone-shaped part 26b of the center cap 26C for forming the intermediate layer 130 is set to be 9 mm, the maximum height H of the space 26d is set to be 0.05 mm, and the width $W_2$ of the end surface 26e is changed between 0.1 mm and 0.3 mm to form the cover layer 150. Under this condition, the occurrence rate of the radial linear defects 36 is obtained. Note that in the center cap 26d for forming the cover layer 150, the radius $R_2$ of the cone-shaped part 26b is set to be 11 mm, the width $W_2$ of the end surface 26e is set to be 2 mm, and the maximum height H of the space 26d is 0.05 mm.

Figure 47:
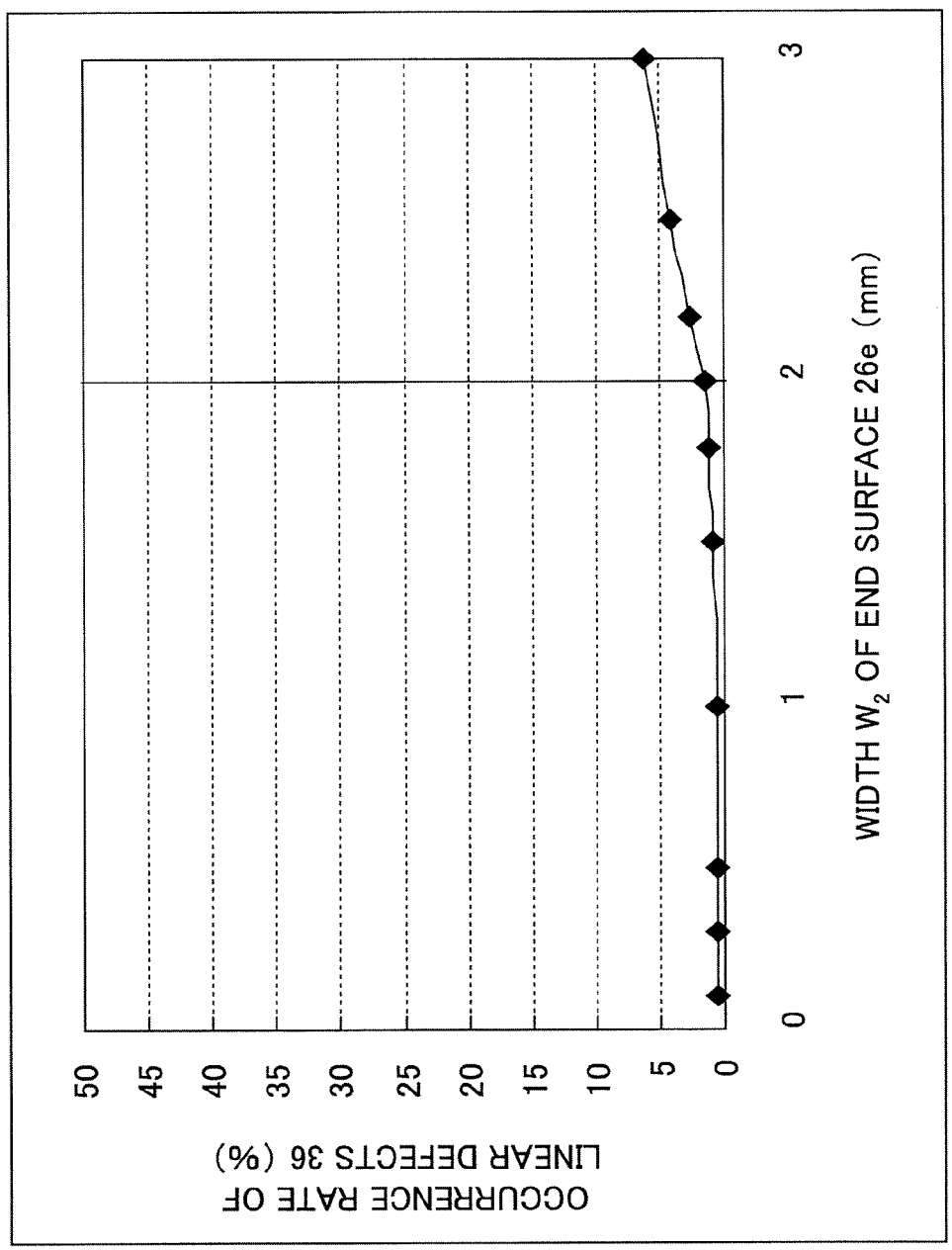
FIG. 47 is a graph showing a relationship between the width $W_2$ of the end surface 26e of a center cap 26C and the occurrence rate of the radial linear defects 36.

FIG. 47 is a graph showing a relationship between the width $W_2$ of the end surface 26e of the center cap 26C and the occurrence rate of the radial linear defects 36. As shown in FIG. 47, it is confirmed that the larger the width $W_2$ of the end surface 26e of the center cap 26C according to the embodiment of the present invention, which is used for forming the intermediate layer 130, is than 2 mm, the higher the occurrence rate of the radial linear defects 36 caused when the cover layer 150 is formed becomes.

According to the eighth embodiment of the present invention, when the width $W_2$ of the end surface 26e of the center cap 26C, which is used for forming the intermediate layer 130, is smaller than or equal to 2 mm, the amount of the liquid UV curing resin 330 penetrating into the center cap 26 due to capillary action is much reduced. As a result, not only the maximum height of the concave and convex portion 130a formed on the clamp part 110b of the substrate 110, but also that of the convex portion 130b formed at the peripheral part (end part of the center cap 26C) of the clamp part 110b are substantially lowered. Therefore, the occurrence rate of the radial linear defects 36 caused when the cover layer 150 is formed is reduced. Accordingly, it is possible to form the high-quality cover layer 150 without being influenced by the intermediate layer 130, which in turn can prevent the degradation of optical characteristics such as jitter and error rates caused at the time of reproduction and/or recording.

Note that when three or more of the intermediate layers and the cover layer are formed using the center caps 26 according to the embodiment of the present invention, it is important that the radius $R_2$ of the cone-shaped part 26b of the center cap 26 for forming the intermediate layer initially laminated is set to be the smallest, those of the cone-shaped part 26b of the center caps 26 for forming the intermediate layers subsequently laminated are set to be gradually larger, and that of the cone-shaped part 26b of the center cap 26 for forming the cover layer lastly laminated is set to be the largest. Accordingly, the center caps 26 having the radius $R_2$ of the cone-shaped part 26b optimized for the respective layers can be free from the slight convex portions at the peripheral part (end part of the center cap 26) of the clamp part 110b caused when the intermediate layers are formed, and so they are not influenced by the small convex portions at the time of forming the their intermediate layers. As a result, it is possible to substantially reduce the occurrence rate of the radial linear defects 36 even in an optical information recording medium having the three-or-more-layered structure, which in turn can prevent the degradation of optical characteristics such as jitter and error rates caused at the time of reproduction and/or recording.

Ninth Embodiment

Figure 3A:
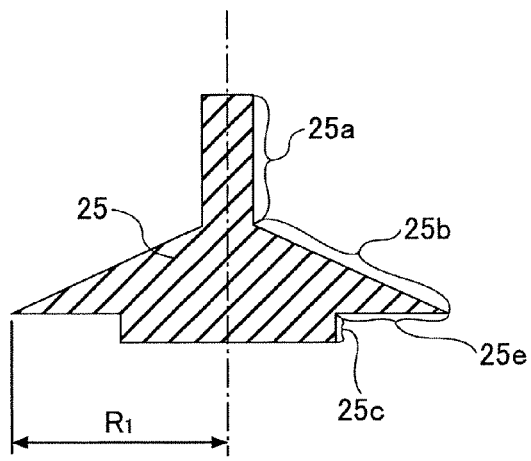
FIGS. 3A through 3C are views showing a conventional center cap 25 used for forming layers on the substrate by the spin coat method.
Figure 3B:
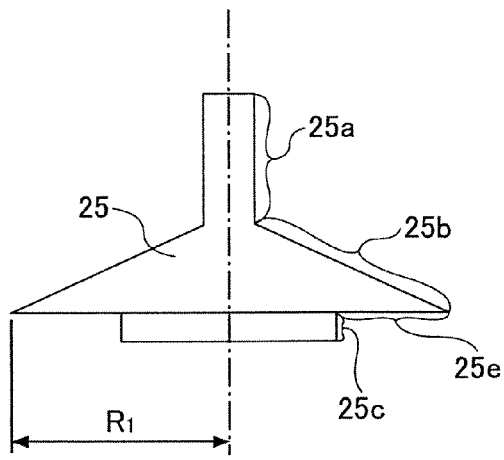
Figure 3C:
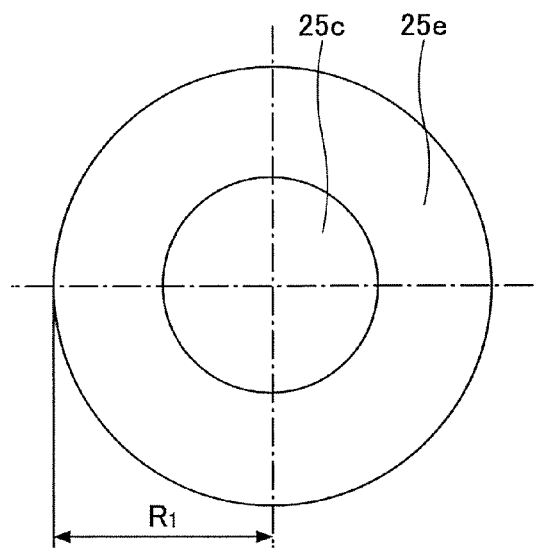
Figure 5:
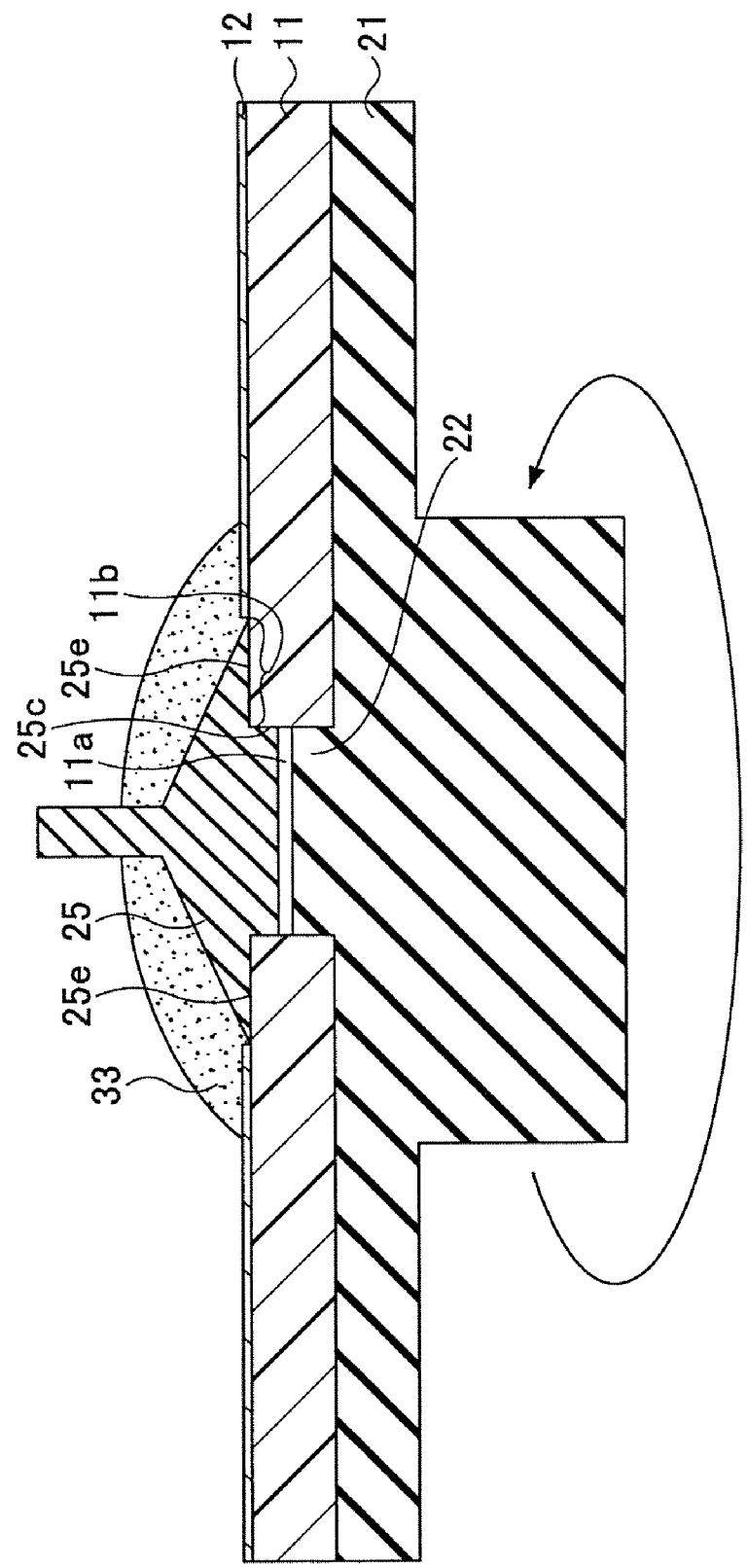
FIG. 5 is a cross-sectional view (part 2) for explaining the conventional method in which the intermediate layer 13 and the cover layer 15 are formed by the spin coat method in the optical information recording medium 10 having the double-layered structure.
Figure 6:
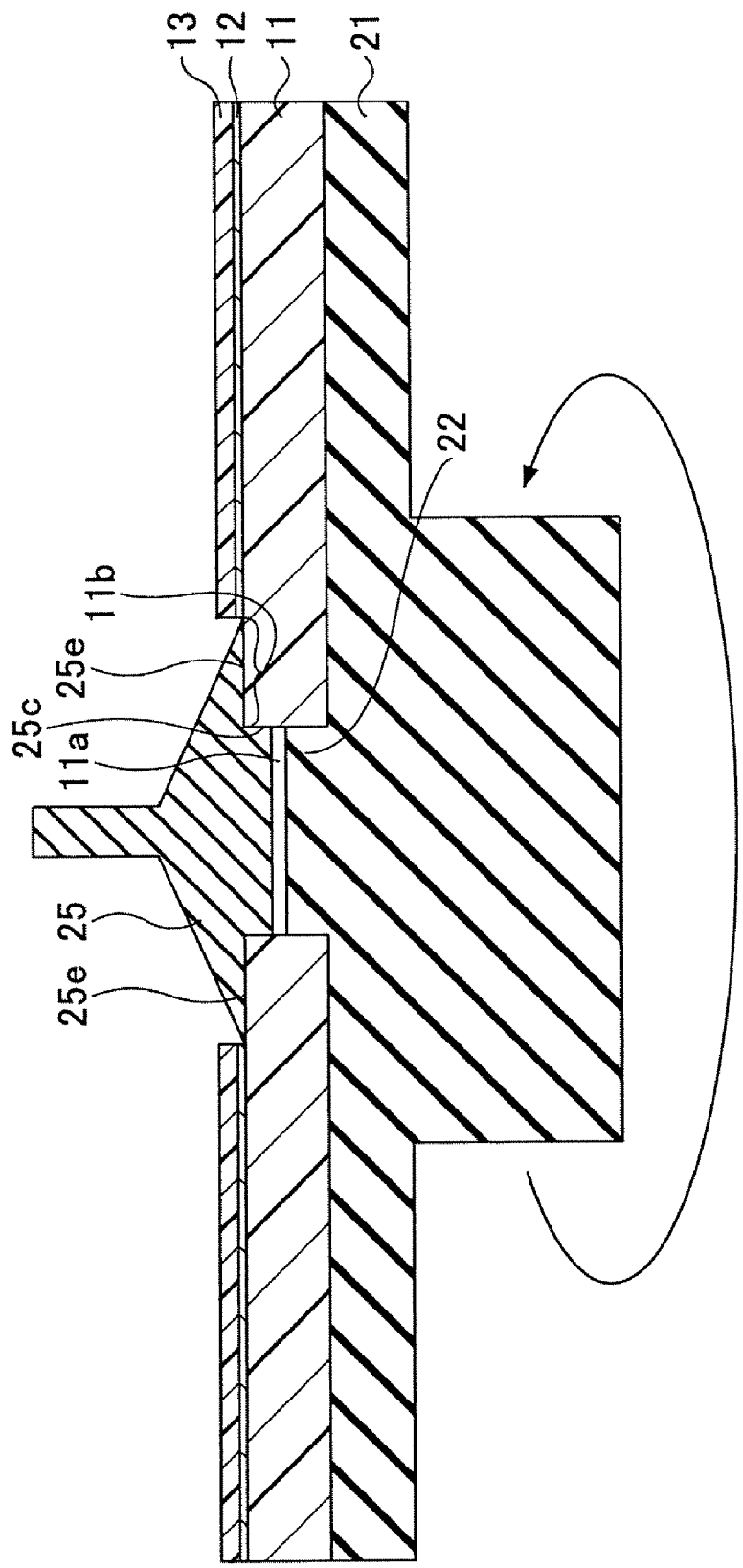
FIG. 6 is a cross-sectional view (part 3) for explaining the conventional method in which the intermediate layer 13 and the cover layer 15 are formed by the spin coat method in the optical information recording medium 10 having the double-layered structure.
Figure 7:
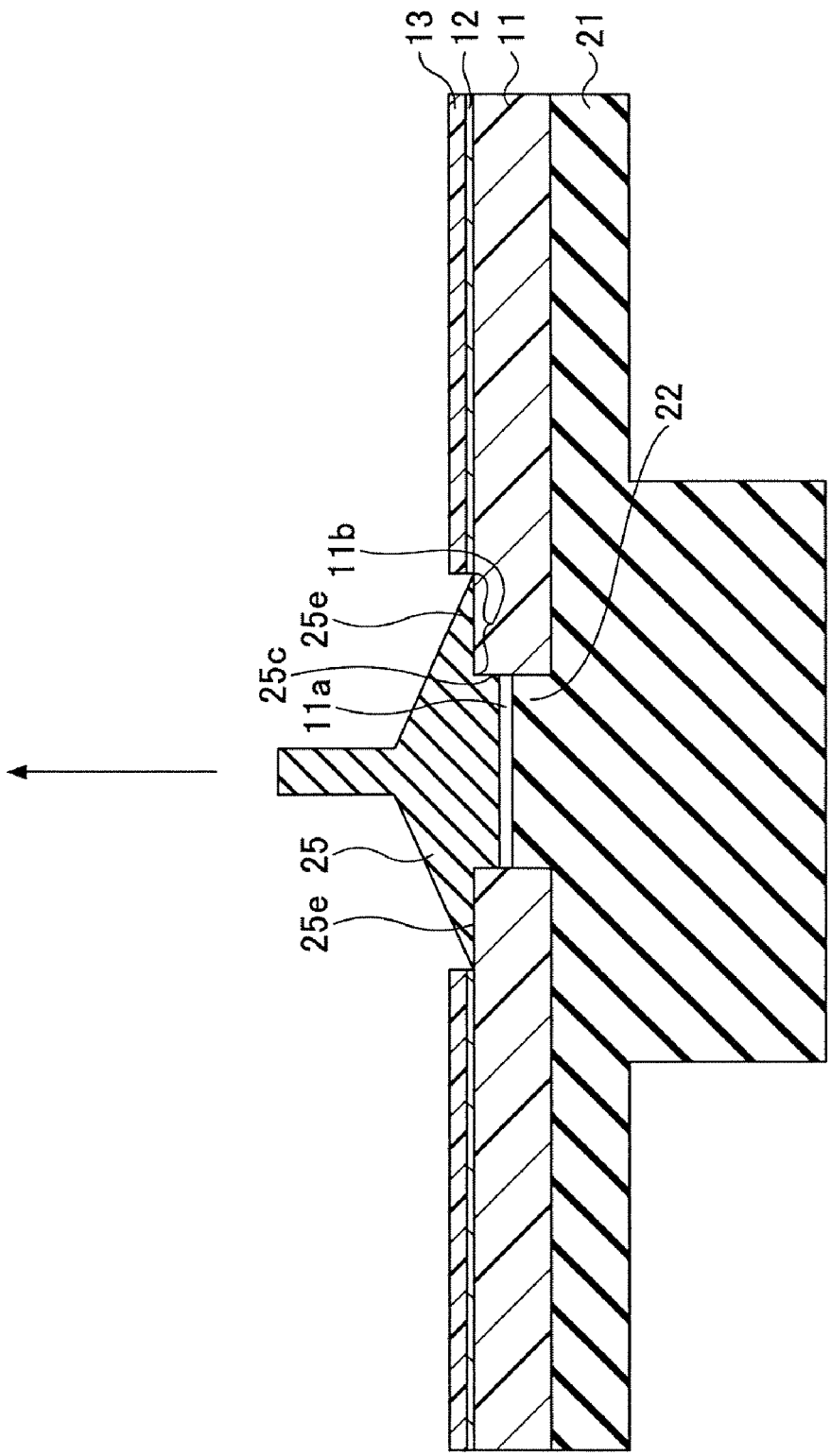
FIG. 7 is a cross-sectional view (part 4) for explaining the conventional method in which the intermediate layer 13 and the cover layer 15 are formed by the spin coat method in the optical information recording medium 10 having the double-layered structure.
Figure 8:
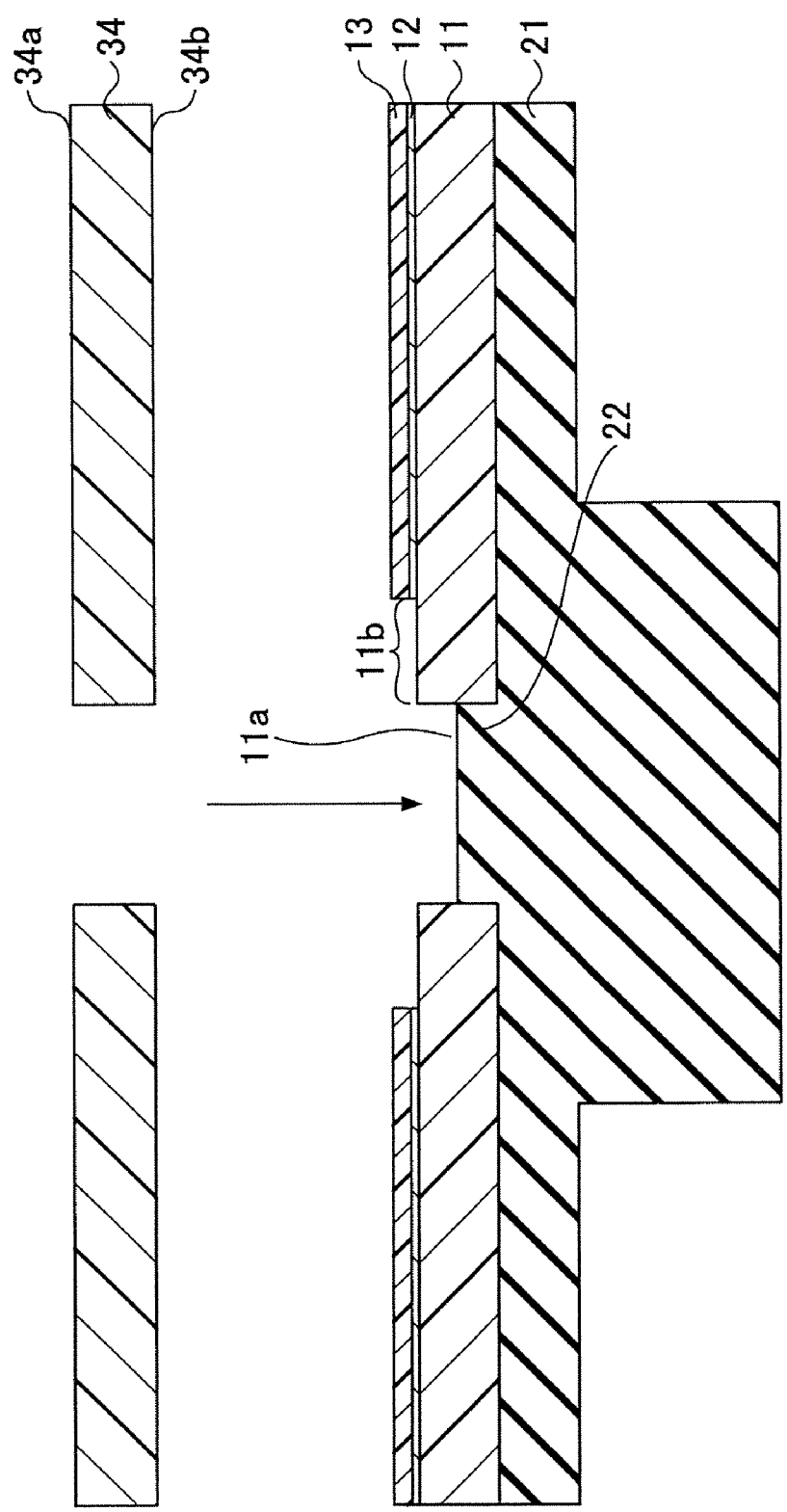
FIG. 8 is a cross-sectional view (part 5) for explaining the conventional method in which the intermediate layer 13 and the cover layer 15 are formed by the spin coat method in the optical information recording medium 10 having the double-layered structure.
Figure 9:
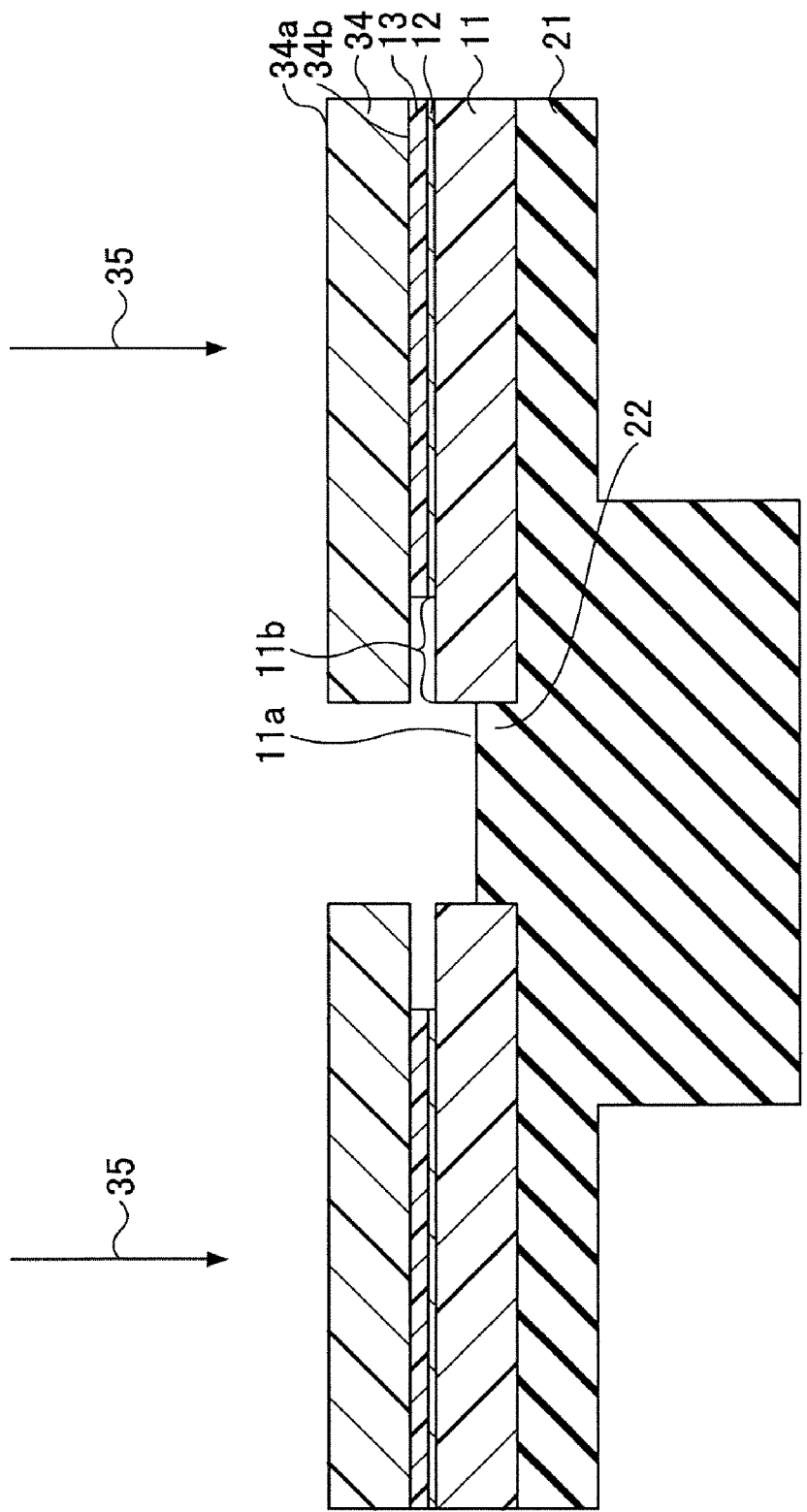
FIG. 9 is a cross-sectional view (part 6) for explaining the conventional method in which the intermediate layer 13 and the cover layer 15 are formed by the spin coat method in the optical information recording medium 10 having the double-layered structure.
Figure 10:
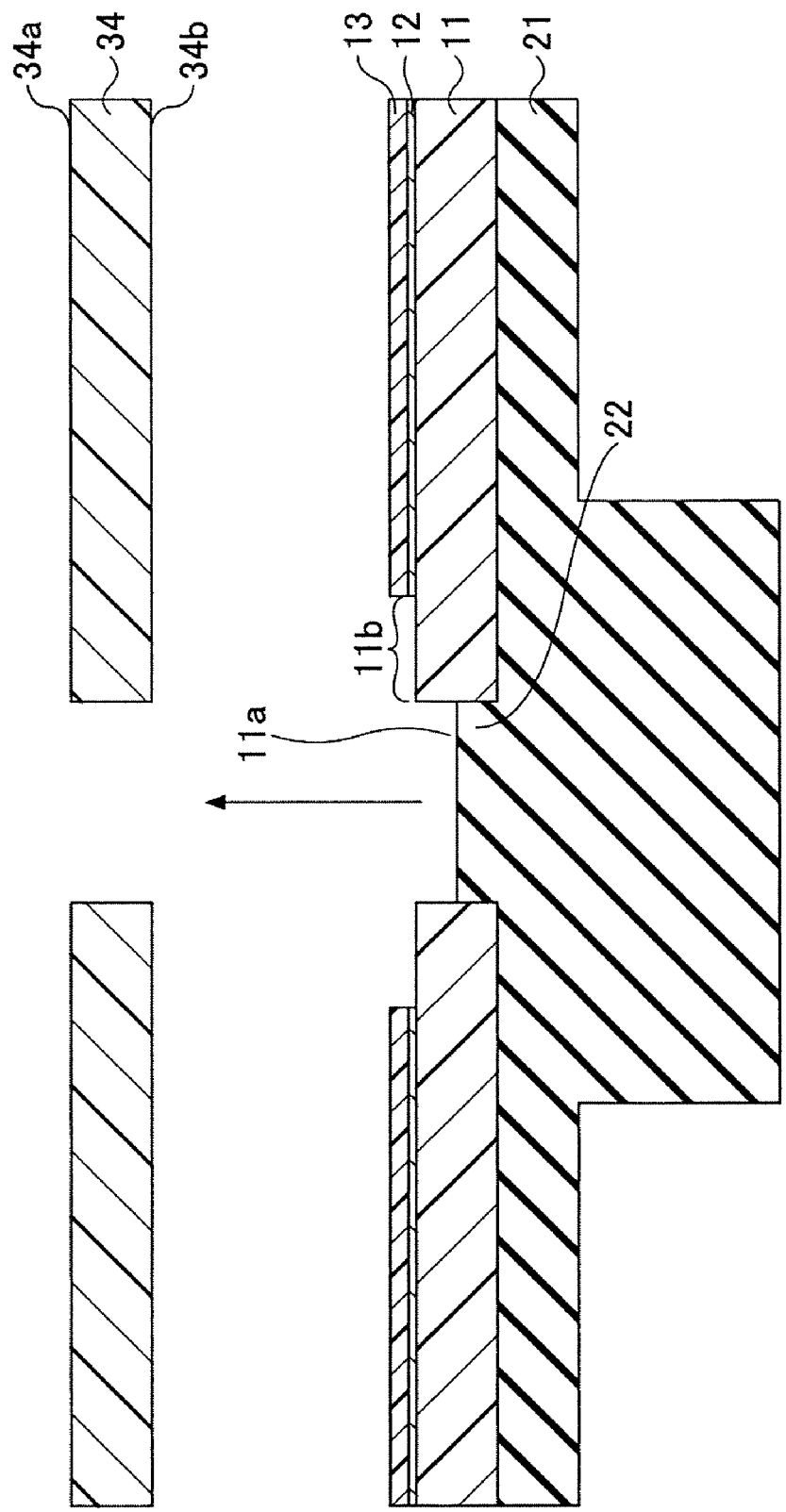
FIG. 10 is a cross-sectional view (part 7) for explaining the conventional method in which the intermediate layer 13 and the cover layer 15 are formed by the spin coat method in the optical information recording medium 10 having the double-layered structure.
Figure 11:
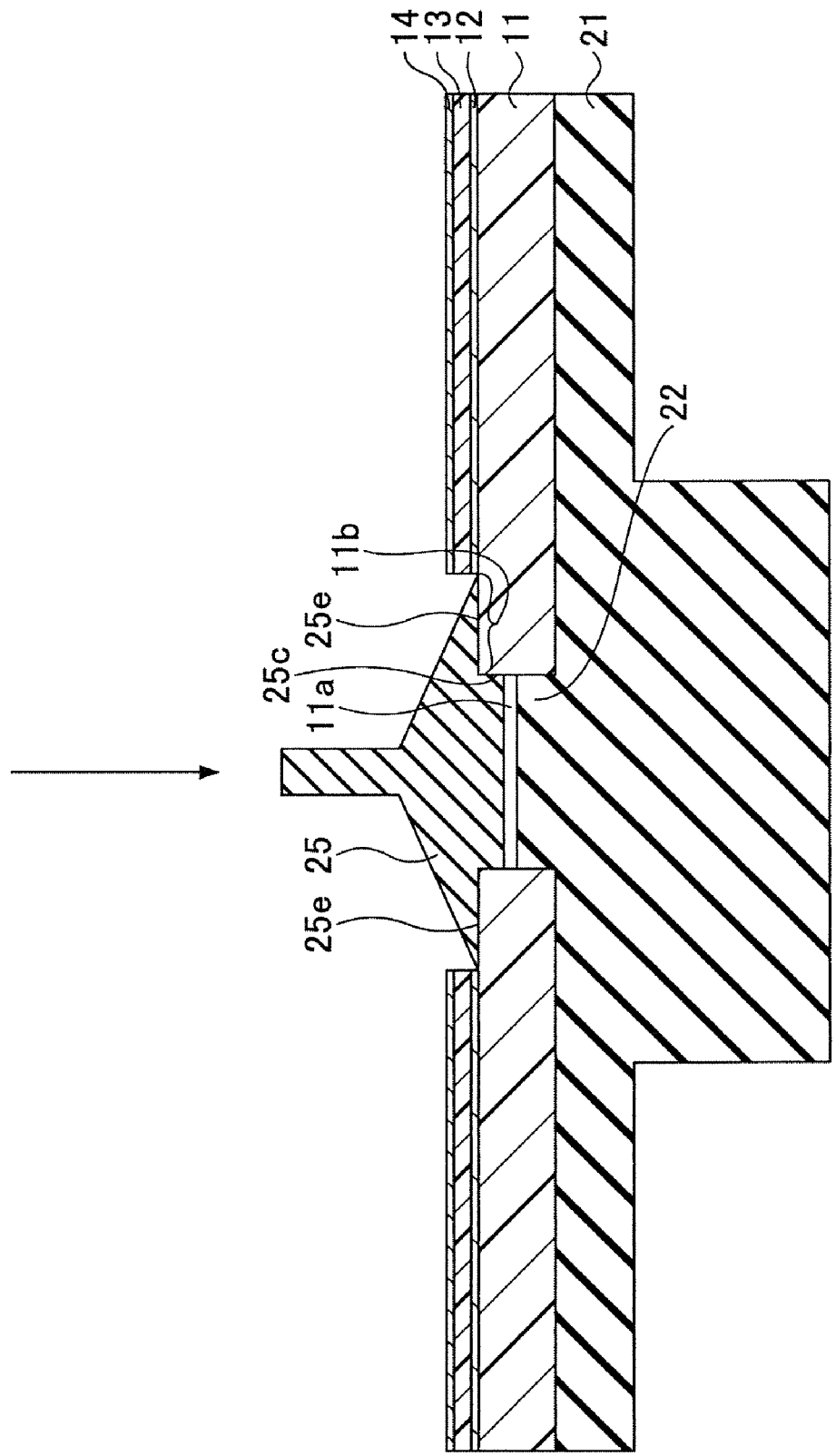
FIG. 11 is a cross-sectional view (part 8) for explaining the conventional method in which the intermediate layer 13 and the cover layer 15 are formed by the spin coat method in the optical information recording medium 10 having the double-layered structure.
Figure 12:
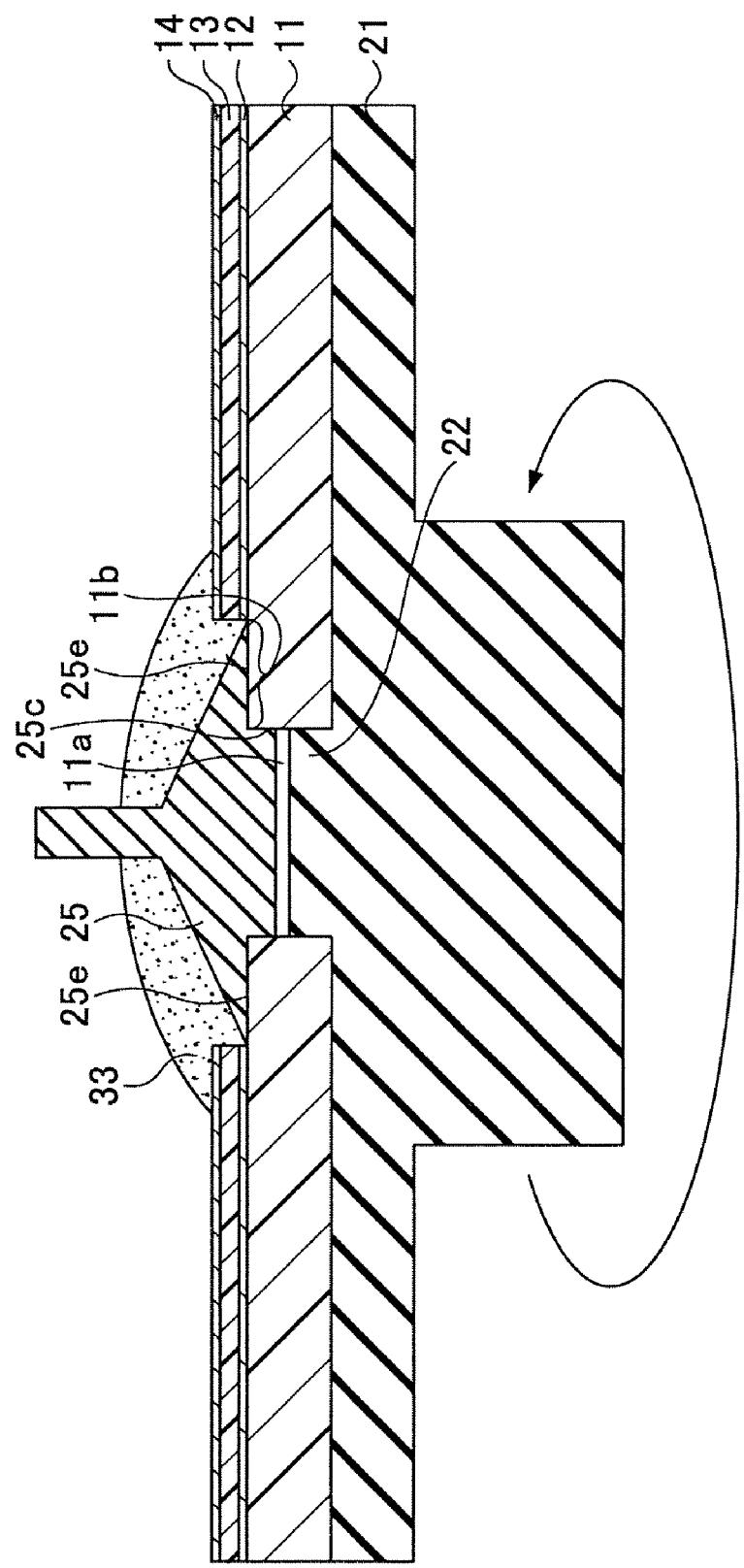
FIG. 12 is a cross-sectional view (part 9) for explaining the conventional method in which the intermediate layer 13 and the cover layer 15 are formed by the spin coat method in the optical information recording medium 10 having the double-layered structure.
Figure 13:
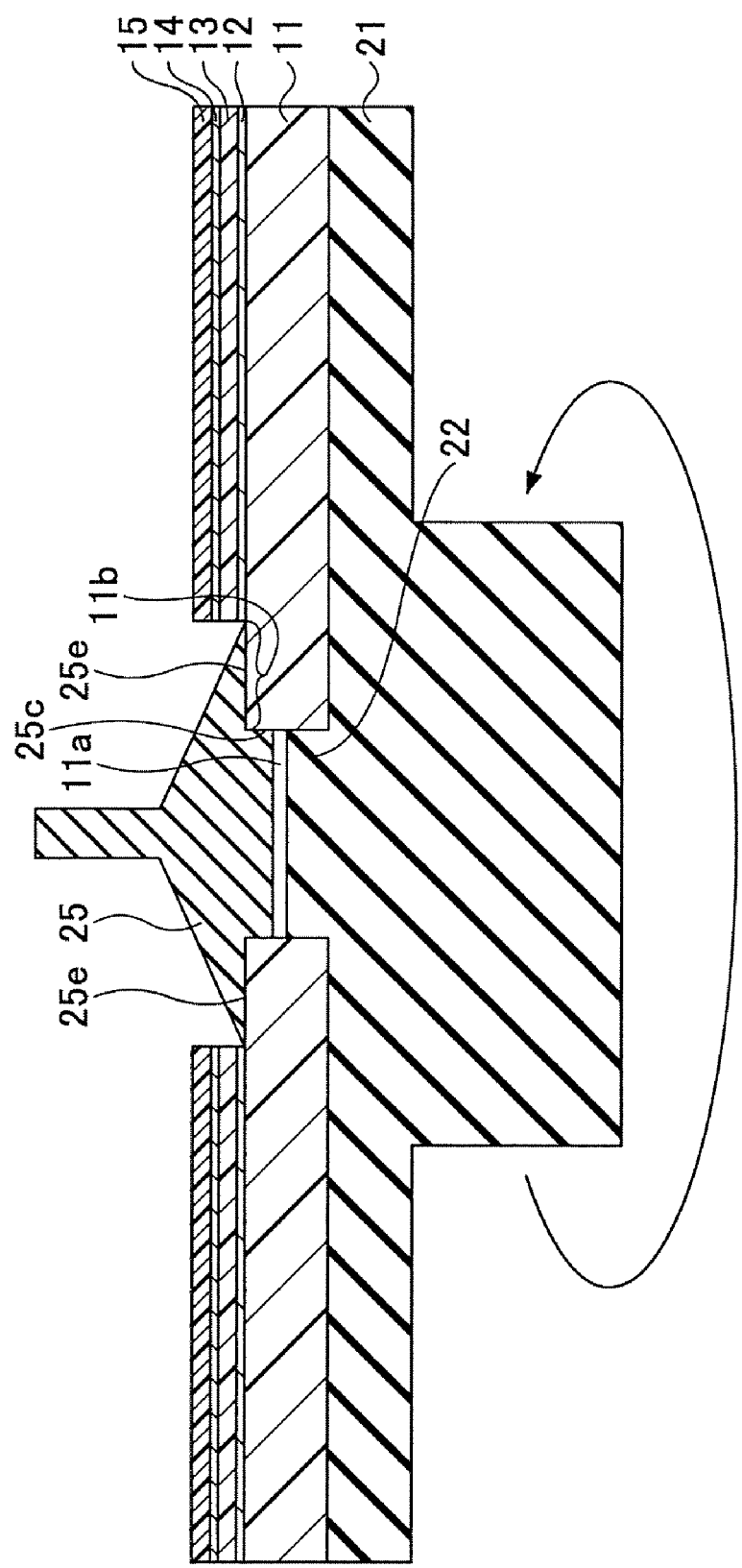
FIG. 13 is a cross-sectional view (part 10) for explaining the conventional method in which the intermediate layer 13 and the cover layer 15 are formed by the spin coat method in the optical information recording medium 10 having the double-layered structure.
Figure 14:
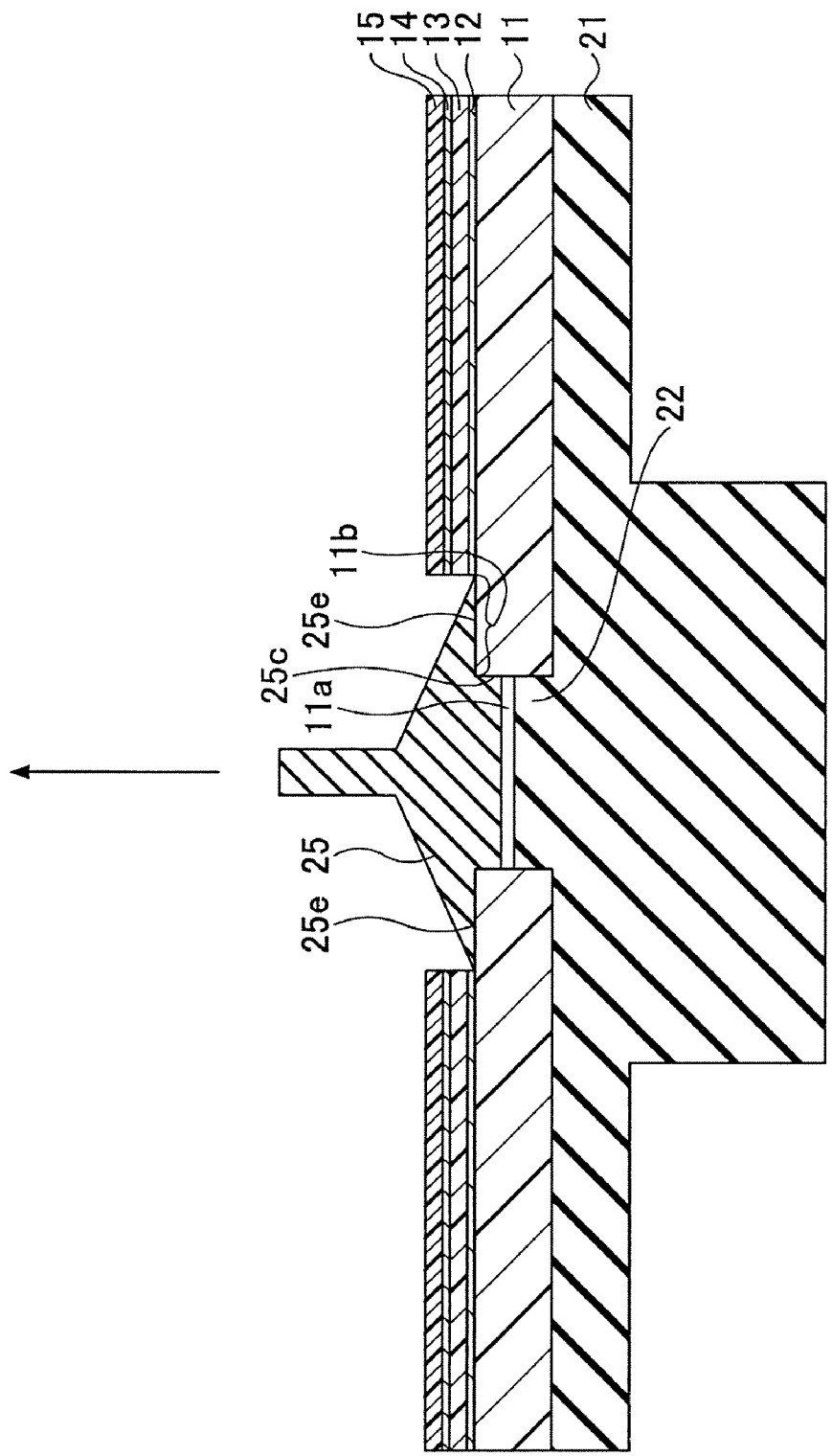
FIG. 14 is a cross-sectional view (part 11) for explaining the conventional method in which the intermediate layer 13 and the cover layer 15 are formed by the spin coat method in the optical information recording medium 10 having the double-layered structure.
Figure 15:
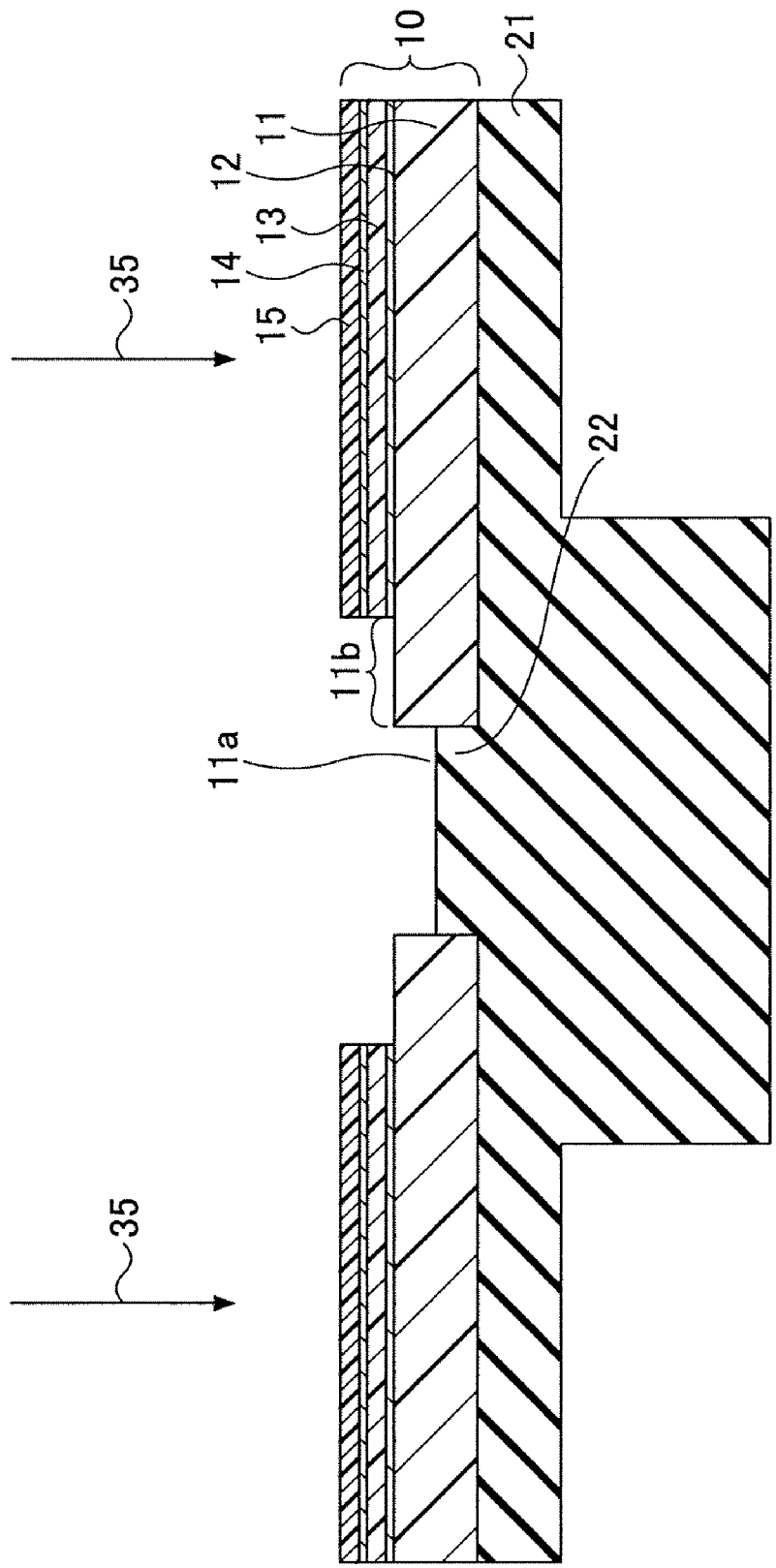
FIG. 15 is a cross-sectional view (part 12) for explaining the conventional method in which the intermediate layer 13 and the cover layer 15 are formed by the spin coat method in the optical information recording medium 10 having the double-layered structure.

In a ninth embodiment, a center cap different in shape from the center cap 25 shown in FIGS. 3A through 3C and the center cap 26 shown in FIGS. 37A through 37D is used. FIGS. 48A and 48B are views showing a center cap 27 according to the embodiment of the present invention used for forming layers on the substrate by the spin coat method. FIG. 48A is a front view of the center cap 27, and FIG. 48B is a plan view thereof.

The center cap 27 shown in FIGS. 48A and 48B has a fitting part 27c fitted in the center hole 110a of the substrate 110; a cone-shaped part 27b that is provided concentrically with the fitting part 27c, made parallel to the substrate 110 when the fitting part 27c is fitted in the center hole 110a of the substrate 110, and has an end surface 27e that is an annular-shaped plane having a diameter larger than that of the fitting part 27c; and a cylindrical-shaped projection part 27a provided concentrically with the cone-shaped part 27b at the upper part of the cone-shaped part 27b.

The center cap 27 is provided with an air introduction hole 27x. The air introduction hole 27x has a structure in which a vertical hole that is provided in the Z direction and penetrates the upper surface of the projection part 27a and the lower surface of the fitting part 27c and a horizontal hole that is provided in the X direction of the fitting part 27c and penetrates the fitting part 27c are communicated with each other in the fitting part 27c. In other words, the air introduction hole 27x has four opening parts including a first opening part provided at the upper surface of the projection part 27a, a second opening part provided at the lower surface of the fitting part 27c, and third and fourth opening parts provided at opposing positions of the side surface of the fitting part 27c.

Then, in the same manner as the above, the substrate 110 is mounted on the rotating table 210 so as to make the center hole 110a fitted in the substrate positioning part 220. Subsequently, negative pressure is caused to act on the sucking hole through the sucking passage (not shown) to suck, fix, and hold the substrate 110 mounted on the rotating table 210. After that, the fitting part 25c of the center cap 25 is fitted in the center hole 110a of the substrate 110.

Figure 49:
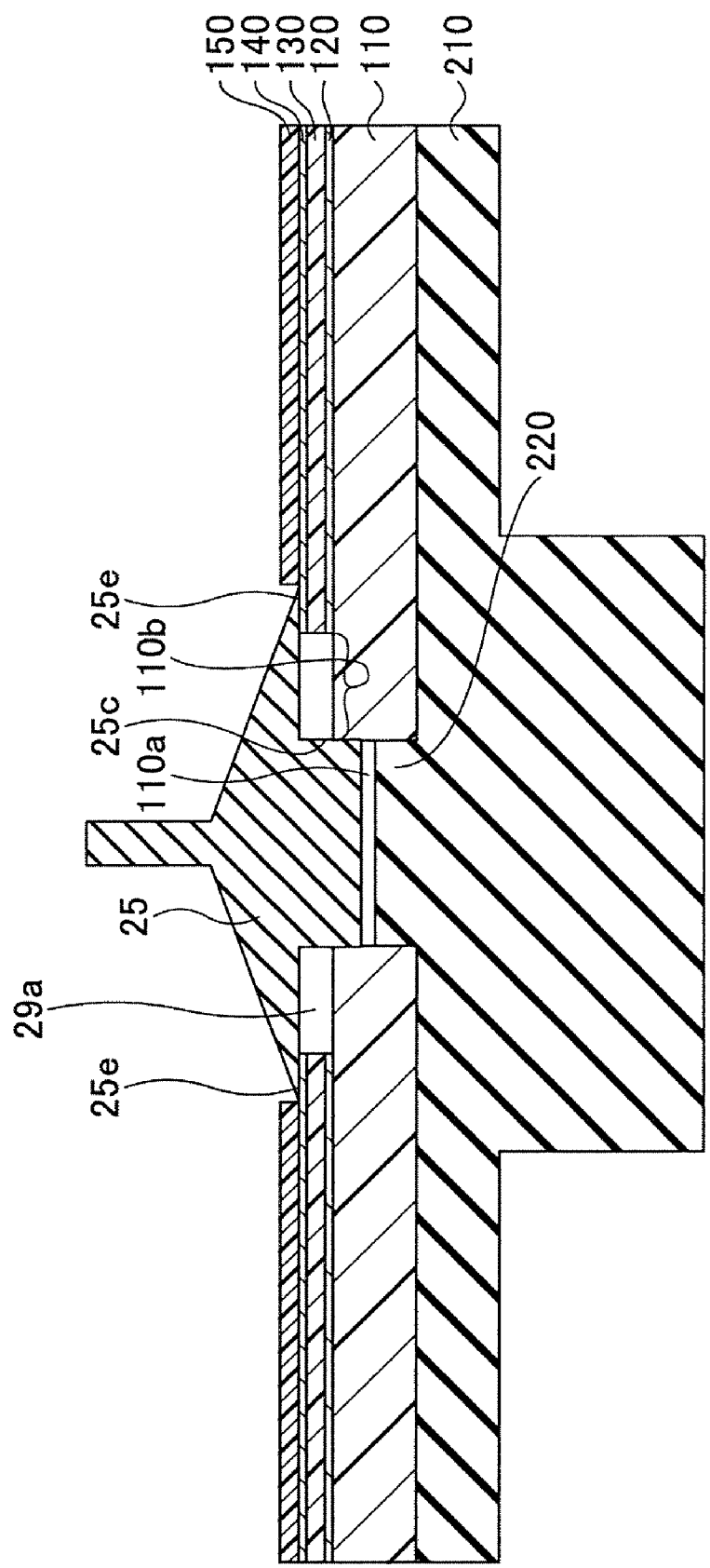
FIG. 49 is a view showing a state in which a fitting part 25c of a center cap 25 is fitted in a center hole 110a of the substrate 110.

FIG. 49 is a view showing a state in which the fitting part 25c of the center cap 25 is fitted in the center hole 110a of the substrate 110. The negative pressure for sucking, fixing, and holding the substrate 110 also influences a gap 29a between the center cap 25 and the substrate 110 shown in FIG. 49. As a result, the negative pressure may be caused also in the gap 29a. In this case, when the UV curing resin 330 is coated on the center cap 25, the penetration of the UV curing resin 330 into the gap 29a is promoted, which in turn forms the convex portion at the peripheral part of the clamp part of the substrate.

FIG. 50 is a view showing a state in which the fitting part 27c of the center cap 27 is fitted in the center hole 110a of the substrate 110. As shown in FIG. 50, because air flows in the gap 29a from the air introduction hole 27x when the center cap 27 is used, the negative pressure caused in the gap 29a can be prevented.

According to the ninth embodiment of the present invention, the center cap 27 provided with the air introduction hole 27x is used for forming the intermediate layer 130 or the cover layer 150. Therefore, the negative pressure caused in the gap 29a between the center cap 27 and the substrate 110 can be prevented. As a result, the negative pressure for sucking, fixing, and holding the substrate 110 does not promote the penetration of the UV curing resin 330 into the gap 29a when the UV curing resin 330 is coated on the center cap 27. Thus, the formation of the convex portion at the peripheral part of the clamp part of the substrate can be prevented.

Note that the ninth embodiment exemplifies the center cap 27 obtained by providing the air introduction hole 27x for the center cap 25. However, it is also possible to provide the air introduction hole for the center cap 26, which in turn provides the same effects.

Tenth Embodiment

Figure 51B:
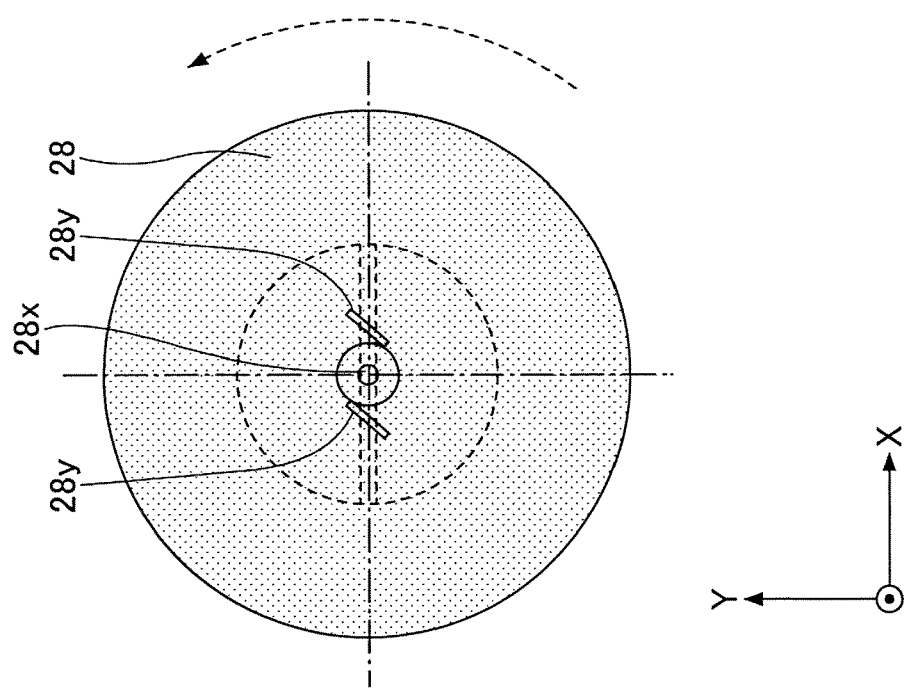
FIGS. 51A and 51B are views showing a center cap 28 according to the embodiment of the present invention used for forming layers on the substrate by the spin coat method.
Figure 51A:
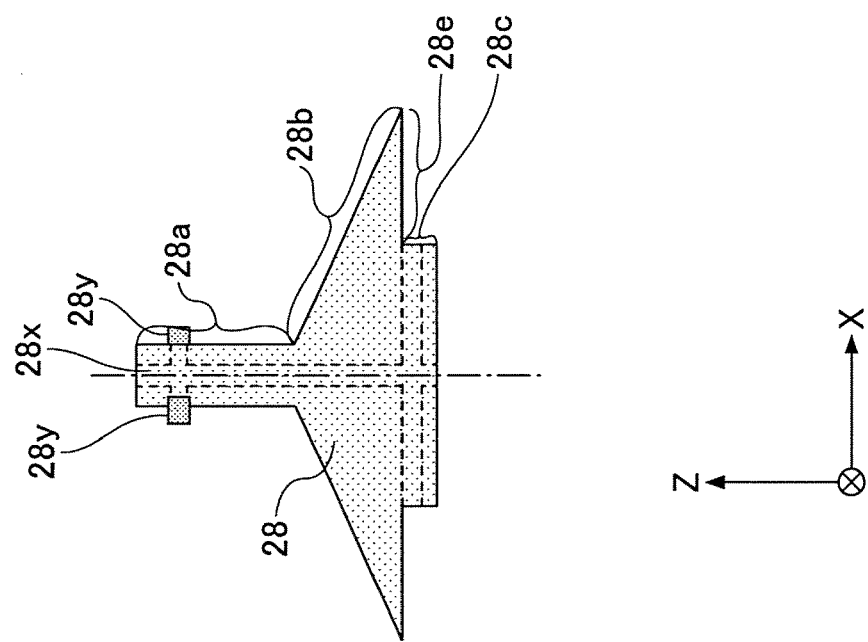

In a tenth embodiment, a modified example of the center cap 27 shown in FIGS. 48A and 48B is shown. FIGS. 51A and 51B are views showing a center cap 28 according to the embodiment of the present invention used for forming layers on the substrate by the spin coat method. FIG. 51A is a front view of the center cap 28, and FIG. 51B is a plan view thereof. In FIG. 51B, an arrow followed by dashed lines indicates the rotating direction of the center cap 28.

The center cap 28 shown in FIGS. 51A and 51B has a fitting part 28c fitted in the center hole 110a of the substrate 110; a cone-shaped part 28b that is provided concentrically with the fitting part 28c, made parallel to the substrate 110 when the fitting part 28c is fitted in the center hole 110a of the substrate 110, and has an end surface 28e that is an annular-shaped plane having a diameter larger than that of the fitting part 28c; and a cylindrical-shaped projection part 28a provided concentrically with the cone-shaped part 28b at the upper part of the cone-shaped part 28b.

The center cap 28 is provided with an air introduction hole 28x and air introduction members 28y. The air introduction hole 28x has a structure in which a vertical hole that is provided in the Z direction and penetrates the upper surface of the projection part 28a and the lower surface of the fitting part 28c, a horizontal hole that is provided in the X direction of the projection part 28a and penetrates the projection part 28a, and a horizontal hole that is provided in the X direction of the fitting part 28c and penetrates the fitting part 28c are communicated with each other in the projection part 28a and the fitting part 28c.

In other words, the air introduction hole 28x has six opening parts including a first opening part provided at the upper surface of the projection part 28a, a second opening part provided at the lower surface of the fitting part 28c, third and fourth opening parts provided at opposing positions of the side surface of the projection part 28a, and fifth and sixth opening parts provided at opposing positions of the side surface of the fitting part 28c.

In the vicinity of the third and fourth opening parts provided at the opposing positions of the side surface of the projection part 28a, the air introduction members 28y, which introduce air into the air introduction hole 28x when the center cap 28 is rotated, are provided. As an example of the air introduction members 28y provided, metal, plastic, etc., can firmly be fixed to the center cap 28. The air introduction members 28y may integrally be molded with the center cap 28.

With the provision of the air introduction members 28y, air can efficiently be introduced from the third and fourth opening parts provided at the opposing positions of the side surface of the projection part 28a into the air introduction hole 28x when the center cap 28 is rotated in the direction indicated by the arrow followed by dashed lines of FIG. 51B in the step, for example, shown in FIG. 22.

According to the tenth embodiment of the present invention, the center cap 28 having the air introduction hole 28x and the air introduction members 28y is used for forming the intermediate layer 130 or the cover layer 150. Therefore, similar to the case of the ninth embodiment, the negative pressure caused in the gap 29a between the center cap 28 and the substrate 110 can be prevented. As a result, the negative pressure for sucking, fixing, and holding the substrate 110 does not promote the penetration of the UV curing resin 330 into the gap 29a when the UV curing resin 330 is coated on the center cap 28. Thus, the formation of the convex portion at the peripheral part of the clamp part of the substrate can be prevented. In addition, with the provision of the air introduction members 28y in the vicinity of the third and fourth opening parts of the center cap 28, air can efficiently be introduced into the air introduction hole 28x.

Note that the tenth embodiment exemplifies the center cap 28 obtained by providing the outer introduction hole 28x for the center cap 27. However, it is also possible to provide the air introduction hole and the air introduction members for the center cap 26, which in turn provides the same effects.

Comparative Example 1

Figure 52:
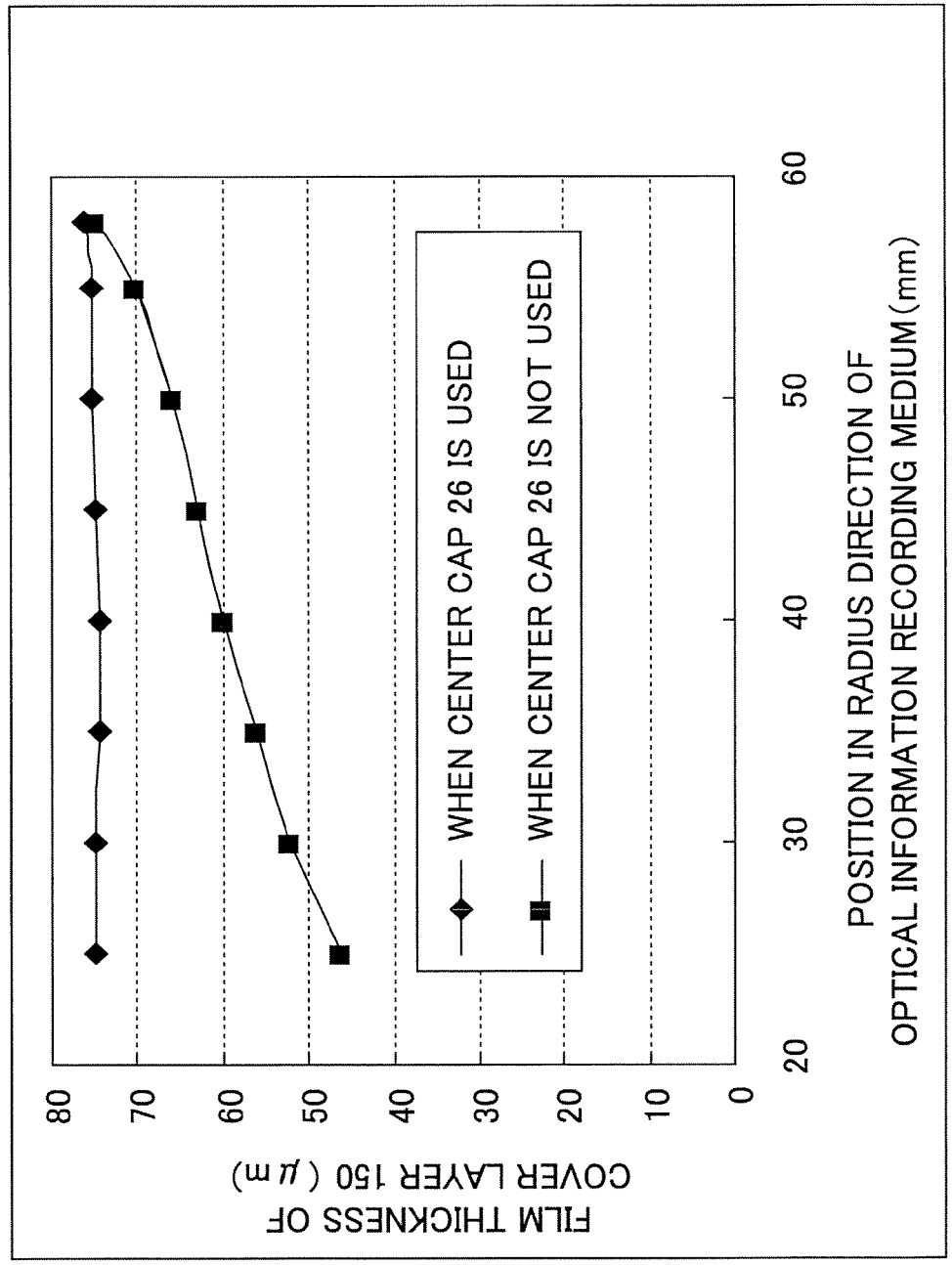
FIG. 52 is a graph showing a relationship between the position in the radius direction of an optical information recording medium and the film thickness of the cover layer 150.

A comparative example 1 shows a difference between the thickness profile of inner and outer circumferences when the cover layer 150 is formed using the center cap 26 according to the embodiments of the present invention and that of inner and outer circumferences when the cover layer 150 is formed without using the center cap. FIG. 52 is a graph showing a relationship between the position in the radius direction of an optical information recording medium and the film thickness of the cover layer 150. As shown in FIG. 52, when the cover layer 150 is formed using the center cap 26 according to the embodiments of the present invention, the cover layer 150 having a nearly uniform film thickness of 75 μm is obtained. However, when the cover layer 150 is formed without using the center cap, the film thickness of the cover layer 150 cannot be made uniform under any circumstances.

Because a liquid is successively moved from the inner circumference to the outer circumference due to centrifugal force when the center cap is not used, the film thickness of the outer circumference is made thicker than that of the inner circumference. As shown in FIGS. 37A through 37D, the center cap 26 according to the embodiments of the present invention has the cone-shaped part 26b that is, for example, of a conical shape. Therefore, when the center cap 26 according to the embodiments of the present invention is used, a UV curing resin liquid dropped onto the center cap 26 is supplied from a further inner side of an inner circumference via the cone-shaped part 26b that is, for example, of a conical shape,
moving from the inner circumference to the outer circumference due to centrifugal force. As a result, a film uniform from the inner circumference part to an outer circumference part can be obtained.

Thus, the center cap 26 having the cone-shaped part 26b that is, for example, of a conical shape inclined from the inner circumference to the outer circumference is used for forming the cover layer 150 of an optical information recording medium having one or more information layers, which in turn can provide an optical information recording medium having a single-or-multiple-layered structure in which the maximum height of the concave and convex portion 130a formed on the clamp part 110b of the substrate 110 is much lower than that of conventional optical information recording media and which have a uniform film thickness from the inner circumference to the outer circumference.

In addition, the center cap 26 having the cone-shaped part 26b that is, for example, of a conical shape inclined from the inner circumference to the outer circumference is used for forming the intermediate layer 130 and the cover layer 150 of an optical information recording medium having two or more information layers, which in turn can provide an optical information recording medium having a multiple-layered structure which hardly causes the radial linear defects 36 and which provides a uniform film thickness from the inner circumference to the outer circumference.

The present invention is not limited to the specifically disclosed embodiments, and variations and modifications may be made without departing from the scope of the present invention.

For example, the present invention is applicable not only to an optical information recording medium but also to those in which layers are formed on the substrate having a through-hole at its center by the spin coat method.

Furthermore, in the embodiments of the present invention, the layers formed by the spin coat method are not limited to the cover layer and the intermediate layer.

Furthermore, in the ninth and tenth embodiments, the air introduction hole and the air introduction members are provided for the center cap, but they are not limited to those shown in FIGS. 48A 48B and FIGS. 51A and 51B. In other words, the structure, etc., of the air introduction hole and the shape, etc., of the air introduction members may be of any type so long as they can prevent the negative pressure caused between the gap between the center cap and the substrate.

The present application is based on Japanese Priority Application Nos. 2007-309101 and 2007-309102 filed on Nov. 29, 2007, and Japanese Priority Application No. 2008-133509 filed on May 21, 2008, the entire contents of which are hereby incorporated herein by reference.

What is claimed is:

1. A method for manufacturing an optical information recording medium, the method comprising:
    laminating plural layers successively on a substrate having a through-hole at its center; and
    fitting center caps each having a predetermined radius in the through-hole to form at least two of the plural layers by a spin coat method;
    wherein a radius of a first center cap used for forming an upper layer of the at least two layers is larger than a radius of a second center cap used for forming a lower layer thereof, and
    wherein each of the center caps includes:
        a fitting part fitted in the through-hole,
        a cone-shaped part that is provided concentrically with the fitting part, made parallel to the substrate, and has an end surface that is an annular-shaped plane having a diameter larger than a diameter of the fitting part, a projection part provided concentrically with the cone-shaped part at its upper part and an air introduction hole that penetrates the projection part and the fitting part, wherein the air introduction hole includes an opening part at an upper surface of the projection part, an opening part at a lower surface of the fitting part and opening parts at each side surface of the fitting part.

2. The method for manufacturing an optical information recording medium according to claim 1, wherein the optical information recording medium has a double-layered structure in which two information layers and an intermediate layer for separating the two information layers are alternately laminated on the substrate, followed by a lamination of a cover layer, the intermediate layer being the lower layer and the cover layer being the upper layer.

3. The method for manufacturing an optical information recording medium according to claim 1, wherein the optical information recording medium has a three-or-more-layered structure in which plural information layers and plural intermediate layers for separating the plural information layers are alternately laminated on the substrate, followed by a lamination of a cover layer, the intermediate layer initially laminated being the lower layer and the intermediate layer subsequently laminated being the upper layer.

4. The method for manufacturing an optical information recording medium according to claim 1, wherein the optical information recording medium has a three-or-more-layered structure in which plural information layers and plural intermediate layers for separating the plural information layers are alternately laminated on the substrate, followed by a lamination of a cover layer, the plural intermediate layers being the lower layer and the cover layer being the upper layer.

5. The method for manufacturing an optical information recording medium according to claim 1, wherein a difference between the radius of the second center cap used for forming the lower layer and the radius of the first center cap used for forming the upper layer is greater than or equal to 0.25 mm.

6. The method for manufacturing an optical information recording medium according to claim 1, wherein the smallest radius of the center cap among the center caps used for forming the at least two layers is greater than or equal to 8.5 mm.

7. The method for manufacturing an optical information recording medium according to claim 1, wherein a thickness of each of the center caps is made thinner toward an outside from its center.

8. The method for manufacturing an optical information recording medium according to claim 2, wherein a position at which formation of the cover layer is started is closer to a side of an outer circumference in a radial direction than a position at which formation of the intermediate layer is started.

9. The method for manufacturing an optical information recording medium according to claim 3, wherein a position at which formation of the intermediate layer subsequently laminated is started is closer to a side of an outer circumference in a radial direction than a position at which formation of the intermediate layer initially laminated is started.

10. The method for manufacturing an optical information recording medium according to claim 4, wherein a position at which formation of the cover layer is started is closer to a side of an outer circumference in a radial direction than a position at which formation of the intermediate layer lastly laminated is started.

11. The method for manufacturing an optical information recording medium according to claim 1, wherein the end surface of each of the center caps being provided so as not to contact the fitting part when viewed from the bottom, and the fitting part being projected from the end surface when viewed from the front and brought into contact with an upper surface of the substrate when the fitting part is fitted in the through-hole to thereby form a space between an inner surface of the cone-shaped part and the substrate.

12. The method for manufacturing an optical information recording medium according to claim 11, wherein a width of the end surface is smaller than or equal to 2 mm.

13. The method for manufacturing an optical information recording medium according to claim 11, wherein a maximum height of the space from the upper surface of the substrate is greater than or equal to 0.05 mm.

14. The method for manufacturing an optical information recording medium according to claim 11, wherein a height of the space from the upper surface of the substrate is lowered toward an outside from a center of the cone-shaped part.

15. The method for manufacturing an optical information recording medium according to claim 11, wherein a height of an outer surface of the cone-shaped part from the upper surface of the substrate is lowered toward to an outside from a center of the cone-shaped part.

16. The method for manufacturing an optical information recording medium according to claim 1, further comprising an air introduction member, which introduces air into the air introduction hole when each of the center caps is rotated, is provided in the vicinity of the opening part at the upper surface of the projection part.

* * * * *